(12) United States Patent
Ninomiya et al.

(10) Patent No.: US 8,200,897 B2
(45) Date of Patent: *Jun. 12, 2012

(54) STORAGE SYSTEM AND DATA MANAGEMENT METHOD

(75) Inventors: Tatsuya Ninomiya, Odawara (JP); Kazuo Tanaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,403

(22) Filed: Jul. 8, 2011

(65) Prior Publication Data

US 2011/0271066 A1 Nov. 3, 2011

Related U.S. Application Data

(63) Continuation of application No. 12/019,026, filed on Jan. 24, 2008, now Pat. No. 8,006,036.

(30) Foreign Application Priority Data

Mar. 6, 2007 (JP) .................................. 2007-055383

(51) Int. Cl.
  *G06F 12/08* (2006.01)
(52) U.S. Cl. ................. 711/113; 711/122; 711/E12.024
(58) Field of Classification Search .................. None
See application file for complete search history.

(56) References Cited

U.S. PATENT DOCUMENTS

| | | | |
|---|---|---|---|
| 5,640,530 A | 6/1997 | Beardsley et al. | |
| 5,771,367 A | 6/1998 | Beardsley et al. | |
| 6,842,829 B1 | 1/2005 | Nichols et al. | |
| 7,024,530 B2 | 4/2006 | Jarvis et al. | |
| 7,043,603 B2 | 5/2006 | Mori | |
| 7,085,907 B2 | 8/2006 | Ash et al. | |
| 7,130,956 B2 | 10/2006 | Rao | |
| 7,130,957 B2 | 10/2006 | Rao | |
| 7,162,587 B2 | 1/2007 | Hiken et al. | |
| 7,293,196 B2 | 11/2007 | Hicken et al. | |
| 7,428,602 B2 | 9/2008 | Vageline et al. | |
| 7,761,680 B2 | 7/2010 | Ash et al. | |
| 7,853,728 B2 | 12/2010 | Vageline et al. | |
| 2003/0212864 A1 | 11/2003 | Hicken et al. | |
| 2004/0153727 A1 | 8/2004 | Hicken et al. | |
| 2004/0181639 A1 | 9/2004 | Jarvis et al. | |
| 2005/0076177 A1 | 4/2005 | Mori | |
| 2005/0177672 A1 | 8/2005 | Rao | |

(Continued)

FOREIGN PATENT DOCUMENTS

JP 03025798 A 2/1991

(Continued)

OTHER PUBLICATIONS

Partial European Search Report, dated Aug. 19, 2008.

(Continued)

*Primary Examiner* — Kevin Verbrugge
(74) *Attorney, Agent, or Firm* — Sughrue Mion, PLLC

(57) ABSTRACT

The present invention comprises a CHA 110 which transmits/receives data to/from an external device, a DKA 140 which transmits/receives data to/from an HDD unit 200, a primary cache unit 120 which has a primary cache memory 124, a secondary cache unit 130 which is installed between the primary cache unit 120 and the DKA 140 and has a secondary cache memory 134, a CCP 121 which stores write target data received by the CHA 110 in the primary cache memory 124, and a CCP 131 which stores the write target data in the secondary cache memory 134, and transfers the write target data stored in the secondary cache memory 134 to the DKA 140.

9 Claims, 41 Drawing Sheets

U.S. PATENT DOCUMENTS

| | | |
|---|---|---|
| 2005/0177687 A1 | 8/2005 | Rao |
| 2005/0193240 A1 | 9/2005 | Ash et al. |
| 2006/0064558 A1 | 3/2006 | Cochran et al. |
| 2007/0174496 A1 | 7/2007 | Vageline et al. |
| 2008/0250210 A1 | 10/2008 | Ash et al. |

FOREIGN PATENT DOCUMENTS

| | | |
|---|---|---|
| JP | 07219720 A | 8/1995 |
| JP | 10040170 A | 2/1998 |
| JP | 2005/115603 A | 4/2005 |
| JP | 2005258918 A | 9/2005 |
| JP | 2006119786 A | 5/2006 |
| WO | WO 2005114428 A2 | 12/2005 |

OTHER PUBLICATIONS

Japanese Office Action corresponding to Japanese Patent Application No. 2007-055383, issued Oct. 4, 2011.

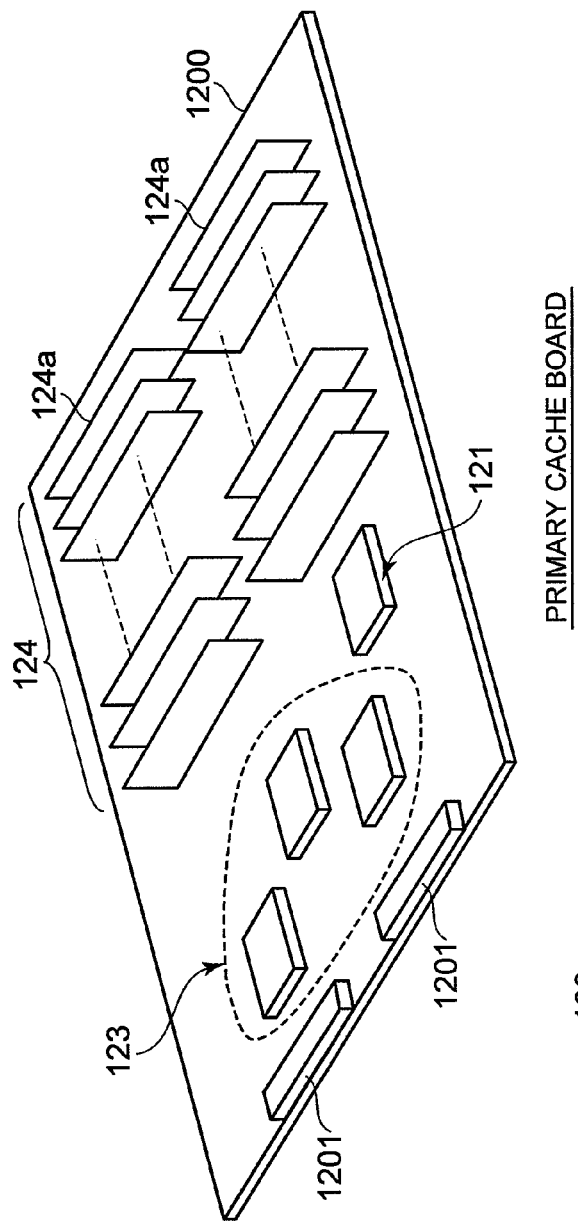
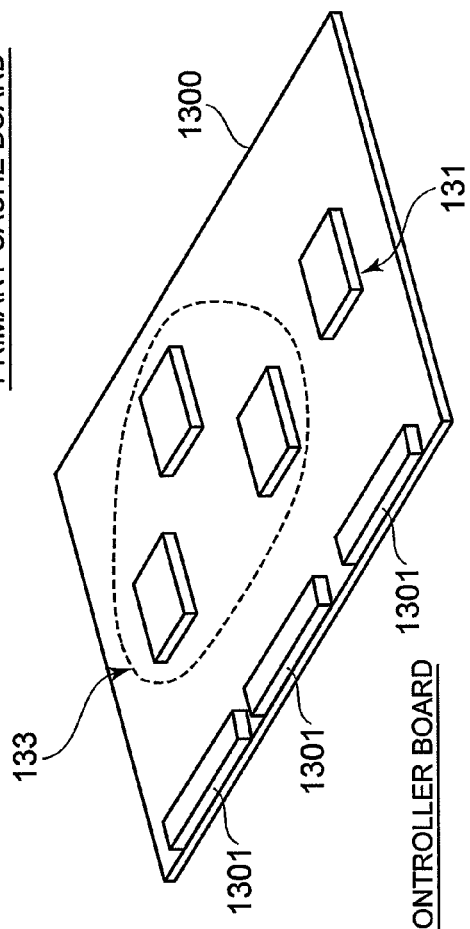
FIG. 3A
FIG. 3B

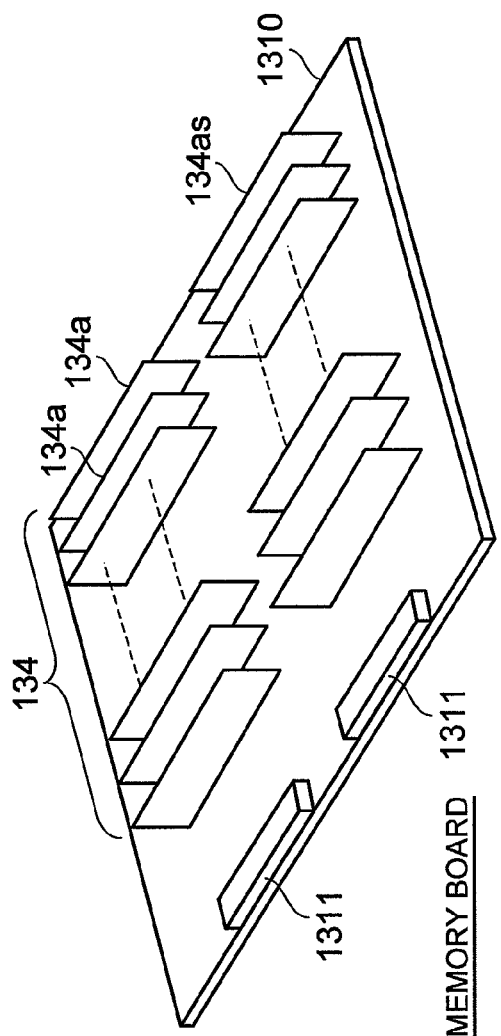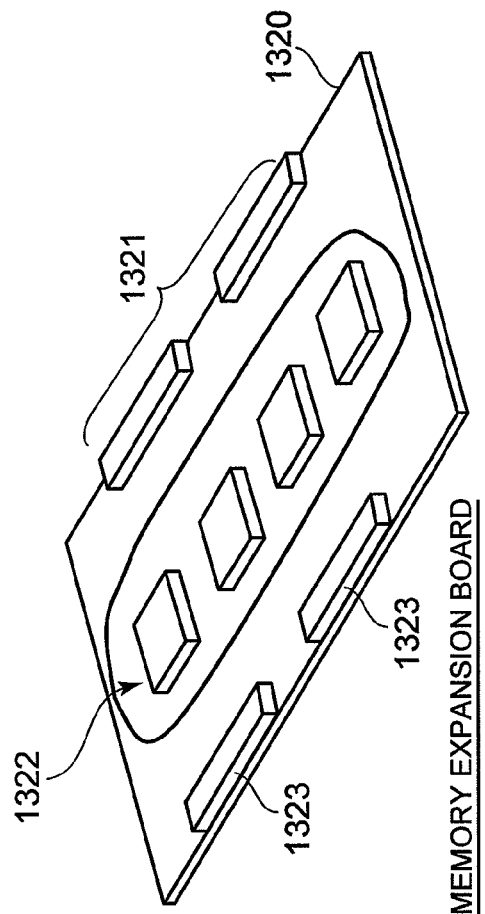

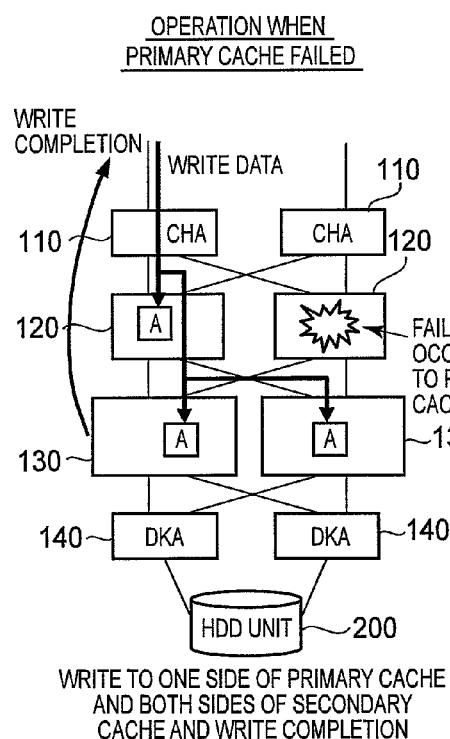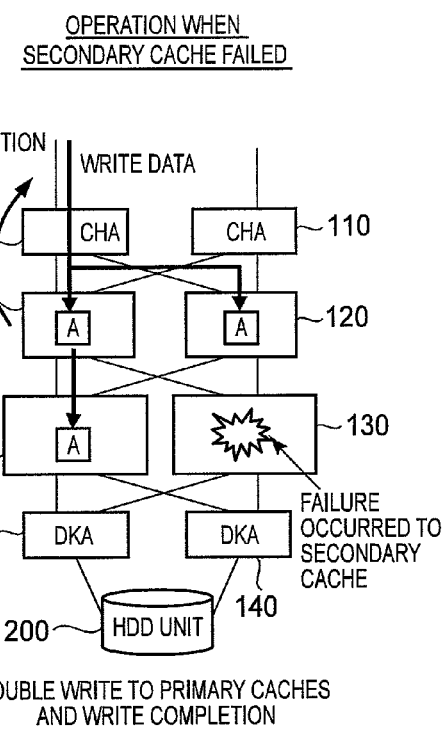
FIG. 14A
OPERATION WHEN PRIMARY CACHE FAILED
WRITE TO ONE SIDE OF PRIMARY CACHE AND BOTH SIDES OF SECONDARY CACHE AND WRITE COMPLETION
FIG. 14B
OPERATION WHEN SECONDARY CACHE FAILED
DOUBLE WRITE TO PRIMARY CACHES AND WRITE COMPLETION

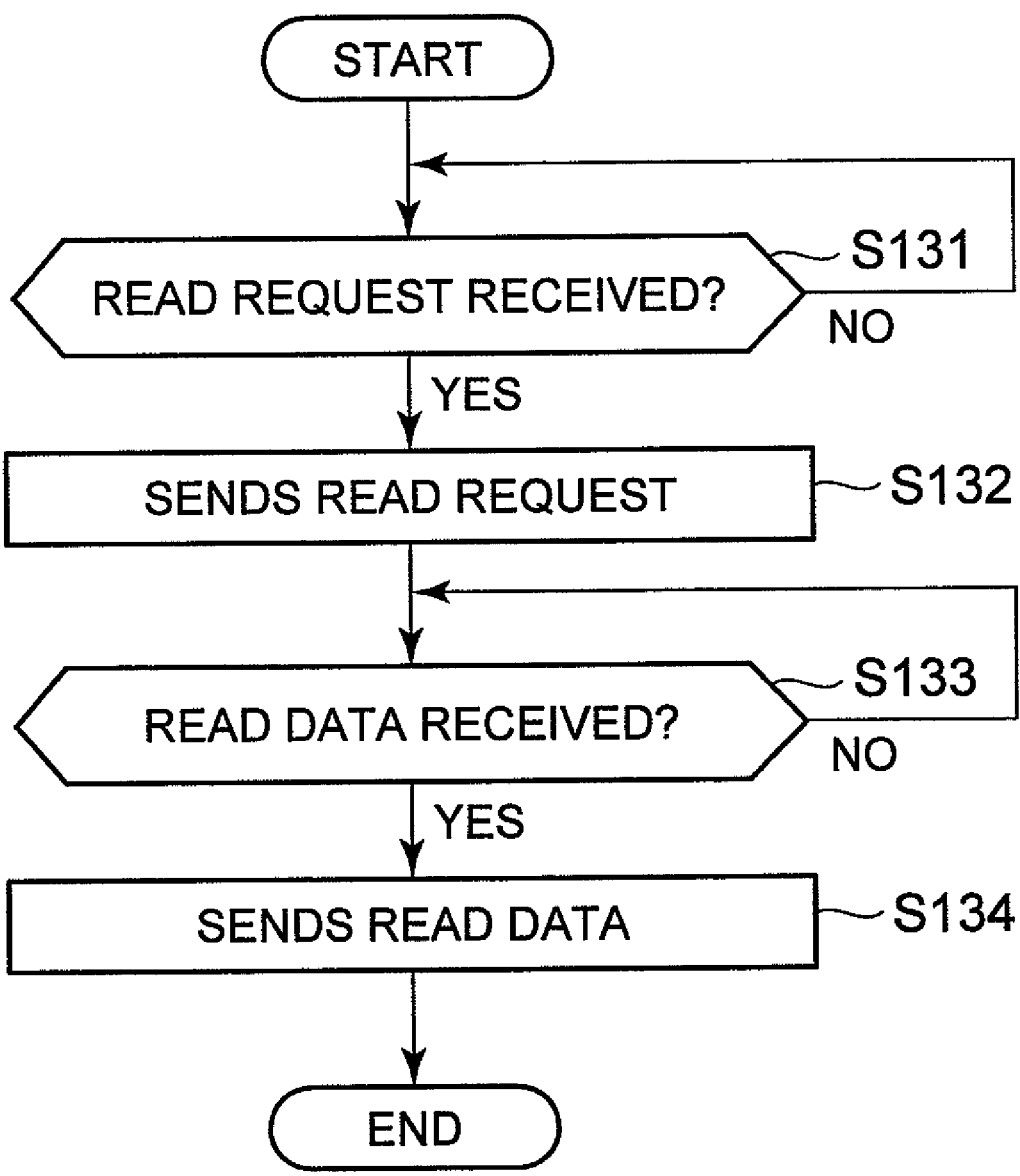

PRIMARY CACHE RESUME MODE
AFTER RECOVERING DATA ON PRIMARY CACHE TO STATUS WHEN POWER WAS SHUT OFF, OPERATION IS STARTED

SECONDARY CACHE START MODE
BASED ON DATA ON SECONDARY CACHE, OPERATION IS STARTED

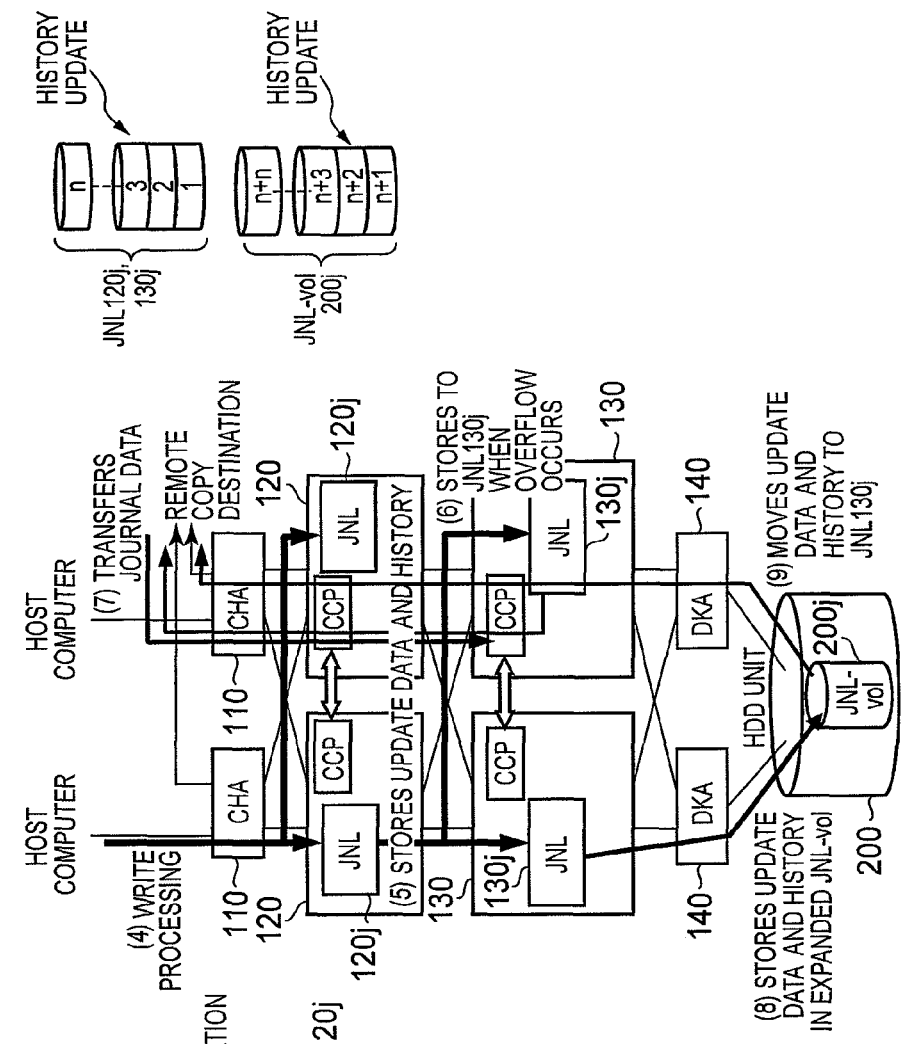
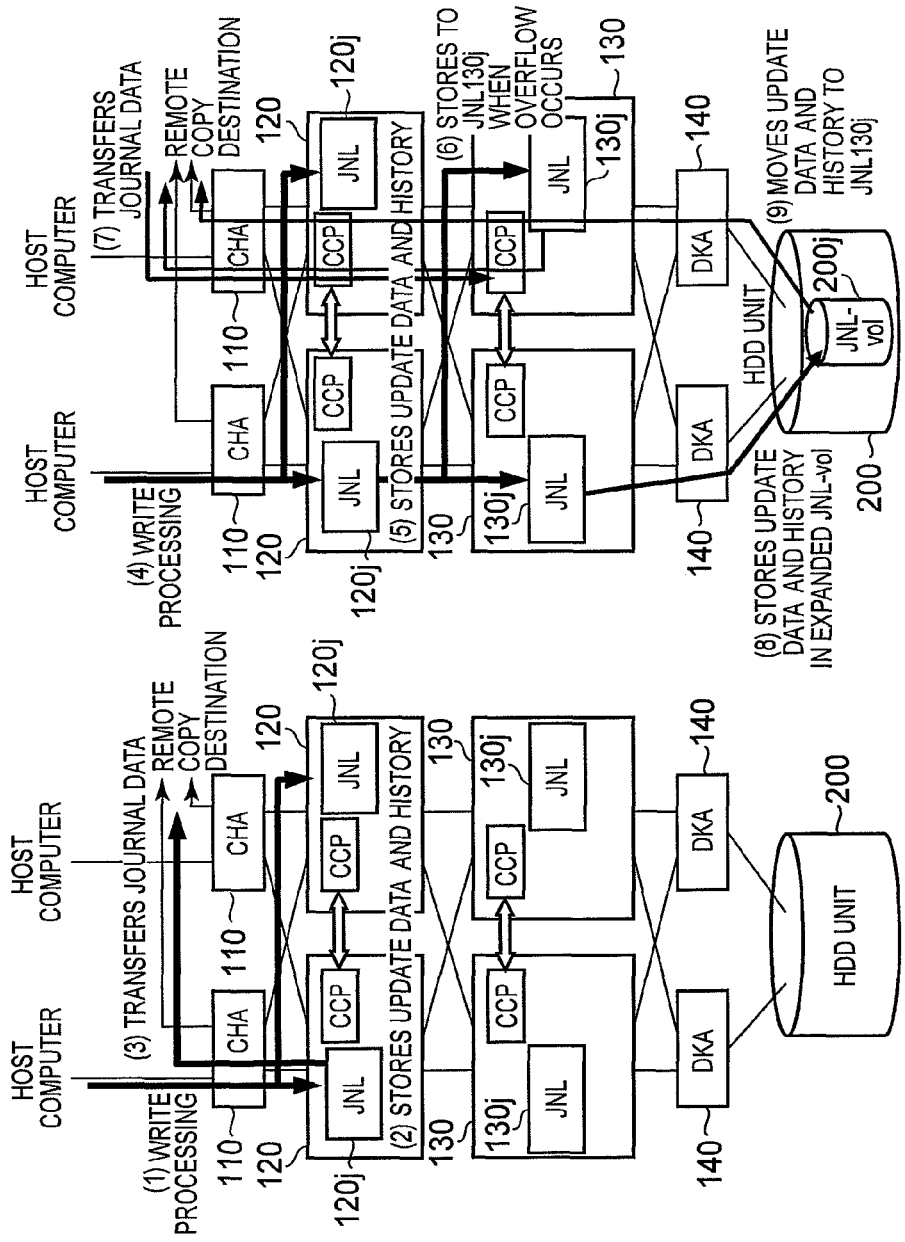

STORAGE SYSTEM AND DATA MANAGEMENT METHOD

CROSS REFERENCE TO PRIOR APPLICATION

This is a Continuation of application Ser. No. 12/019,026 filed Jan. 24, 2008, claiming priority based on Japanese Patent Application No. 2007-55383, filed on Mar. 6, 2007, the contents of all of which are incorporated herein by reference in their entirety.

BACKGROUND

A storage system, for example, receives a write request from a host computer and writes data targeted by the write request (write target data) to a storage device, or receives a read request from the host computer, reads the data targeted by the read request from the storage device, and sends it to the host computer.

In such a storage system, a cache memory, for temporarily storing data to be written to the storage device according to the write request or temporarily storing data read from the storage device according to the read request, is installed.

For this cache memory, for example a DRAM (Dynamic Random Access Memory), of which high-speed access (read and write) is possible, is used. For such a DRAM, the unit price per storage capacity increases as the access speed becomes higher. Also the unit price of the DRAM per storage capacity is higher than other memories, such as a flash memory.

If the storage capacity of the cache memory is increased, the response performance to the access from the host computer improves, but the manufacturing cost required for a cache memory increases. Therefore in a general storage system, for which cost aspect must be considered, the cache memory has only a relatively small and limited storage capacity.

In a storage system having a cache memory, a technology of a storage system comprising a memory for storing data the same as data in a cache memory, installed in a connection unit (bus switch) which communicably connects a communication interface, a cache memory and a storage device interface, so as to decrease the response time to access, has been disclosed (e.g. Japanese Patent Application Laid-Open No. 2005-115603).

According to the technology disclosed in Japanese Patent Application Laid-Open No. 2005-115603, a memory is in the connection unit for communicably connecting the communication interface, cache memory unit and storage device interface. This means that if a plurality of functional units attempt to access the data stored in the memory, some functional units must wait for the completion of access by another functional unit, which makes processing efficiency poor, and may even slow down the response time to access. Also the connection unit performs access processing to memory, so the connection between each unit may slow down the response time.

SUMMARY

With the foregoing in view, it is an object of the present invention to provide a technology to quickly respond to an access request from an external device.

To solve the above problem, a storage system according to an aspect of the present invention is a storage system having one or more storage devices capable of storing data to be transferred to and from an external device, comprising: a first interface unit which transmits/receives data to and from the external device; a second interface unit which transmits/receives data to and from the storage device; a primary cache unit which has a first memory that can store a write target data received by the first interface unit; a secondary cache unit which is installed between the primary cache unit and the second interface unit and has a second memory that can store the write target data stored in the first memory; a first data storage control unit which stores the write target data received by the first interface unit in the first memory; a second data storage control unit which stores the write target data in the second memory; and a third data storage control unit which transfers the write target data stored in the second memory to the second interface unit.

BRIEF DESCRIPTION OF THE DRAWINGS

FIG. 3A is a diagram depicting an example of the configuration of a primary cache board according to the first embodiment of the present invention;

FIG. 3B is a diagram depicting an example of the configuration of a secondary cache controller board according to the first embodiment of the present invention;

FIG. 4A is a diagram depicting an example of the configuration of a secondary cache memory board according to the first embodiment of the present invention;

FIG. 4B is a diagram depicting an example of the configuration of a secondary cache memory expansion board according to the first embodiment of the present invention;

FIG. 14A is an explanatory diagram relating to processing when a failure occurred to the primary cache unit according to the first embodiment of the present invention;

FIG. 14B is an explanatory diagram relating to processing when a failure occurred to the secondary cache unit according to the first embodiment of the present invention;

FIG. 25 is a flow chart depicting a processing when a read request is received according to the first embodiment of the present invention;

FIG. 35A is an explanatory diagram relating to a journal data write processing and remote copy processing according to the first embodiment of the present invention;

FIG. 35B is another explanatory diagram relating to a journal data write processing and remote copy processing according to the first embodiment of the present invention;

FIG. 35C is a diagram depicting an example of a journal data storage status according to the first embodiment of the present invention;

DESCRIPTION OF THE PREFERRED EMBODIMENTS

Embodiments of the present invention will now be described with reference to the drawings. The embodiments described below shall not limit the invention according to the Claims, and all of the combinations of features described in the embodiments shall not always be required for a means of solution in the invention.

<First Embodiment>

Figure 1:
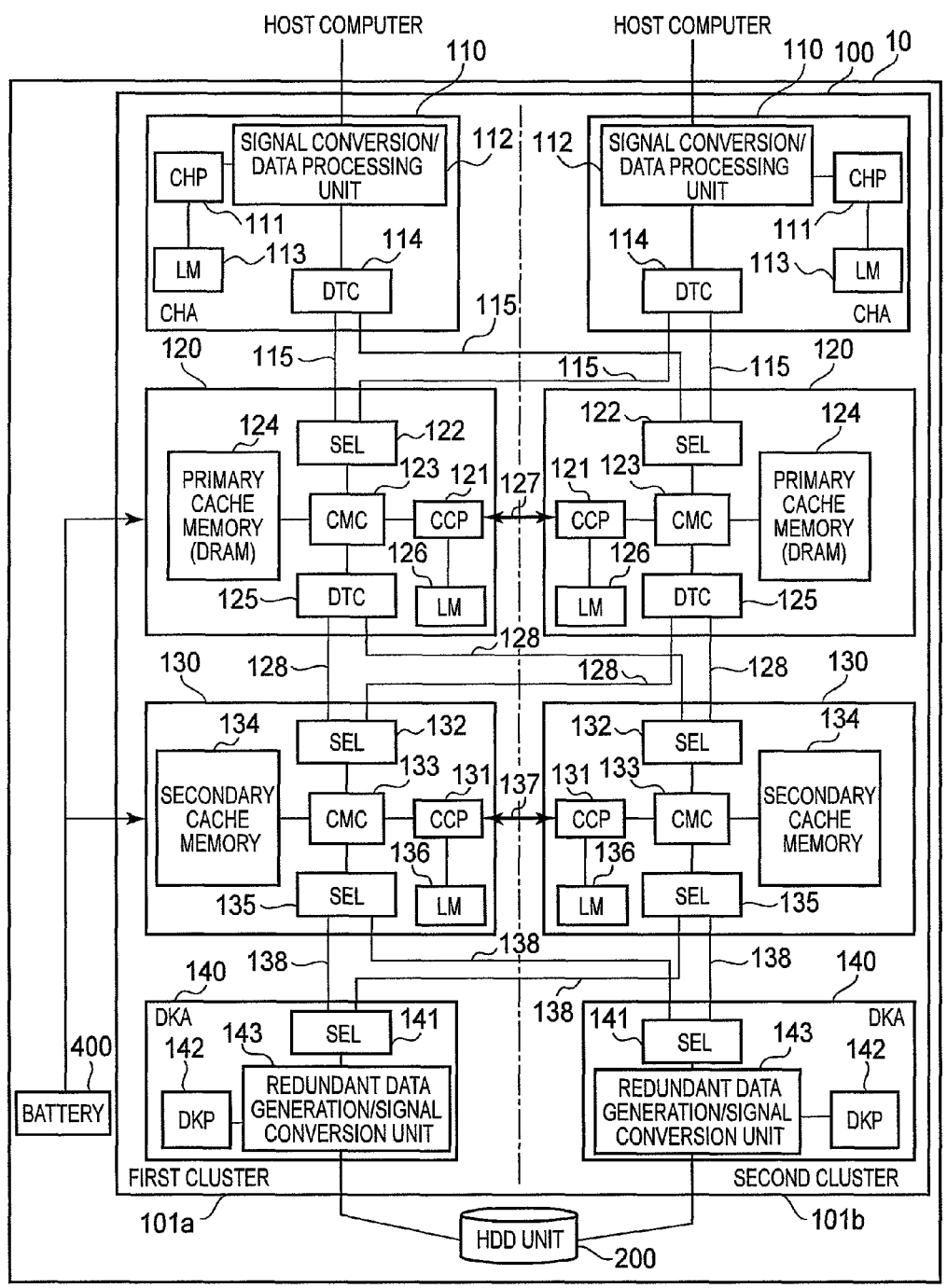
FIG. 1 is a block diagram depicting a storage system according to a first embodiment of the present invention.

FIG. 1 is a block diagram depicting a storage system according to a first embodiment of the present invention.

The storage system 10 comprises a storage control device 100, an HDD unit 200 and a battery 400. The storage system 10 is connected with one or more host computers (an example of external devices) which read or write data, via a cable or a network. The network for connecting with the host computer can be a network that can perform data communication, such as a SAN (Storage Area Network), a LAN (Local Area Network), Internet, leased line, or public line. A protocol on the network or cable can be a fiber channel protocol or TCP/IP protocol, or any other protocol if that protocol enables an exchange of data between the host computer and storage system 10.

The HDD unit 200 has a plurality of HDDs (Hard Disk Drive(s)). In the storage system 10, one or more logical volumes can be provided using the storage spaces of the plurality of HDDs of the HDD unit 200. Also in the storage system 10, two or more HDDs, out of the plurality of HDDs, can constitute a RAID (Redundant Array of Independent Disks) group so as to provide a storage space of the RAID group as a logical volume.

The battery 400 stores power which allows the execution of a predetermined processing when an abnormality occurs to a main power supply, which is not illustrated, and can supply power to predetermined areas of the storage control device 100. In the present embodiment, the battery 400 can supply power to a first cache unit 120 and a second cache unit 130 of a first cluster 101a and a second cluster 101b respectively. Power may be supplied to the first cluster 101a side and the second cluster 101b side using different batteries 400.

The storage control device 100 is a multiplex configuration having the first cluster 101a and the second cluster 101b. A power supply boundary (indicated by the dashed line in FIG. 1) is created in the storage control device 100. In other words, in the storage control device 100, a power supply system to the first cluster 101a and a power supply system to the second cluster 101b are different.

Each of the first cluster 101a and the second cluster 101b comprises a channel adapter (CHA) 110 which is an example of a first interface unit, a primary cache unit 120, a secondary cache unit 130 and a disk adapter (DKA) 140 which is an example of a second interface unit.

The CHA 110 comprises a channel processor (CHP) 111, a signal conversion/data processing unit 112, a local memory (LM) 113 and a data controller (DTC) 114.

The signal conversion/data processing unit 112 can be connected to the host computer via a network or cable, and executes processing on transmitting/receiving various information in reading data and writing data between the host computer and the storage system 10. Here the read request sent from the host computer includes an LUN (Logical Unit Number) and an LBA (Logical Block Address) which indicate a read target block, for example. The write request sent from the host computer includes an LUN and an LBA which indicate a write target block and write target data, for example.

In the present embodiment, the signal conversion/data processing unit 112 converts a signal at the host computer side into a signal at the storage system 10 side, and converts a signal at the storage system 10 side into a signal at the host computer side. Also the signal conversion/data processing unit 112 checks the received data, and performs such processing as correction and resend.

Also the signal conversion/data processing unit 112 converts data received from the host computer into a data format used in the storage system 10, and converts data in the storage system 10 into a data format used at the host computer side.

The data format used in the storage system 10 is, for example, a data format of adding a check code to actual data. In the present embodiment, LUN and LBA, to indicate a storage location of actual data, for example, are included in a check code as the data identification information.

The LM 113 is used as an area for storing programs and data of the processing to be executed by the CHP 111, or as a work area for storing data used for processing by the CHP 111.

The CHP 111 controls each unit of the CHA 110. The CHP 111 also executes various processings by executing the programs stored in the LM 113. Each processing will be described later. In the present embodiment, a first data storage control unit, a completion notice transmission unit and a failure detection unit are controlled mainly by the CHP 111.

The DTC 114 is connected with the primary cache units 120 of the plurality of clusters (101a, 101b) via buses 115, and sends various data to the connected one or more primary cache units 120 according to the control of the CHP 111. Also the DTC 114 receives data transmitted from each connected primary cache unit 120, and transfers it to the CHP 111, for example.

The primary cache unit 120 comprises a cache control processor (CCP) 121, a data selector (SEL) 122, a cache memory controller (CMC) 123, a primary cache memory 124, a data controller (DTC) 125, and a local memory (LM) 126.

The SEL 122 is connected to the DTCs 114 of the CHAs 110 of the first cluster 101a and the second cluster 101b via the buses 115. The SEL 122 receives various data sent from the DTC 114, or sends various data to the DTC 114 of the first cluster 101a or the second cluster 101b. The LM 126 is used as an area for storing programs and data of the processing to be executed by the CCP 121, or as a work area for storing the data used for processing by the CCP 121.

The LM 126 stores control information for managing data (cache data) stored in the primary cache memory 124, for example, such as the data identification information (e.g. LUN and LBA) and the address of the primary cache memory storing this data.

The CMC 123 is connected to the CCP 121, SEL 122, primary cache memory 124 and DTC 125. The CMC 123 transfers data with each connected unit according to the control of the CCP 121. For example, the CMC 123 performs processing for receiving data from the SEL 122 or DTC 125, and stores it in the primary cache memory 124, or transfers data read from the primary cache memory 124 to the SEL 122 or DTC 125. The primary cache memory 124 is a volatile memory, such as a DRAM (Dynamic Random Access Memory). The primary cache memory 124 temporarily stores data received by the CHA 110 or the data transferred from the secondary cache unit 130. The storage capacity of the primary cache memory 124 may be several hundred giga bytes, for example.

The CCP 121 controls each unit of the primary cache unit 120. The CCP 121 also executes various processing by executing the programs stored in the LM 126. Each processing will be described later. In the present embodiment, a second data storage control unit, a primary cache data erase unit, and a primary cache adjustment unit are controlled mainly by the CCP 121.

The DTC 125 is connected with the secondary cache units 130 of the plurality of clusters (101a, 101b) via the buses 128, and sends various data to the connected one or more secondary cache units 130 according to the control of the CCP 121. Also the DTC 125 receives data transmitted from each connected secondary cache unit 130, and transfers it to the CCP 121, for example.

The secondary cache unit 130 comprises a cache control processor (CCP) 131, a data selector (SEL) 132, a cache memory controller (CMC) 133, a secondary cache memory 134, a data selector (SEL) 135, and a local memory (LM) 136.

The SEL 132 is connected to the DTCs 125 of the first cache units 130 of the first cluster 101a and the second cluster 101b via the buses 128. The SEL 132 receives various data sent from the DTC 125, or sends various data to the DTC 125 of the first cluster 101a or the second cluster 101b. The LM 136 is used as an area for storing programs and data of the processing to be executed by the CCP 131, or as a work area for storing the data used for processing by the CCP 131.

The LM 136 stores the control information for managing data (cache data) stored in the secondary cache memory 134, for example, such as the data identification information (e.g. LUN and LBA) and the address of the secondary cache memory storing this data The CMC 133 is connected to the CCP 131, SEL 132, secondary cache memory 134 and SEL 135. The CMC 133 transfers data with each connected unit according to the control of the CCP 131. For example, the CMC 133 performs processing for receiving data from the SEL 132 or SEL 135, and stores it in the secondary cache memory 134, or transfers data read from the secondary cache memory 134 to the SEL 132 or SEL 135.

The secondary cache memory 134 is a nonvolatile memory, such as a flash memory, MRAM (Magneto resistive Random Access Memory) and PRAM (Phase change RAM). Since the secondary cache memory 134 is a nonvolatile memory, stored data can be maintained without power backup by a battery 400. Therefore the power capacity required for the battery 400 can be suppressed.

In the present embodiment, the storage capacity of the secondary cache memory 134 is larger than the storage capacity of the primary cache memory 124. The storage capacity of the secondary cache memory 134 may be several tera bytes or more, for example. Considering the cost required for the storage system 10, it is preferable that the memory, of which unit price per predetermined storage capacity is cheaper than that of the primary cache memory 124, is used for the secondary cache memory 134.

The secondary cache memory 134 temporarily stores the data received by the primary cache unit 120 or the data transferred from the DKA 140. The secondary cache memory 134 may be a volatile memory, such as DRAM. If this secondary cache memory 134 is a volatile memory, compared with the case of using a nonvolatile memory, the input/output speed of data becomes faster. Also compared with the case of using a flash memory, the memory rewrite count is not limited.

The CCP 131 controls each unit of the secondary cache unit 120. The CCP 131 also executes various processing by executing the programs stored in the LM 136. Each processing will be described later. In the present embodiment, a third data storage control unit, an excessive data detection unit, a secondary cache data erase unit, a secondary cache adjustment unit and an access management unit are controlled mainly by the CCP 131. The SEL 135 is connected with the DKAs 140 of the plurality of clusters (101a, 101b) via the buses 138. Also the SEL 135 receives various data sent from the DKA 140 of the first cluster 101a or the second cluster 101b, and sends the various data to the DKA 140 of the first cluster 101a or the second cluster 101b.

The DKA 140 comprises a data selector (SEL) 141, a disk adapter processor (DKP) 142 and a redundant data generation/signal conversion unit 143. The SEL 141 is connected to the SELs 135 of the second cache units 140 of the first cluster 101a and the second cluster 101b via the buses 138. The SEL 141 receives various data sent from the SEL 135, or sends various data to the SEL 135 of the first cluster 101a or the second cluster 101b. The DKP 142 controls each unit of the DKA 140. The DKP 142 also executes various processings by executing the programs stored in a local memory, which is not illustrated.

The redundant data generation/signal conversion unit 143 is connected with the HDD unit 200 via a cable, for example, and executes transfer processing of the read or write target data with the HDD unit 200. The redundant data generation/signal conversion unit 143 converts a signal at the storage control device 100 side into a signal at the HDD unit 200 side, and converts a signal at the HDD unit 200 side into a signal at the storage control device 100 side. If the HDD unit 200 is managed as RAID, for example, the redundant data generation/signal conversion 143 generates redundant data (e.g. parity data) for adapting to RAID based on the data acquired from the storage control device 100, and stores the data and the redundant data to a plurality of HDDs.

Figure 2:
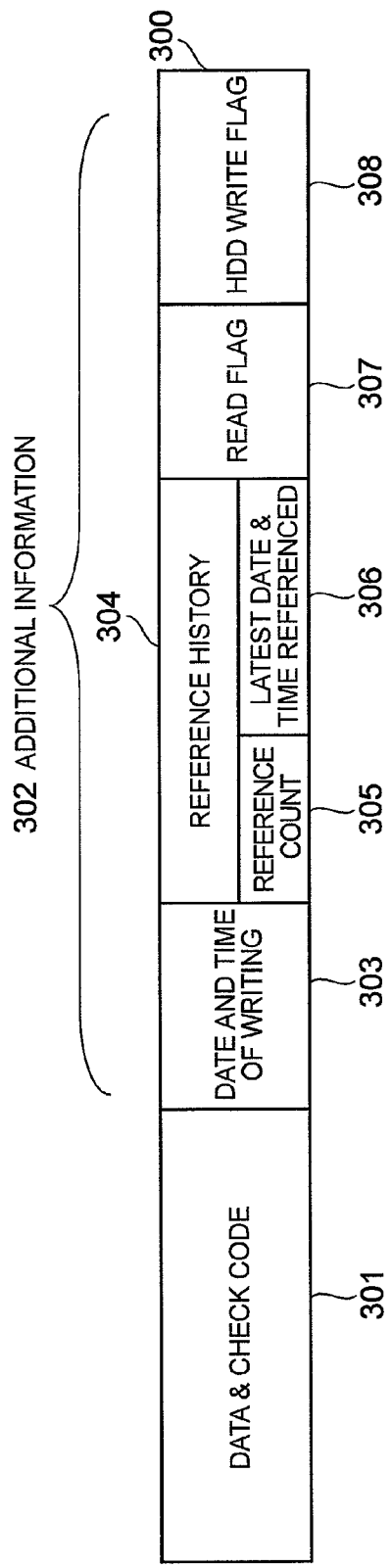
FIG. 2 is a diagram depicting the structure of data to be stored in primary cache memories and secondary cache memories according to the first embodiment of the present invention.

FIG. 2 is a diagram depicting the structure of the data stored in the primary cache memories and the secondary cache memories according to the first embodiment of the present invention.

A data 300 to be stored in the primary cache memory 124 and the secondary cache memory 134 includes a data and check code field 301 and an additional information field 302. Data and check code thereof are stored in the data and check code field 301. The additional information field 302 includes a date and time of writing field 303, a reference history field 304, a read flag field 307 and an HDD write flag field 308.

In the date and time of writing field 303, the date and time when the corresponding data is written (date and time of writing) is stored. In the present embodiment, the date and time when the data is written in the primary cache memory 124 and the secondary cache memory 134 are initially stored in the date and time of writing field 303, but if this data is written in the HDD unit 200, the date and time when the data is written in the HDD unit 200 is stored.

The reference history information of the corresponding data is stored in the reference history field 304. In the present embodiment, the reference history field 304 has a reference count field 305 and a latest reference date and time field 306. In the reference count field 305, the number of times when the corresponding data is referred to (reference count) is stored. The latest date and time when the corresponding data was referred to (latest reference date and time) is stored in the latest reference date and time field 306.

A read flag to indicate whether corresponding data is a data read and stored from the lower side (e.g. HDD unit 200 side in the case of a data stored in the secondary cache memory 134), or a data stored from the upper side (e.g. primary cache unit 120 side in the case of a data stored in the secondary cache memory 134) is stored in the read flag field 307. According to the present embodiment, read flag "1" indicates that the corresponding data is stored from the lower side, and read flag "0" indicates that the corresponding data is stored from the upper side.

An HDD write flag to indicate whether corresponding data is a data written in the HDD unit 200 or not is stored in the HDD write flag field 308. In the present embodiment, the HDD write flag "1" indicates that the corresponding data is stored in the HDD unit 200, and the HDD write flag "0" indicates that the corresponding data is not stored in the HDD unit 200.

Now a concrete configuration example of the first cache unit 120 and the second cache unit 130 will be described with reference to the drawings.

FIG. 3A is a diagram depicting an example of a configuration of a primary cache board according to the first embodiment of the present invention. FIG. 3B is a diagram depicting an example of a configuration of a secondary cache controller board according to the first embodiment of the present invention. FIG. 4A is a diagram depicting an example of a configuration of a secondary cache memory board according to the first embodiment of the present invention. FIG. 4B is a diagram depicting an example of a configuration of a secondary cache memory expansion board according to the first embodiment of the present invention.

As FIG. 3A shows, the primary cache unit 120 is comprised of one primary cache board 1200. The primary cache memory 124 comprising a plurality of memory modules 124a, CMC 123 comprising a plurality of modules, CCP 121 and connectors 1201, for example, are installed on the primary cache board 1200.

The secondary cache unit 130 is comprised of a secondary cache controller board 1300 shown in FIG. 3B, a secondary cache memory board 1310 shown in FIG. 4A, and a secondary cache memory expansion board 1320. If the storage capacity of the secondary cache memory in the secondary cache unit 130 is a predetermined amount or less, the secondary cache memory expansion board 1320 is not necessary.

The CMC 133 comprising a plurality of modules, CCP 131 and connectors 1301, for example, are installed on the secondary cache controller board 1300.

The secondary cache memory 134 comprising a plurality of memory modules 134a and spare memory modules 134sa is installed on the secondary cache memory board 1310. According to the present embodiment, a plurality of secondary cache memory boards 1310 are provided, and the memory modules 134a of this plurality of secondary cache memory boards 1310 constitute the secondary cache memory 134. In this way, the secondary cache memory boards 1310, on which the memory modules 134a are installed, and the secondary cache controller board 1300, on which the CMC 133 and the CCP 131 for controlling access to the secondary cache memory 134 are installed, are different boards, so only one secondary cache memory board 1310 can be removed if the memory module 134a must be replaced, as mentioned later.

In other words, when the memory module 134a need be replaced, only one secondary cache memory board 1310 is blocked, and the data cached in the memory device 134a of the other secondary cache memory boards 1310 can remain available in the secondary cache unit 130.

The memory secondary cache expansion board 1320 is a board required for constructing the secondary cache memory 134 by more than a predetermined number of secondary cache memory boards 1310, so that the stored capacity of the secondary cache memory 134 becomes more than a predetermined capacity, and is a board for allowing the secondary cache controller board 1300 to perform such control as data read for more than a predetermined number of secondary cache memory boards 1310.

An interface unit for expansion 1322, connectors 1321 and connectors 1323 are installed on the secondary cache memory expansion board 1320.

Figure 5B:
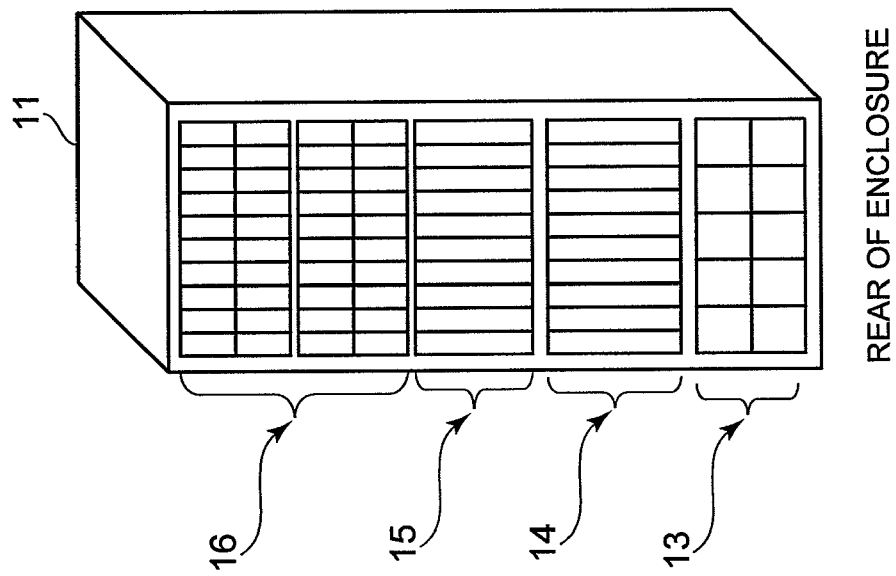
FIG. 5B is a diagram depicting a rear view of the enclosure of the storage system according to the first embodiment of the present invention.
Figure 5A:
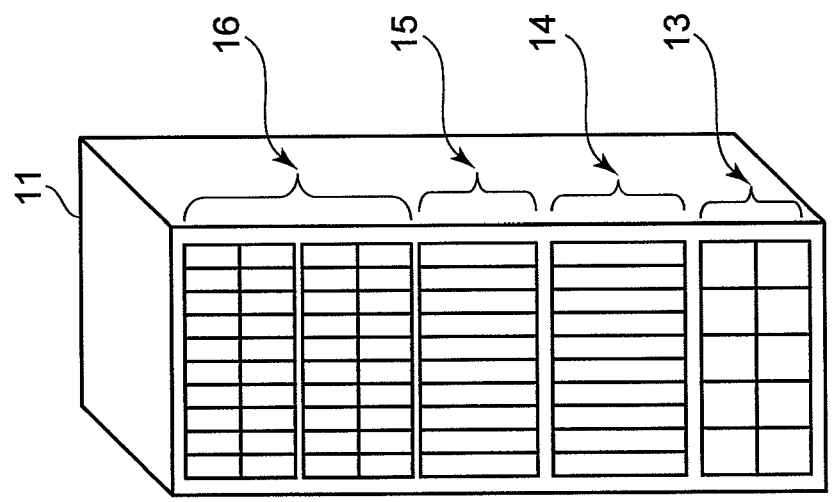
FIG. 5A is a diagram depicting a front view of an enclosure of the storage system according to the first embodiment of the present invention.

FIG. 5A is an external view of the front side of the enclosure of the storage system according to the first embodiment of the present invention. FIG. 5B is an external view of a rear side of the enclosure of the storage system according to the first embodiment of the present invention.

A power supply unit 13, basic unit box 14, secondary cache memory expansion box 15 and HDD mounting unit 16 are disposed on the front side of the enclosure 11 of the storage system 10 sequentially from the bottom, as shown in FIG. 5A. Power supply circuits, which are not illustrated, for supplying power from the outside to each unit and the battery 400, are disposed in the power supply unit 13. Boards constituting the CHA 110, primary cache unit 120, secondary cache unit 130 and DKA 140 are stored in the basic unit box 14.

Memory boards 1310 constituting the secondary cache memory 134 are stored in the secondary cache memory expansion box 15 when the storage capacity of the secondary cache memory 134 of the secondary cache unit 130 is more than a predetermined capacity. A plurality of HDDs of the HDD unit 200 are mounted in the HDD mounting unit 16.

A power supply unit 13, basic unit box 14, secondary cache memory expansion box 15 and HDD mounting unit 16 are disposed in the rear side of the enclosure 11 of the storage system 10 as well sequentially from the bottom, in the same way as the front side, as shown in FIG. 5B. In the present embodiment, each unit constituting the first cluster 101a is disposed on the front side of the enclosure 11, and each unit constituting the second cluster 101b are disposed on the rear side of the enclosure 11.

Now the details inside the enclosure 11 of the storage system will be described.

Figure 6:
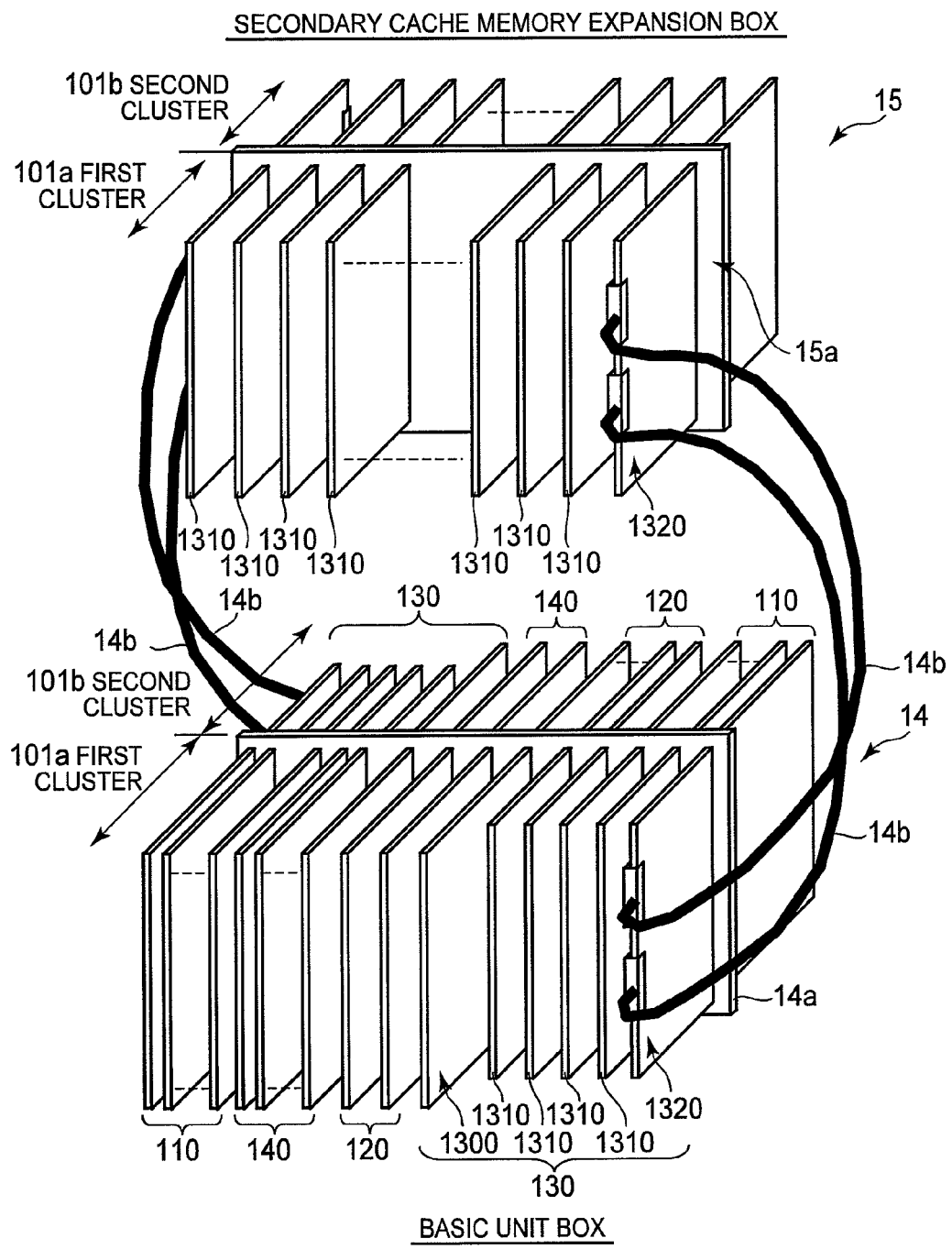
FIG. 6 is a diagram depicting the status of the boards in the enclosure of the storage system according to the first embodiment of the present invention.

FIG. 6 is a diagram depicting the mounting the boards of the enclosure of the storage system according to the first embodiment of the present invention.

The basic unit box 14 has a backboard 14a for the basic unit box 14 at the center. In the basic unit box 14, the first cluster 101a is constructed in the front side of the backboard 14a, and the second cluster 101b is constructed in the back side thereof.

In concrete terms, the boards constructing the CHA 110, DKA 140 and primary cache unit 120 of the first cluster 101a are inserted into the backboard 14a from the front side. The secondary cache controller boards 1300, a plurality of secondary cache memory boards 1310 and the secondary cache memory expansion board 1320, constituting the secondary cache unit 130 of the first cluster 101a, are also inserted into the backboard 14a from the front side. The boards constituting each unit of the second cluster 101b, on the other hand, are inserted into the backboard 14a from the back side in the drawings. Wires for connecting each unit in the connection status shown in FIG. 1 and wires for connecting the secondary cache controller board 1300, secondary cache memory board 1310 and the secondary cache memory expansion board 1320 are provided on the backboard 14a.

The secondary cache memory expansion box 15 has a backboard 15a for the expansion box. In the secondary cache memory expansion box 15, the first cluster 101a is constructed in the front side of the backboard 15a, and the second cluster 101b is constructed in the back side thereof. The secondary cache memory expansion board 1320 of the first cluster 101a and a plurality of secondary cache memory boards 1310 are inserted into the backboard 15a from the front side, and the secondary cache memory expansion board 1320 of the second cluster 101b and a plurality of secondary cache memory boards 1310 are inserted into the backboard 15*a* from the back side. Wires for connecting the secondary cache memory expansion board 1320 and the secondary cache memory boards 1310 are provided on the backboard 15*a*.

The connector 1323 of the secondary cache memory expansion board 1320 installed in the basic unit box 14 and the connector 1323 of the secondary cache memory expansion board 1320 installed in the secondary cache memory expansion box 15 are connected via a cable 14*b*, so that communication is possible between the secondary cache memory expansion boards 1320. By this, the CMC 133 on the secondary cache memory controller board 1300 installed in the basic unit box 14 can access the secondary cache memory board 1310 in the secondary cache memory expansion box 15 via the secondary cache memory expansion board 1320. Therefore the secondary cache memory board 1310 constituting the secondary cache memory 134 can be installed not only in the basic unit box 14 but also in the secondary cache memory expansion box 15, and the storage capacity of the secondary cache memory 134 can be easily expanded.

Now the processing concerning the operation of the storage system 10 when a write request is received will be described.

Figure 7:
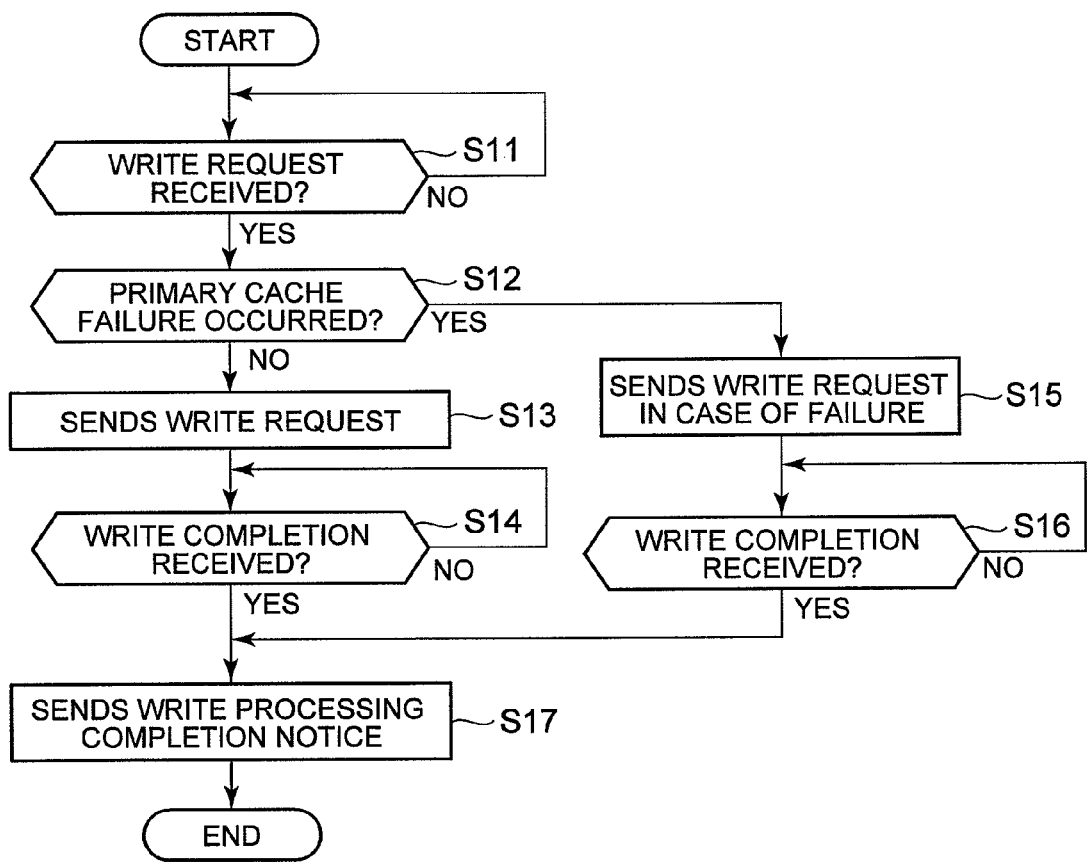
FIG. 7 is a flow chart depicting the processing when a write request is received in a channel adapter according to the first embodiment.

FIG. 7 is a flow chart depicting the processing when a write request is received in a channel adapter according to the first embodiment of the present invention.

In CHA 110, the CHP 111 judges whether a write request is received from the host computer via the signal conversion/data processing unit 112 (step S11), and repeatedly execute step S11 if not received. If a write request is received, on the other hand, CHP 111 detects whether a failure occurred to the primary cache unit 120 (step S12), and if a failure did not occur, CHP 111 sends a write request to the primary cache units 120 of the first cluster 101*a* and the second cluster 101*b* respectively (step S13). Here CHP 111 sends information including the data capacity of the write target data and the identification information (write destination block) of the storage destination to the primary cache unit 120.

CHP 111 judges whether a write completion is received from both of the primary cache units 120 of each chapter (step S14), and repeatedly executes step S14 until the write completion is received from both of the primary cache units 120. If the write completion is received from both of the primary cache units 120, CHP 111 sends a write processing completion notice to the host computer which sent the write request via the signal conversion/data processing unit 112 (step S17). The host computer which received this write processing completion notice can end the write processing of the data.

If it is detected that a failure occurred to the primary cache unit 120 (YES in step S12), CHP 111 sends a write request in case of failure to the primary cache unit 120 where a failure did not occur (step S15), judges whether a write completion for the write request is received or not (step S16), and sends the write processing completion notice to the host computer which sent the write request via the signal conversion/data processing unit 112 if the write completion is received (step S17).

Figure 8:
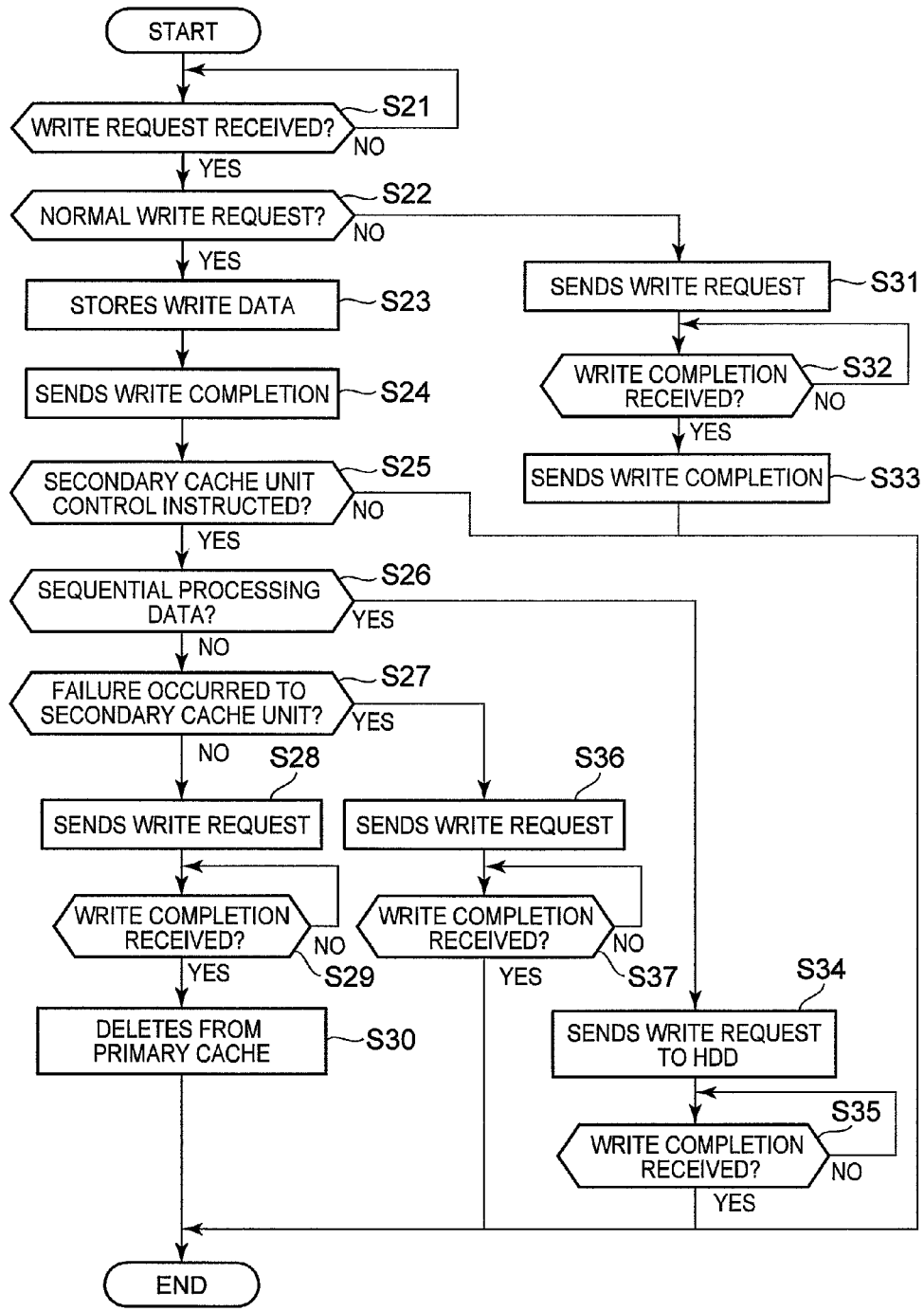
FIG. 8 is a flow chart depicting the processing when a write request is received in a primary cache unit according to the first embodiment of the present invention.

FIG. 8 is a flow chart depicting a processing when a write request is received in the primary cache unit according to the first embodiment of the present invention.

In the primary cache unit 120, the CCP 121 judges whether a write request from the CHA 110 is received via the SEL 122 (step S21), and repeatedly executes step S21 if not received. If the write request is received, on the other hand, the CCP 121 judges whether the write request is a normal write request or a write request in case of failure (step S22), and stores the write target data in the primary cache memory 124 if it is a normal write request (step S23). In this case, the CCP 121 stores the write target data based on a structure shown in FIG. 2, and writes the date and time written in the primary cache memory 124 to the date and time of writing field 303. Also the CCP 121 corresponds and stores the identification information of the data included in the write request and storage destination (address) of the primary cache memory 124 in which the data was written, in the LM 126.

Then the CCP 121 sends the write completion to the CHA 110 which sent the write request via the SEL 122 (step S24).

Then the CCP 121 judges whether a control instruction to the secondary cache unit 130 is necessary (step S25). Whether a control instruction to the secondary cache unit 130 is necessary or not can be judged depending on whether the CHA 110 requested the control instruction. In this embodiment, one of the secondary cache units 130 requested the control instruction. As a result, if a control instruction is required (YES in step S25), the CCP 121 also judges whether the write target data is sequential processing data or not (step S26). Here if the number of blocks where the write target data is written, which is sent from the CHA 110, continues for a predetermined number (e.g. 10) or more, the CCP 121 judges that the write target data is sequential processing data.

If not sequential processing data (NO in step S26), the CCP 121 judges whether a failure occurred to the secondary cache unit 130 (step S27), and if a failure did not occur, the CCP 121 sends the write request to the secondary cache units 130 of the first cluster 101*a* and the second cluster 101*b* respectively (step S28).

Then the CCP 121 judges whether a write completion is received from both of the secondary cache units 130 of each cluster (step S29), and repeatedly executes step S29 until the write completion is received from both. If the write completion is received from both the secondary cache units 130 (YES in step S29), which means that the same data is stored in the two secondary cache units 130, the CCP 121 executes a processing to delete the same data from the primary cache memory 124 of one of the primary cache units 120 (step S30), and ends the processing. In the present embodiment, the CCP 121 sequentially exchanges information on the use amount of the primary cache memory 124 with the CCP 121 of the primary cache unit 120 of the other cluster, so write target data is deleted from the primary cache memory 124 of which use amount is higher. By this, the free storage capacity in the primary cache memory 124 can be increased appropriately. The write target data is stored in one of the primary cache memories 124, so if a read request of this data is received, the data stored in this primary cache memory 124 is sent to the device which sent the read request, and as a result, a response to the read request can be quick.

If it is judged that the write request is not a normal write request, that is a write request when the primary cache unit 120 failed (NO in step S22), in step S22, on the other hand, the CCP 121 sends the write request to the secondary cache units 130 of the first cluster 101*a* and the second cluster 101*b* respectively (step S31).

Then the CCP 121 judges whether a write completion is received from both of the secondary cache units 130 of each cluster (step S32), and repeatedly executes step S32 until the write completion is received from both. If the write completion is received from both of the secondary cache units 130, which means that the same data is stored in the two secondary cache units 130, the CCP 121 sends a write completion to the CHA 110 which sent the write request (step S33), and ends the processing. Because of this, if one of the primary cache units 120 has a failure, a write completion is sent to the CHA 110 at the point when the same data is stored in the secondary cache memories 134 of the two secondary cache units 130, and a write processing completion notice is sent to the host computer which sent the write request. Therefore even if the primary cache unit 120 fails, the write processing completion notice is sent to the host computer quickly, without storing the data to the HDD unit 200 of which response during accessing is slow.

If it is judged that this data is sequential processing data in step S26, writing this data to the secondary cache memory 134 increases the write count and consumes the secondary cache memory 134 quickly, so the CCP 121 sends the write request, to write data to the HDD of the HDD unit 200, to the secondary cache unit 130 so that the data will not be stored in the secondary cache memory 134 (step S34). Then the CCP 121 judges whether the write completion is received from the secondary cache unit 130 (step S35), and repeatedly executes the step S35 until the write completion is received. When the write completion is received from the secondary cache unit 130 (YES in step S35), the CCP 121 ends the processing.

If it is detected that the secondary cache unit 130 has a failure in step S27 (YES in step S27), the CCP 121 sends the write request to the secondary cache unit 130 (step S36) where no failure is occurred, judges whether a write completion for the write request is received (step S37), and repeatedly executes the step S37 until the write completion is received. When the write completion is received from the secondary cache unit 130 (YES in step S37), the CCP 121 ends the processing.

Figure 9:
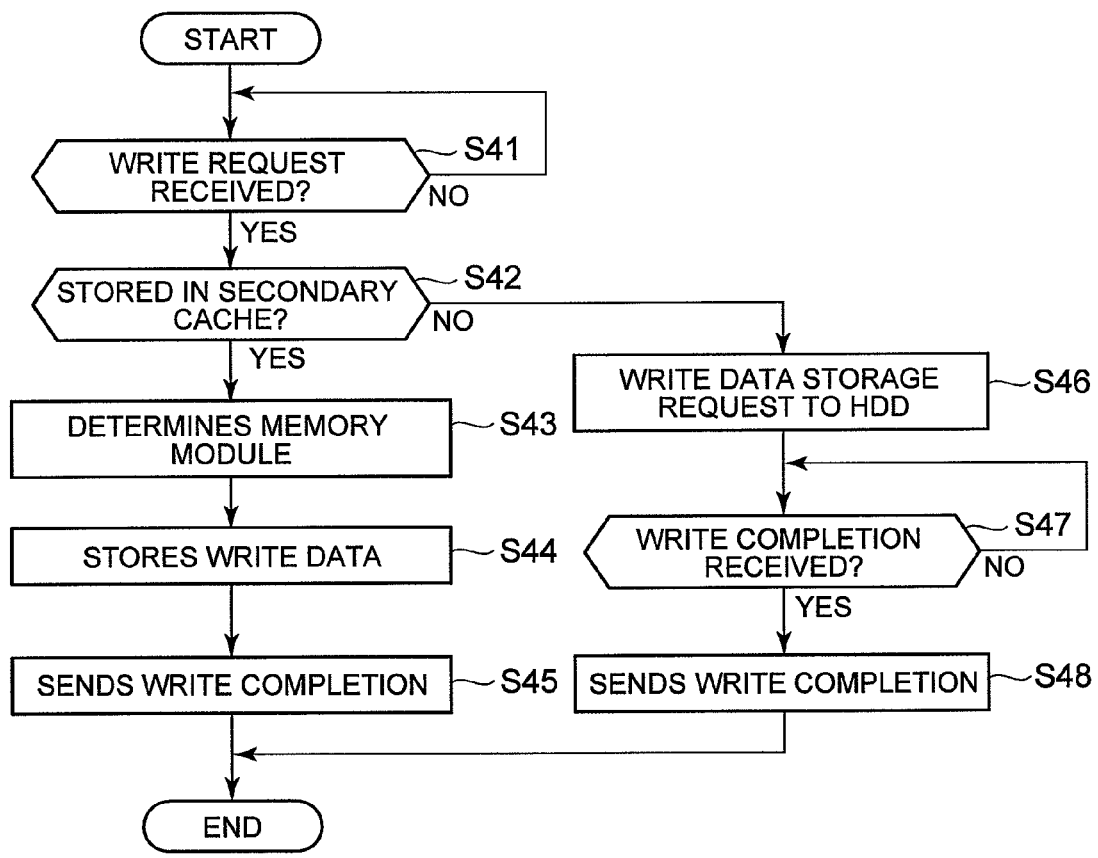
FIG. 9 is a flow chart depicting the processing when a write request is received in a secondary cache unit according to the first embodiment of the present invention.

FIG. 9 is a flow chart depicting a processing when a write request is received in the secondary cache unit according to the first embodiment of the present invention.

In the secondary cache unit 130, the CCP 131 judges whether a write request is received from the primary cache unit 120 via the SEL 132 (step S41), and repeatedly executes step S41 if not received. If the write request is received, on the other hand, the CCP 131 judges whether the write request is a write request to the secondary cache memory 134, or a write request to the HDD unit 200 (step S42).

If the write request is a write request to the secondary cache memory 134 as a result (YES in step S42) of this judgment, the CCP 131 determines a memory module 134a of the secondary cache memory 134 in which the write target data is stored (step S43). The storage processing in the secondary cache memory 134 by the CCP 131 will be described later.

The CCP 131 stores the write target data in the memory module 134a of the determined secondary cache memory 134 (step S44). In this case, the CCP 131 stores the write target data based on the structure shown in FIG. 2, and writes the date and time written in the secondary cache memory 134 to the date and time of writing field 303. Also the CCP 131 corresponds and stores the identification information of the data included in the write request, and the storage destination (address) of the secondary cache memory 134 in which this data is written, in the LM 136. Then the CCP 131 sends the write completion to the primary cache unit 120 which sent the write request (step S45).

If the write request is not a write request to the secondary cache memory 134 (NO in step S42), on the other hand, the CCP 131 sends the write request to write to HDD of the HDD unit 200, to the DKA 140 (step S46). By this, the write target data is written in the HDD unit 200 by the DKA 140. Then the CCP 131 judges whether a write completion is received from the DKA 140 (step S47), and repeatedly executes step S47 until the write completion is received. If the write completion is received from the DKA 140 (YES in step S47), the CCP 131 sends the write completion to the primary cache unit 120 which sent the request (step S48), and ends the processing.

Figure 10A:
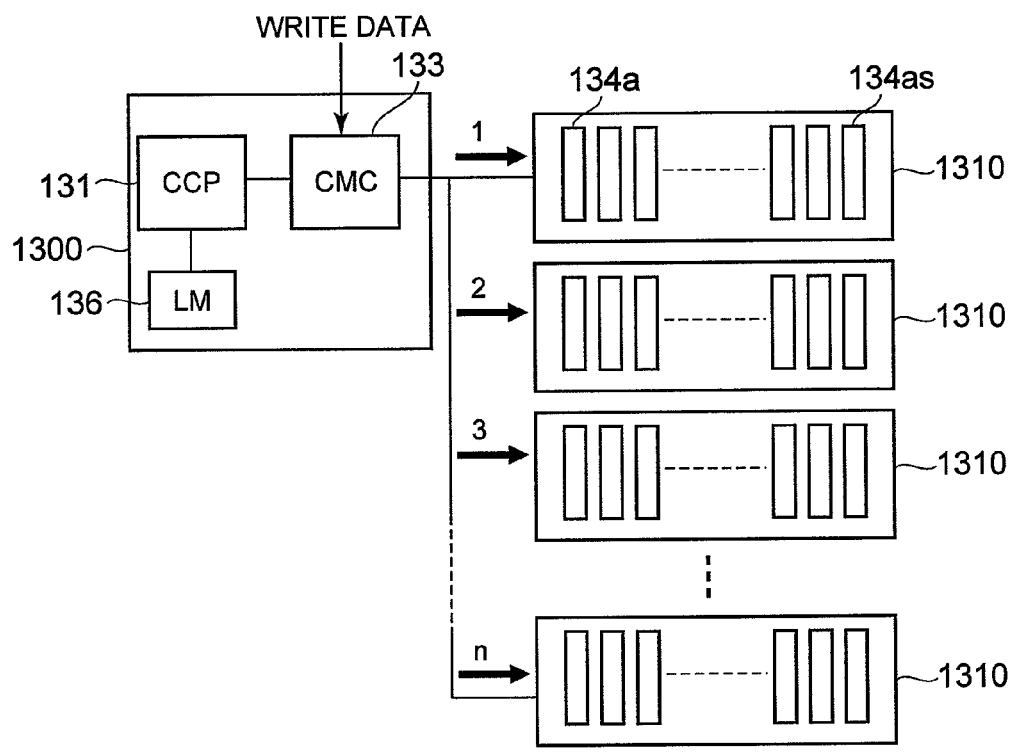
FIG. 10A is a diagram depicting the data storage processing to the secondary cache memory according to the first embodiment of the present invention.
Figure 10B:
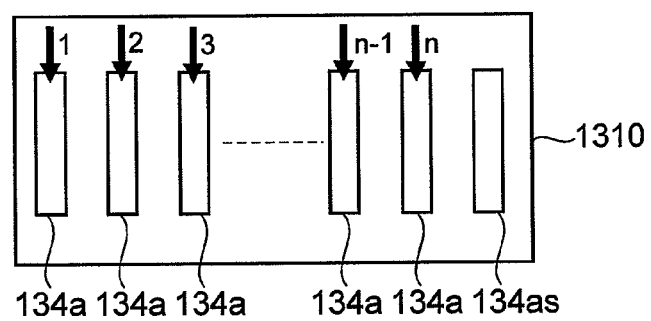
FIG. 10B is a diagram depicting the data storage processing to the memory device of the secondary cache memory according to the first embodiment of the present invention.

FIG. 10A is a diagram depicting a data storage processing to the secondary cache memory according to the first embodiment of the present invention, and FIG. 10B is a diagram depicting a data storage processing to the memory device of the secondary cache memory according to the first embodiment of the present invention.

In the LM 136, the write count to each memory module 134a of the secondary cache memory 134 is stored. If a write request to the secondary cache memory 134 is received, the CCP 131 controls storage of the data so that the write counts to the memory modules 134a become even based on the write count stored in the LM 136. The CCP 131 determines the memory board 1310 to which data is written sequentially, (1, 2, 3, ..., n), for example, and also determines each memory module 134a to which the data is written sequentially (1, 2, 3, ..., n) in the memory board 1310, as shown in FIG. 10B, and stores the data in the determined memory module 134a, and adds the write count to this memory module 134a stored in the LM 136. By this, the write counts to each memory module 134a can be roughly equalized.

Now the data management processing implemented by the processings in FIG. 7 to FIG. 9 will be concretely described. First the case of a data management processing when the write target data is general data will be described.

Figure 11:
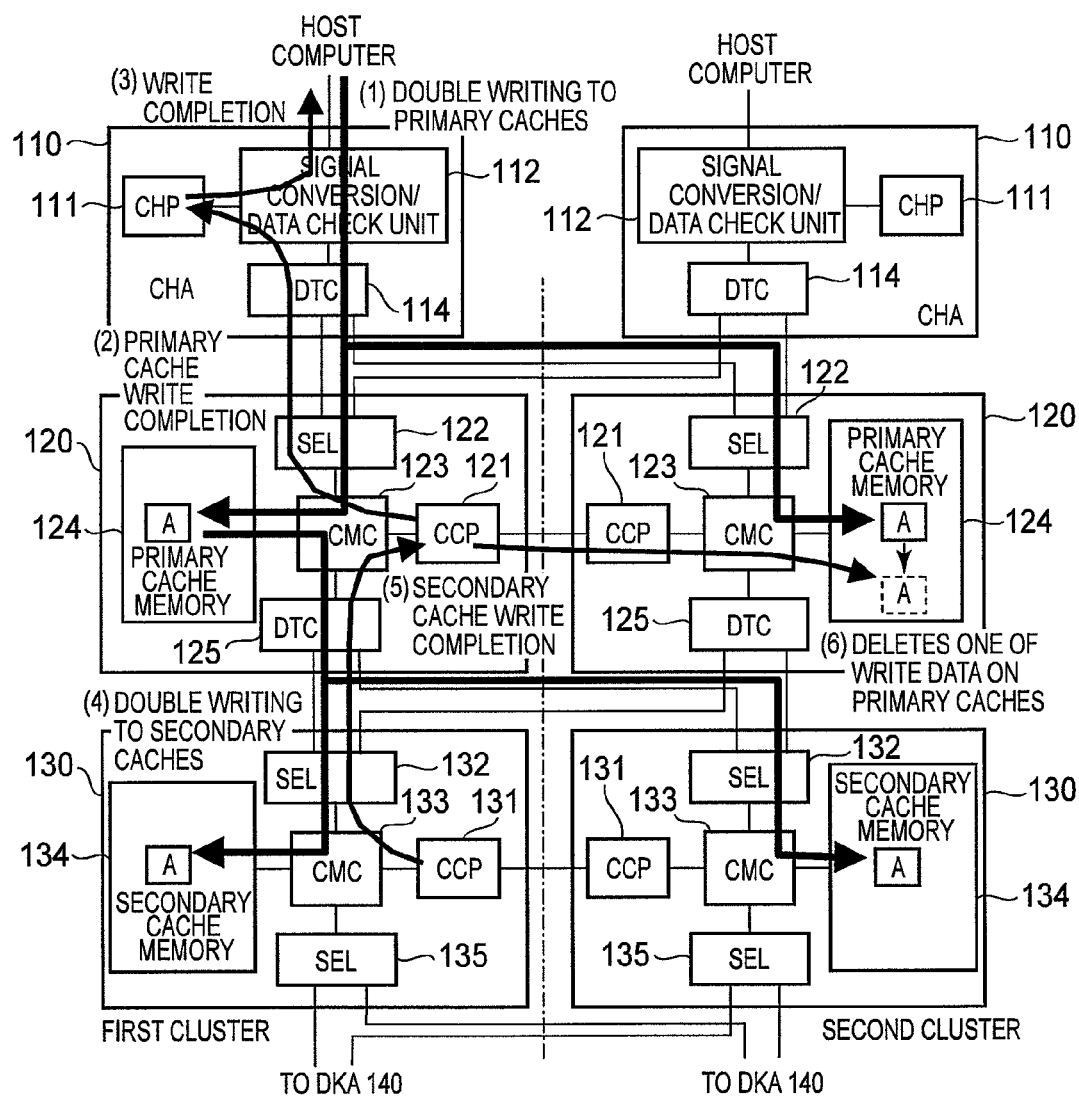
FIG. 11 is a diagram depicting a write target data management processing according to the first embodiment of the present invention.

FIG. 11 is a diagram depicting the write target data management processing according to the first embodiment of the present invention. In the following description, the step numbers in FIG. 7 to FIG. 9 will be used.

As (1) shows, the storage system 10 double-writes the write target data (data A in FIG. 11) in the primary cache memories 124, that is, writes the same data in the two primary cache memories 124 respectively. In concrete terms, the CHA 110 of the storage system 10, which received a write request (step S11), sends a normal write request to the two primary cache units 120 (step S13). The CCP 121 of each primary cache unit 120, which received the normal write request (YES in steps S21 and S22), stores the write target data A in the primary cache memories 124 (step S23). By this, the same data A is stored in the two primary cache memories 124. Then as (2) shows, the storage system 10 sends a write completion, to indicate that the data A is stored in the primary cache memories 124, to the CHA 110 which sent the request (step S24). Then as (3) shows, the CHA 110, which received the write completion from both of the primary cache units 120 (step S14), sends a write processing completion notice to the host computer which sent the write request (step S17).

Then as (4) shows, the write target data A is double-written to the secondary cache memories 134, that is written to the two secondary cache memories 134 respectively. In concrete terms, the CCP 121 of the primary cache unit 120 sends the write request to the secondary cache units 130 (step S28), and the CCPs 131 of the secondary cache units 130 receive the write request (step S41) and store the data A in the secondary cache memories 134 (steps S43 and S44).

Then as (5) shows, the CCP 131 sends the write completion to the primary cache unit 120 (step S45). Then as (6) shows, the CCP 121 executes processing to delete the write target data A from the primary cache memory 124 of one side of the primary cache units 120 (step S30).

By this, the write target data A is deleted from the one side of the primary cache memories 124, and the memory efficiency of the primary cache memories 124 can be improved. In this case, the data A is stored in one of the primary cache memories 124 and two secondary cache memories 134, so the reliability of data holding is assured. Since the data A is stored in one side of the primary cache memories 124, the read request for this data A can be responded to quickly.

Now the processing to delete the write target data from the primary cache memory 124 of one side of the primary cache units 120 (step S30) will be described in detail.

Figure 12:
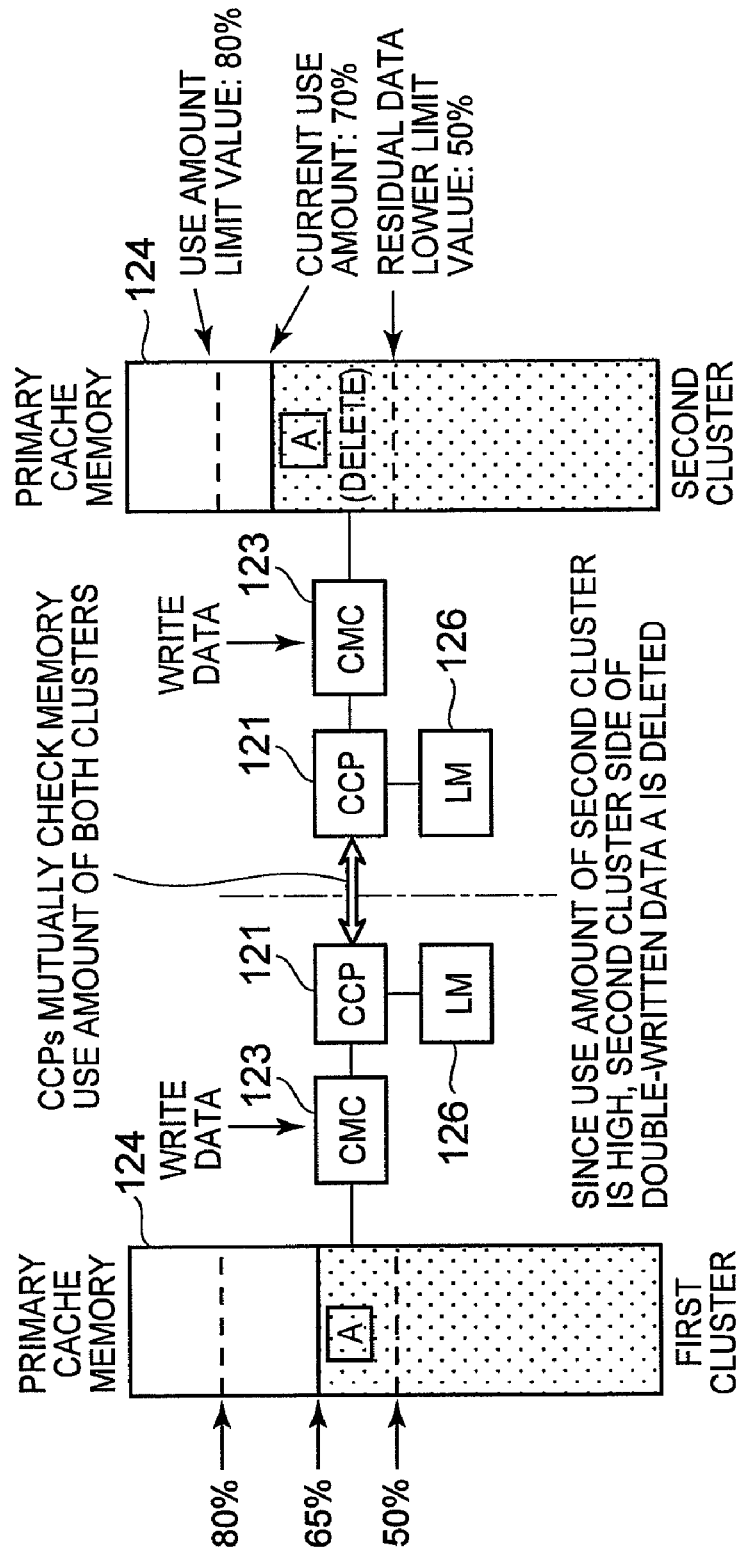
FIG. 12 is a diagram depicting the deletion of write target data of the primary cache unit according to the first embodiment of the present invention.

FIG. 12 is a diagram depicting a deletion of data from the primary cache unit according to the first embodiment of the present invention.

The CCP 121 mutually exchanges information on the memory use amount of the respective primary cache memory 124 with the CCP 121 of the primary cache unit 120 of the other cluster. And based on information on the memory use amount, which is mutually exchanged, the CCP 121 deletes write target data from the primary cache unit 120 of which memory use amount is high. For example, as shown in FIG. 12, if the use amount of the primary cache memory 124 of the first cluster 101*a* is 65% and the use amount of the primary cache memory 124 of the second cluster 101*b* is 70%, write target data is erased from the primary cache memory 124 of the second cluster 101*b* of which memory use amount is high.

Now data management processing when the write target data is sequential processing data will be described.

Figure 13:
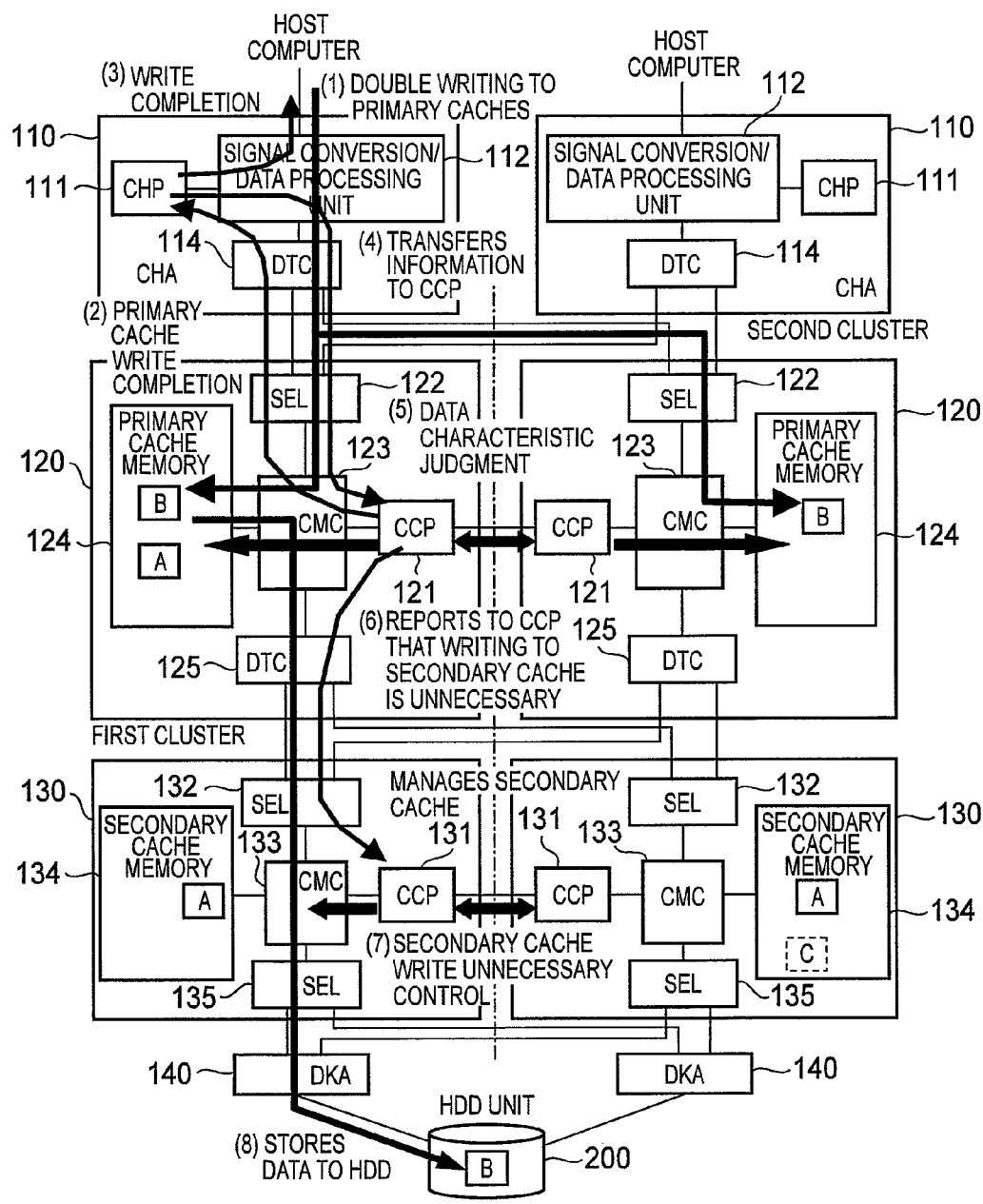
FIG. 13 is an explanatory diagram relating to sequential processing data management processing according to the first embodiment of the present invention.

FIG. 13 is an explanatory diagram relating to the sequential processing data management processing according to the first embodiment of the present invention. Now this processing will be described using the step numbers in FIG. 7 to FIG. 9.

As (1) shows, the storage system 10 double-writes the write target data (data B in FIG. 13) in the primary cache memories 124, that is, writes the data in the two primary cache memories 124 respectively. In concrete terms, the CHA 110 of the storage system 10, which received a write request (step S11), sends a normal write request to the two primary cache units 120 (step S13). The CCP 121 of each primary cache unit 120, which received the normal write request (YES in steps S21 and S22), stores the write target data B in the primary cache memories 124 (step S23). By this, the same data B is stored in the two primary cache memories 124. Then as (2) shows, the storage system 10 sends a write completion to indicate that the data B is stored in the primary cache memories 124, to the CHA 110 which sent the request (step S24). Then as (3) shows, the CHA 110, which received the write completion from both of the primary cache units 120 (step S14), sends the write processing completion notice to the host computer which sent the write request (step S17). Since the write processing completion notice is sent to the host computer when the data B is double-written to the primary cache memories 124 like this, requests from the host computer can be responded to quickly.

The CHP 111 sends information on the data capacity of the write target data and block (or track) to which the data is written, as shown in (4).

Then as (5) shows, the CCP 121 judges whether the write target data B is sequential processing data or not based on the information of the write block (step S26), and if it is judged as sequential processing data (YES in step S26), a write request to the HDD unit 200, indicating that writing to the secondary cache memory 134 is unnecessary, is sent to the CCP 131, as (6) shows (step S34).

Then as (7) shows, the CCP 131 does not write the data B to the secondary cache memory 124, but sends a write request to write the data B to the HDD unit 200, to the DKA 140 (step S46). Then as (8) shows, the DKA 140, which received the write request, stores the data B in the HDD unit 200.

In this way, if it is judged that the data is sequential processing data, the data is not written to the secondary cache memories 134, so consumption of the secondary cache memories 134 can be suppressed, and memory life can be effectively extended.

Now a primary cache unit failure processing when a failure occurred in one of the primary cache units 120 will be described.

FIG. 14A is an explanatory diagram relating to the processing when the primary cache unit failed according to the first embodiment of the present invention. In the following description, the step numbers in FIG. 7 to FIG. 9 will be used.

The CHP 111 of the CHA 110 can communicate with the primary cache units 120 of the two clusters, and can detect a failure which occurred to one of the primary cache units 120 respectively. After the occurrence of a failure is detected, the storage system 10 operates as follows.

In other words, if a write request is received (YES in step S11) when a failure occurred to the primary cache unit 120 (NO in step S12), the CHP 111 sends the write request in case of failure to the other primary cache unit 120 which does not have a failure (step S15). And the primary cache unit 120 which received the write request judges that the write request is a write request in case of failure (NO in step S22), and sends the write request to the secondary cache units 130 of the first cluster 101*a* and the second cluster 101*b* respectively (step S31). Since this is a write request to the secondary cache memory 134 (YES in step S42), the CCP 131 of each secondary cache unit 130 determines the memory module 134*a* of the secondary cache memory 134 to store the data (step S43), and stores the write target data in the memory module 134*a* of the determined secondary cache memory 134 (step S44).

Then the CCP 131 sends the write completion to the CCP 121 of the primary cache unit 120 which sent the write completion request (step S45), and the CCP 121 receives the write completion from the two secondary cache units 130 (YES in step S32), and since this means that the same data is stored in the two secondary cache units 130, the CCP 121 sends the write completion to the CHP 111 of the CHA 110 which sent the write request (step S33), and the CHP 111 sends the write processing completion notice to the host computer (step S17).

In this way, if a failure occurs to one of the primary cache units 120, the write target data is written in one primary cache memory 124 and two secondary cache memories 134. Then the write processing completion notice is sent to the host computer. Therefore even if a failure occurs to the primary cache unit 120, the write processing completion notice can be sent to the host computer after storing the data in the secondary cache units 130, so the write request from the host computer can be responded to quickly without waiting for storing the data in the HDD unit 200.

Now the secondary cache unit failure processing when a failure occurred in one of the secondary cache units 130 will be described.

FIG. 14B is an explanatory diagram relating to the processing when the secondary cache unit failed according to the first embodiment of the present invention. In the following description, the step numbers in FIG. 7 to FIG. 9 will be used.

When a failure occurred in one of the secondary cache units 130, the CHP 111 sends a write request to the CCPs 121 of each cluster 101*a* and 101*b* as usual (step S13). The CCP 121 of each cluster 101*a* and 101*b*, which received the write request (step S21), stores the write target data in the respective primary cache memory 124 (step S23), and sends the write completion to the CHP 111 (step S24).

If the write completion is received from both of the primary cache unit 120 (YES in step S14), the CHP 111 sends a write processing completion notice to the host computer (step S17).

Therefore even if a failure occurred to the secondary cache unit 130, the response to the write request is not affected.

Now a check processing of the memory module 134a when the memory module 134a of the secondary cache memory 124 has a limited rewrite count will be described.

Figure 15:
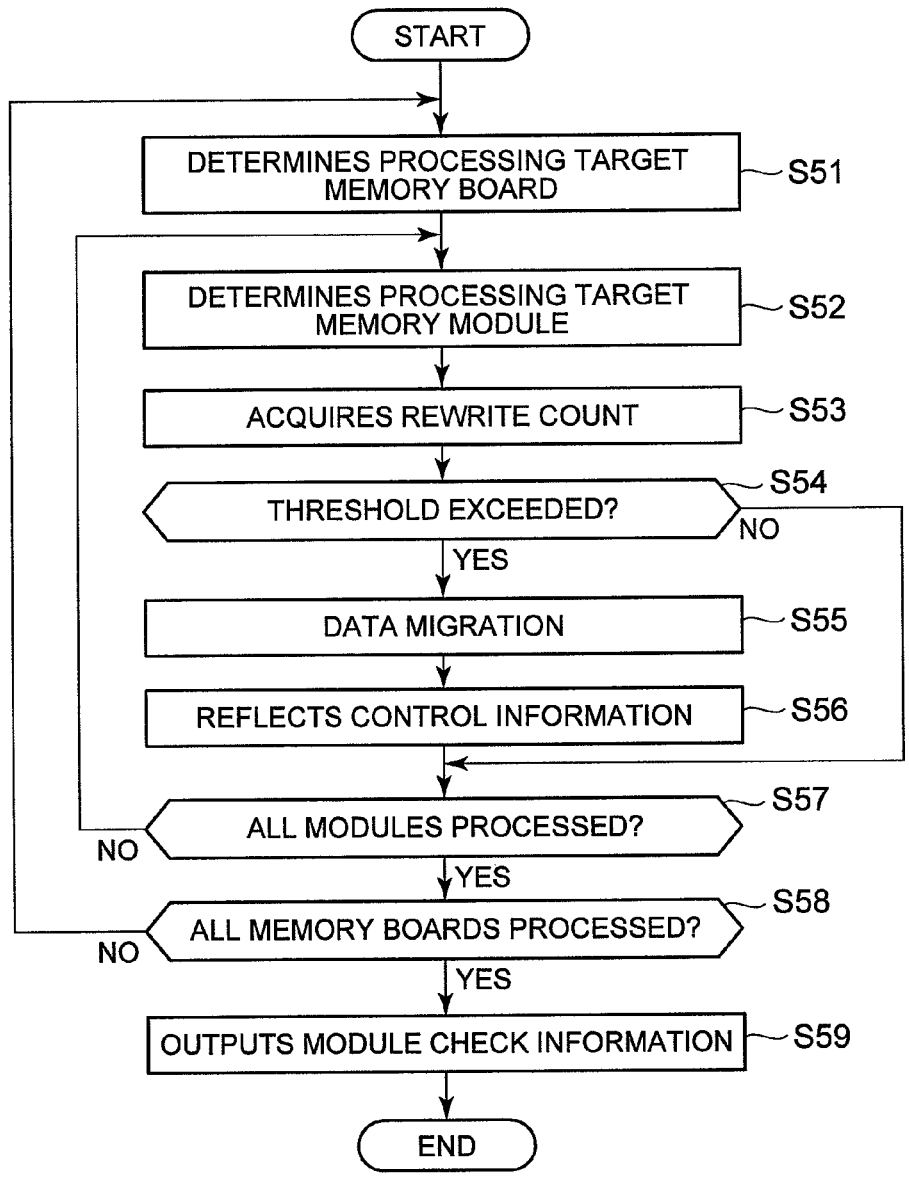
FIG. 15 is a flow chart depicting a memory module check processing according to the first embodiment of the present invention.

FIG. 15 is a flow chart depicting the memory module check processing according to the first embodiment of the present invention.

This memory module check processing is executed at predetermined times, for example. The CCP 131 of the secondary cache unit 130 determines one memory board 1310 out of the plurality of memory boards 1310 as a processing target (step S51), then determines one of the memory modules 134a of that memory board 1310 as a processing target (step S52). Then the CCP 131 acquires the rewrite count of the processing target memory module 134a from the LM 136 (step S53), and judges whether a predetermined threshold is exceeded (step S54).

If the threshold is exceeded as a result of this judgment, it means that the life of this memory module 134a may soon be over, so the CCP 131 migrates the data stored in this memory module 134a to a spare memory module 134sa which is not in use (step S55), shuts down the memory module 134a before replacement, and updates the control information of the LM 136 so that the spare memory module 134sa can operate instead of the memory module 134a (step S56). By this, the data in the memory module 134a of which life may soon be over can be transferred to the spare memory module 134sa so as to continue using the data for processing.

If the threshold is not exceeded (NO in step S54) or if the memory module is replaced with the spare memory module 134sa (step S56), on the other hand, the CCP 131 judges whether processing has been performed for all the memory modules 134a of the memory board 1310 (step S57), and executes steps S52 to S57 again if not.

If processing has been performed for all the memory modules 134a of the memory board 1310 (YES in step S57), the CCP 131 judges whether processing has been performed for all the memory modules 134a on all the memory boards 1310 (step S58), and executes steps S51 to S58 again if not.

If processing has been performed for all the memory boards 1310 (YES in step S58), the CCP 131 outputs information on the module check to a control device, which is not illustrated, for example. The information on the module check includes identification information of the memory board 1310 on which the replaced memory module 134a is mounted, and identification information of the replaced memory module 134a, for example. Based on the information on this module check, the administrator of the storage system 10 removes this memory board 1310 from the storage system 10, replaces this memory module 134a with the new memory module 134a, and installs the memory board 1310 in the storage system 10 again, then the memory board 1310 can be used again. If the storage system 10 has a configuration which allows replacement of the memory board 1310 when power is ON, the operation of the secondary cache units 130 can be continued using the memory boards 1310 other than the memory board being replaced.

Figure 16:
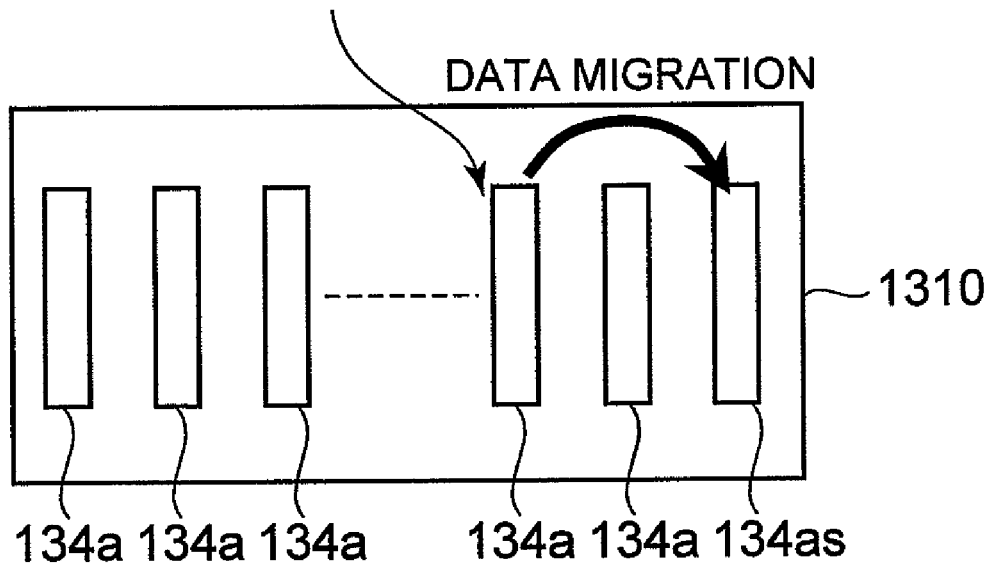
FIG. 16 is an explanatory diagram relating to a data shift to a spare memory module according to the first embodiment of the present invention.

FIG. 16 is an explanatory diagram relating to a data migration to the spare memory module according to the first embodiment of the present invention.

As FIG. 16 shows, if the processing in FIG. 15 is executed and the rewrite count of one of the memory modules 134a exceeds the threshold, the data of this memory module 134a is migrated to the spare memory module 134sa on the same memory board 1310. Therefore the data can be appropriately migrated before the memory module 134a is disabled for use.

Now processing for managing the data stored in the storage system 10 will be described.

Figure 17A:
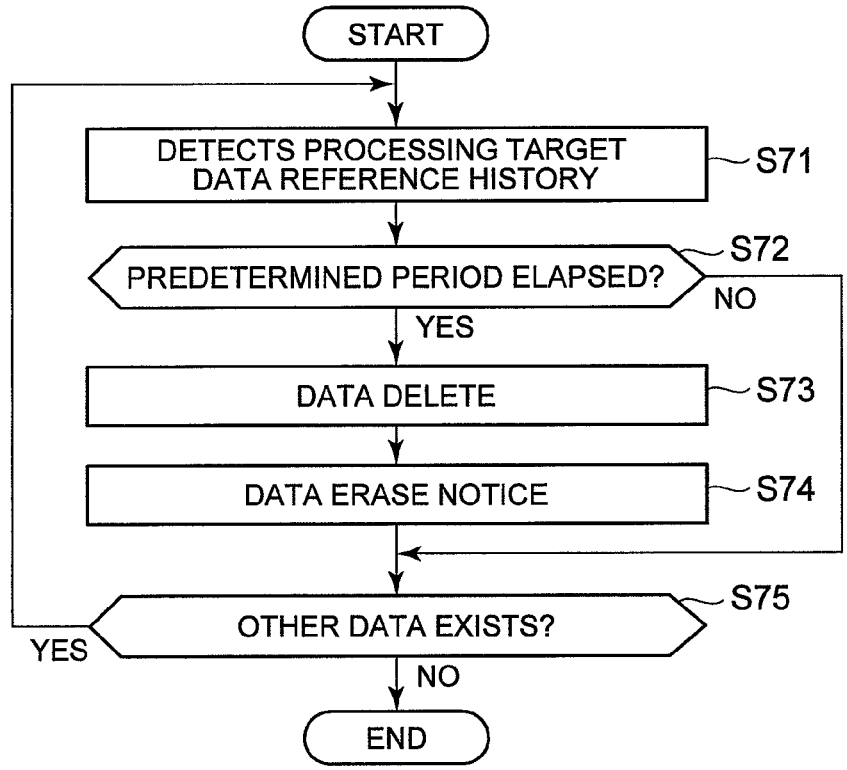
FIG. 17A is a flow chart depicting a primary cache reduction processing in the primary cache unit according to the first embodiment of the present invention.

FIG. 17A is a flow chart depicting the primary cache reduction processing in the primary cache unit according to the first embodiment of the present invention.

This primary cache reduction processing is executed at predetermined times, for example. The CCP 121 of the primary cache unit 120 acquires data from the primary cache memory 124, and detects the reference history field 304 from the additional information field 302 of this data (step S71). Then the CCP 121 acquires the latest reference date and time from the latest reference date and time field 306 of the reference history field 304, and judges whether a predetermined period has elapsed from the latest reference date and time (step S72), and if a predetermined period has elapsed, it means that this data has not been accessed for a long time, and the effect of holding this data in a cache is minor, so the CCP 121 deletes this data from the primary cache memory 124 (step S73), and sends a notice that this data is erased (data erase notice) to the secondary cache unit 130 (step S74). Here the data erase notice includes an identification information that indicates the erased, and information of the reference history field 304 of this data.

After sending the data erase notice or when a predetermined time has not elapsed for the data (NO in step S72), the CCP 121 judges whether the next processing target data exists (step S75), and continuously executes the processing in steps S71 to S75 if there is a next processing target data (YES in step S75), or ends processing if there is no other data (NO in step S75). By this processing, data is deleted from the primary cache memory 124, and the same data is stored in the two secondary cache memories 134.

According to this primary cache reduction processing, data which effect of being stored in a cache is minor can be deleted, and the free capacity of the primary cache memory 124 can be increased.

Figure 17B:
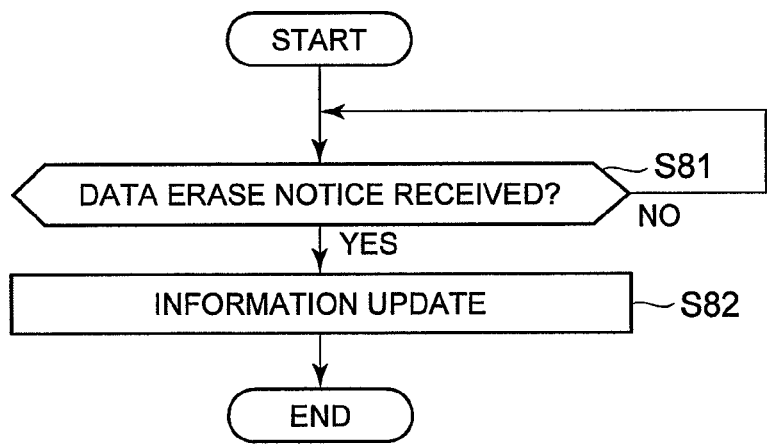
FIG. 17B is a flow chart depicting a primary cache reduction processing in the secondary cache unit according to the first embodiment of the present invention.

FIG. 17B is a flow chart depicting the primary cache reduction processing in the secondary cache unit according to the first embodiment of the present invention.

In the secondary cache unit 130, the CCP 131 judges whether a data erase notice is received from the primary cache unit 120 via the SEL 132 (step S81), and repeatedly executes step S81 if not received. If the data erase notice is received (YES in step S81), on the other hand, the CCP 131 updates the reference history field 304 of the additional information field 302 of the same data stored in the secondary cache memory 134 to the information of the reference history field 304 included in the data erase notice (step S82), and ends processing. By this, for the data in the secondary cache memory 134, the reference history of this data in the primary cache memory 124 can be appropriately transferred. In other words, the data can be managed considering the reference history in the primary cache memory 124.

Figure 18:
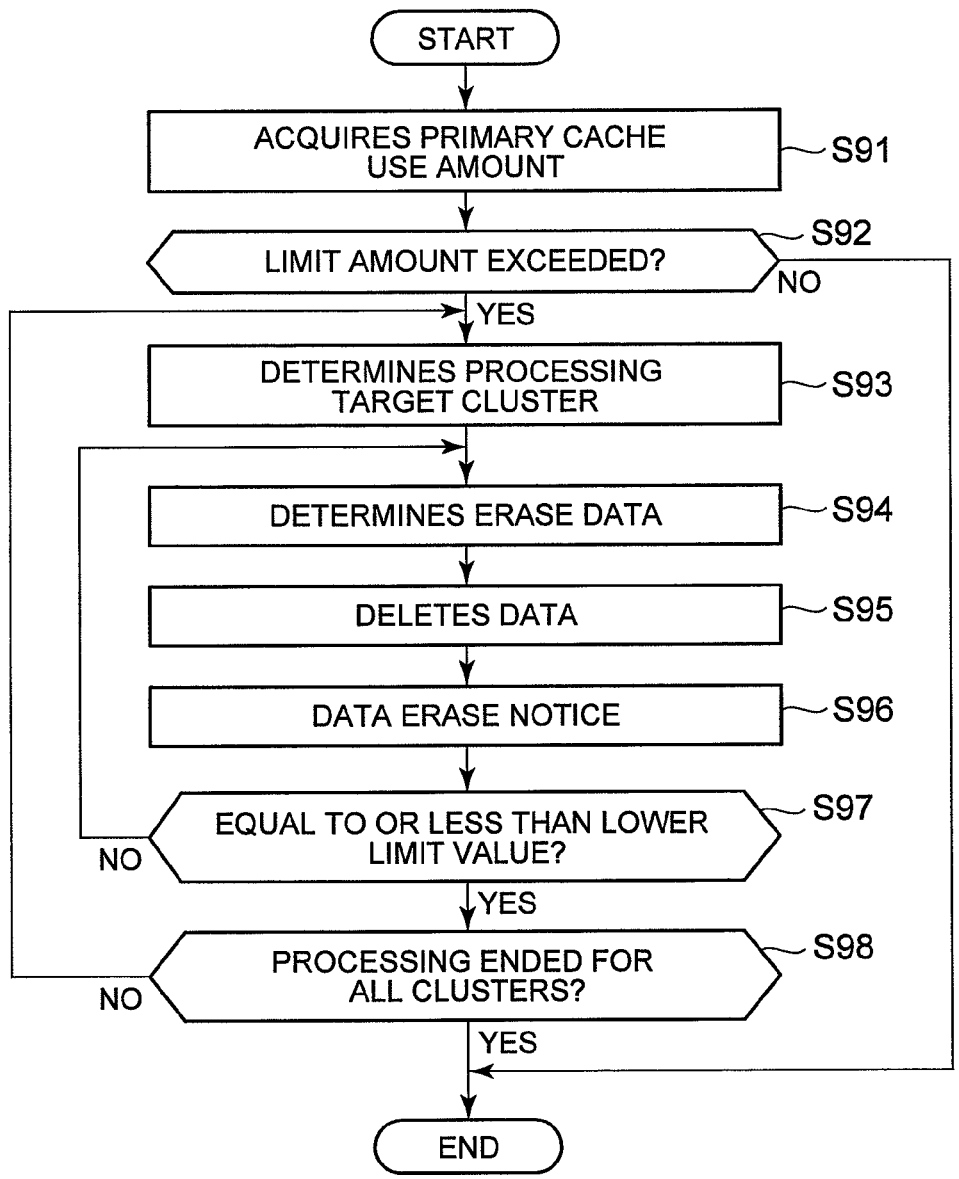
FIG. 18 is a flow chart depicting a primary cache use amount adjustment processing according to the first embodiment of the present invention.

FIG. 18 is a flow chart depicting the primary cache use amount adjustment processing according to the first embodiment of the present invention.

This primary cache use amount adjustment processing is executed at predetermined times, for example. The CCP 121 of the primary cache unit 120 communicates with the CCP 121 of the primary cache unit 120 of the other cluster, and acquires the use amount information on the primary cache memory 124 of the other primary cache unit 120 (step S91). Then the primary cache unit 120 judges whether the use amount of the primary cache memory 124 of the primary cache unit 120 of its own or other cluster exceeds a predetermined limit amount (e.g. 80% of total capacity) (step S92). If the limit amount is exceeded, the CCP 121 determines a target cluster from which the data is deleted (step S93), and determines the data to be erased from the data stored in the primary cache memory 124 of this cluster (step S94). The data to be erased is, for example, data which has not been accessed more than a predetermined period, or data of which reference count is low in a predetermined period. Then the CCP 121 deletes the determined data from the primary cache memory 124 (step S95), and sends a notice that this data is erased (data erase notice) to the secondary cache unit 130 (step S96). Here the data erase notice includes the identification information to indicate erased data and information on the reference history field 304 of this data.

Then the CCP 121 judges whether the use amount of the primary cache memory 124 of the target cluster becomes same or less than the predetermined lower limit value (step S97). If the use amount is more than the lower limit value, then the CCP 121 continuously executes processing in steps S94 to S97 to erase more data. IF the use amount is same or less than the lower limit value, on the other hand, it means that the sufficient free capacity is secured in the primary cache memory 124 of this cluster, so the CCP 121 judges whether processing for the other processing target clusters ended (step S98), and continues executing the processing in steps S93 to S98 if processing of all the processing target clusters is not ended (NO in step S98), and if processing of all the processing target clusters is ended (YES in step S98), it means that sufficient free capacity is secured for the primary cache memories 124 of all the processing target clusters, so the CCP 121 ends processing. In this way, the free capacity of the primary cache memory 124 can be appropriately increased.

Figure 19:
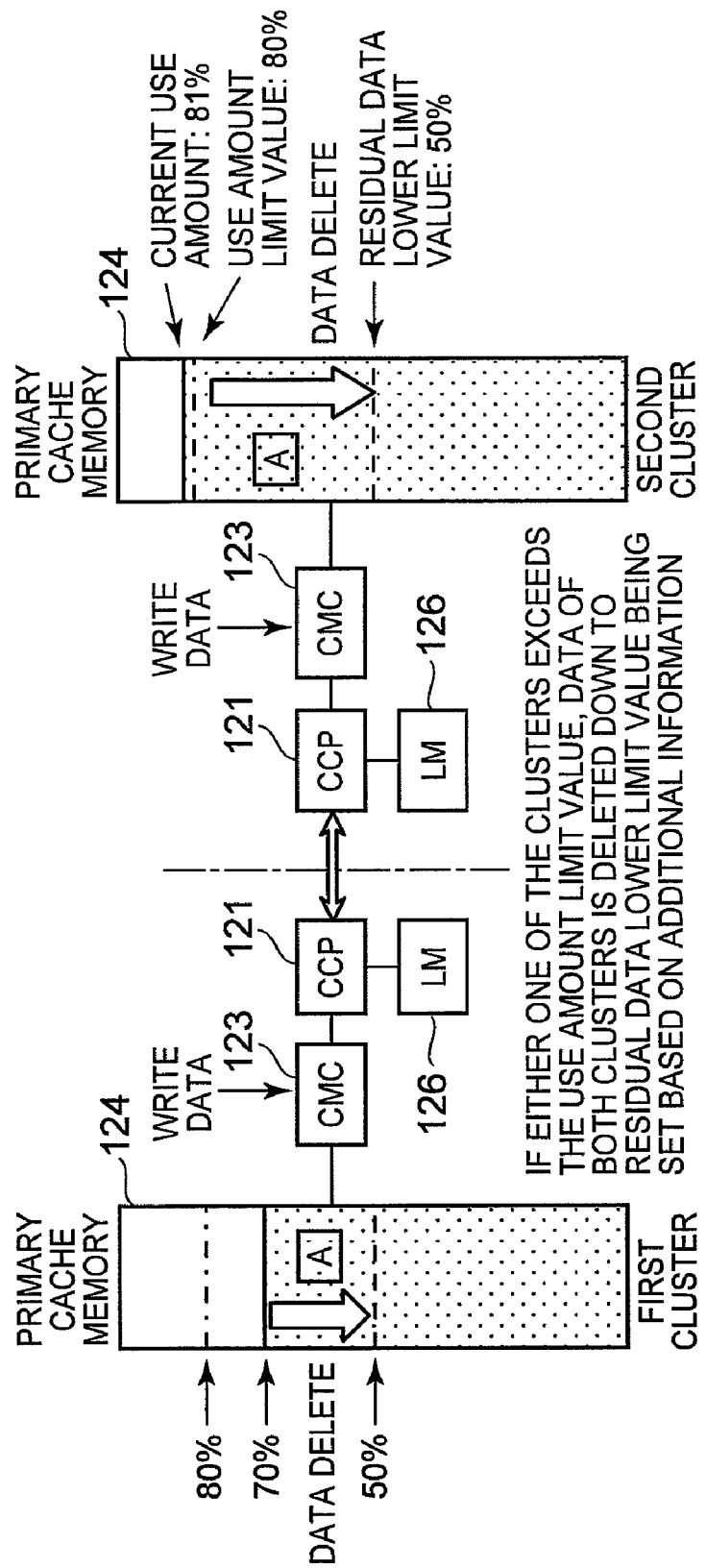
FIG. 19 is an explanatory diagram relating to a primary cache use amount adjustment processing according to the first embodiment of the present invention.

FIG. 19 is an explanatory diagram relating to the primary cache use amount adjustment processing according to the first embodiment of the present invention.

In an example in FIG. 19, the memory use amount of the primary cache memory 124 of the first cluster 101a is 70%, and the memory use amount of the primary cache memory 124 of the second cluster 101b is 81%. The use amount limit value of the primary cache memory 124 of each cluster is 80% of the total capacity, for example, and the residual data lower limit value is 50% of the total capacity, for example.

If the processing shown in FIG. 18 is executed in this storage system 10, the use amount of the primary cache memory 124 of the second cluster 101b is 81%, which exceeds the use amount limit value 80%, so the data in the primary cache memory 124 in each cluster is deleted. The data is deleted until the use amount of the primary cache memories 124 of both clusters become the residual data lower limit value 50% or less. By this, the memory use amount of the primary cache memory 124 of each cluster can be controlled to be 50% or less.

Now the first secondary cache reduction processing for data which is not stored in the primary cache memories 124, but is stored in the two secondary cache memories 134, will be described. This data corresponds to the data deleted from the primary cache memories 124 by the processing in FIG. 17A or FIG. 18, for example.

Figure 20A:
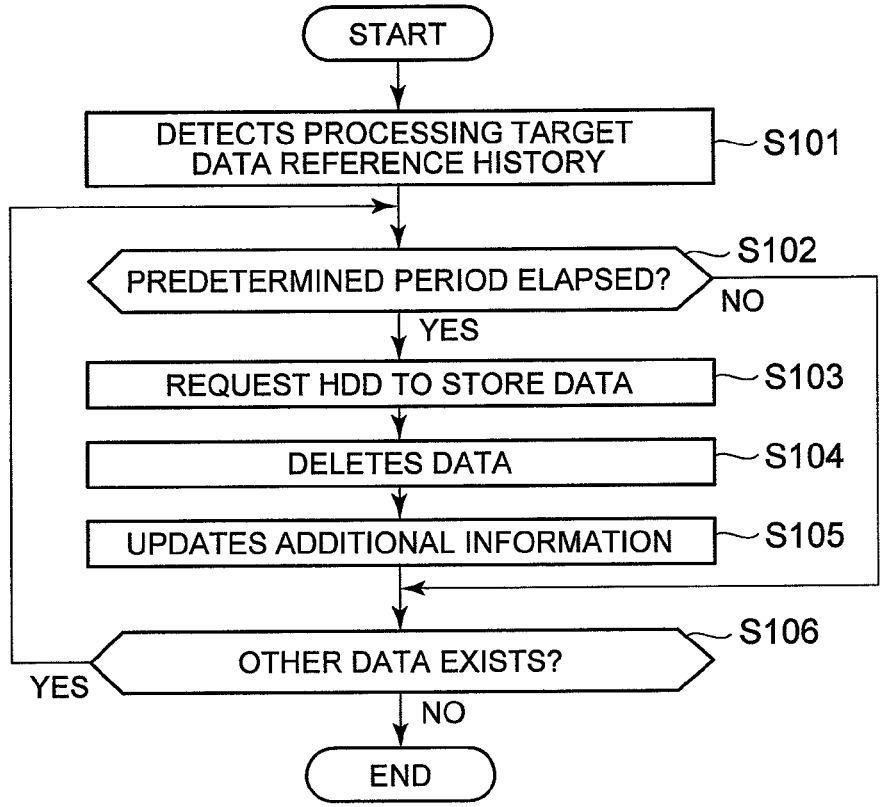
FIG. 20A is a flow chart depicting a first secondary cache reduction processing according to the first embodiment of the present invention.

FIG. 20A is a flow chart depicting a first secondary cache reduction processing according to the first embodiment of the present invention.

This first secondary cache reduction processing is executed at predetermined times, for example. The CCP 131 of the secondary cache unit 130 detects data where "0" is set in the HDD write flag 308 of the additional information field 302 of the data, from the secondary cache memory 134, that is data which is not written in the HDD, as a processing target, and also detects the reference history field 304 of this data (step S101). Then the CCP 131 acquires the latest reference date and time from the latest reference date and time field 306 of the reference history field 304, and judges whether a predetermined period has elapsed from the latest reference date and time (step S102). Here the predetermined period is a period longer than the predetermined period in the reduction processing in the primary cache memory 124 of the primary cache unit 120, for example. The predetermined period can be several hours, several days or several weeks, for example. If the predetermined period has elapsed, the CCP 131 requests to store this data in the HDD unit 200 (step S103). In the HDD unit 200, the additional information field 302 is not stored, but the data and check code of the data and check code field 301 are stored. After storing in the HDD unit 200 ends, the CCP 131 deletes this data from one of the secondary cache memories 134 (step S104), and stores the date and time written in the HDD unit 200 to the write data and time field 303 of the additional information field 302 of the same data stored in the secondary cache memory 134 of the other cluster, clears the reference history field 304, and sets "1", which indicates that this data is stored in the HDD, in the HDD write flag field 308 to update the additional information (step S105).

After updating the additional information, or when the predetermined period has not elapsed for the data (NO in step S102), the CCP 131 judges whether the next processing target data exists (step S106), and continuously executes processing in steps S101 to S106 if there is a next processing target data (YES in step S106), or ends processing if there is no other processing target data (NO in step S106). By this processing, data is deleted from one of the secondary cache memories 134 if the predetermined period elapsed from the latest reference date, and the same data is stored in one of the secondary cache memories 124 and the HDD unit 200. Therefore the free capacity of the secondary cache memory 134 can be appropriately increased.

Now a second secondary cache reduction processing for data which is stored in one of the secondary cache memories 134 and is also stored in the HDD unit 200 will be described. This data corresponds to the data deleted from one of the secondary cache memories 134 by the processing in FIG. 20A, for example.

Figure 20B:
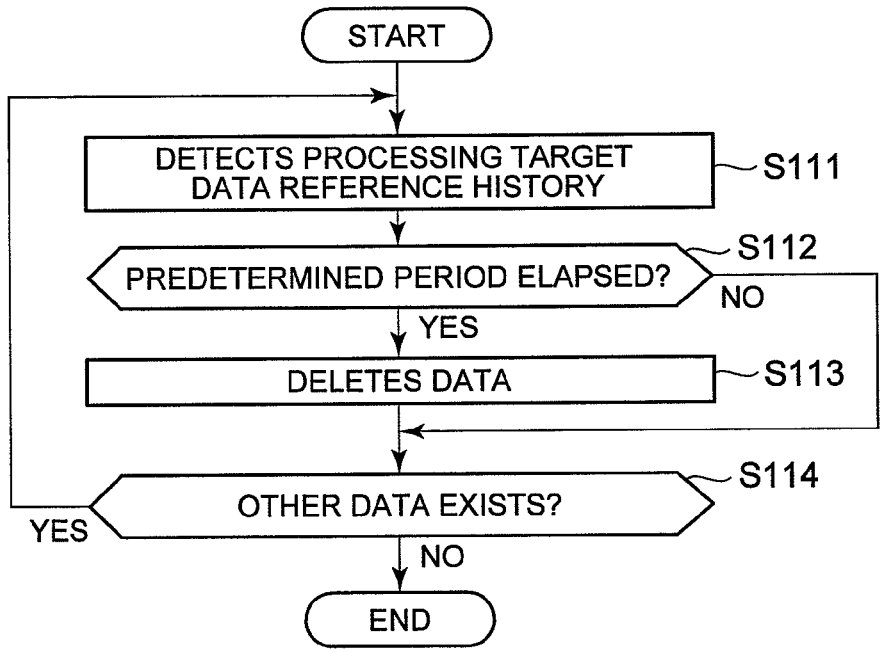
FIG. 20B is a flow chart depicting a second secondary cache reduction processing for data stored in an HDD unit.

FIG. 20B is a flow chart depicting a second secondary cache reduction processing for the data stored in the HDD unit.

This second secondary cache reduction processing is executed at predetermined times, for example. The CCP 131 of the secondary cache unit 130 detects data where "1" is set in the HDD write flag 308 of the additional information field 302 of the data, that is data which is written in the HDD unit 200, from the secondary cache memory 134, as a processing target, and also detects the reference history field 304 of this data (step S111). Then the CCP 131 acquires the latest reference date and time from the latest reference date and time field 306 of the reference history field 304, and judges whether a predetermined period has elapsed from the latest reference date and time (step S112). If the predetermined period has elapsed, it means that the data has not been referred to for the predetermined time since it was stored in the HDD unit 200, so the CCP 131 deletes this data from the secondary cache memory 134 (step S113).

After deleting data or when the predetermined period has not elapsed for the data (NO in step S112), the CCP 131 judges whether the next processing target data exists (step S114), and continuously performs processing in steps S111 to S114 if there is a next processing target data (YES in step S114), or ends processing if there is no other data (NO in step S114). By this processing, data which has not been referred to for the predetermined period after being stored in the HDD unit 200 is deleted from the secondary cache memory 124, and is stored only in the HDD unit 200. By this, the free area of the secondary cache memory 124 can be increased.

Figure 21:
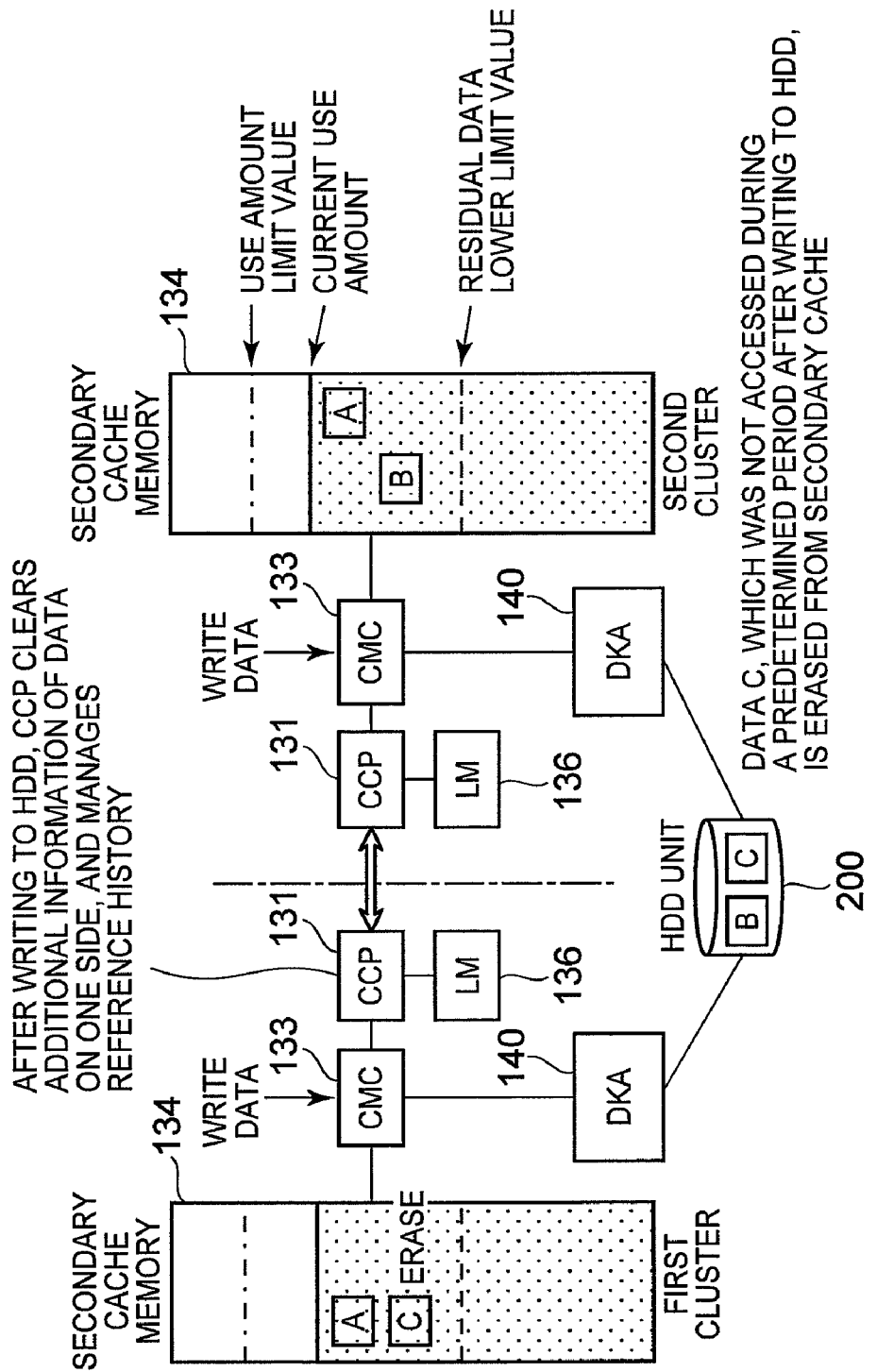
FIG. 21 is an explanatory diagram relating to a secondary cache reduction processing according to the first embodiment of the present invention.

FIG. 21 is an explanatory diagram relating to the second secondary cache reduction processing according to the first embodiment of the present invention.

In the case when data C is stored in the first cluster 101a and is also stored in the HDD unit 200, as shown in FIG. 21, if the data C has not been referred to for a predetermined period after being stored in the HDD unit 200, the data C is erased from the secondary cache memory 134 by the processing shown in FIG. 20B. By this, the free area of the secondary cache memory 124 can be appropriately increased.

Figure 22:
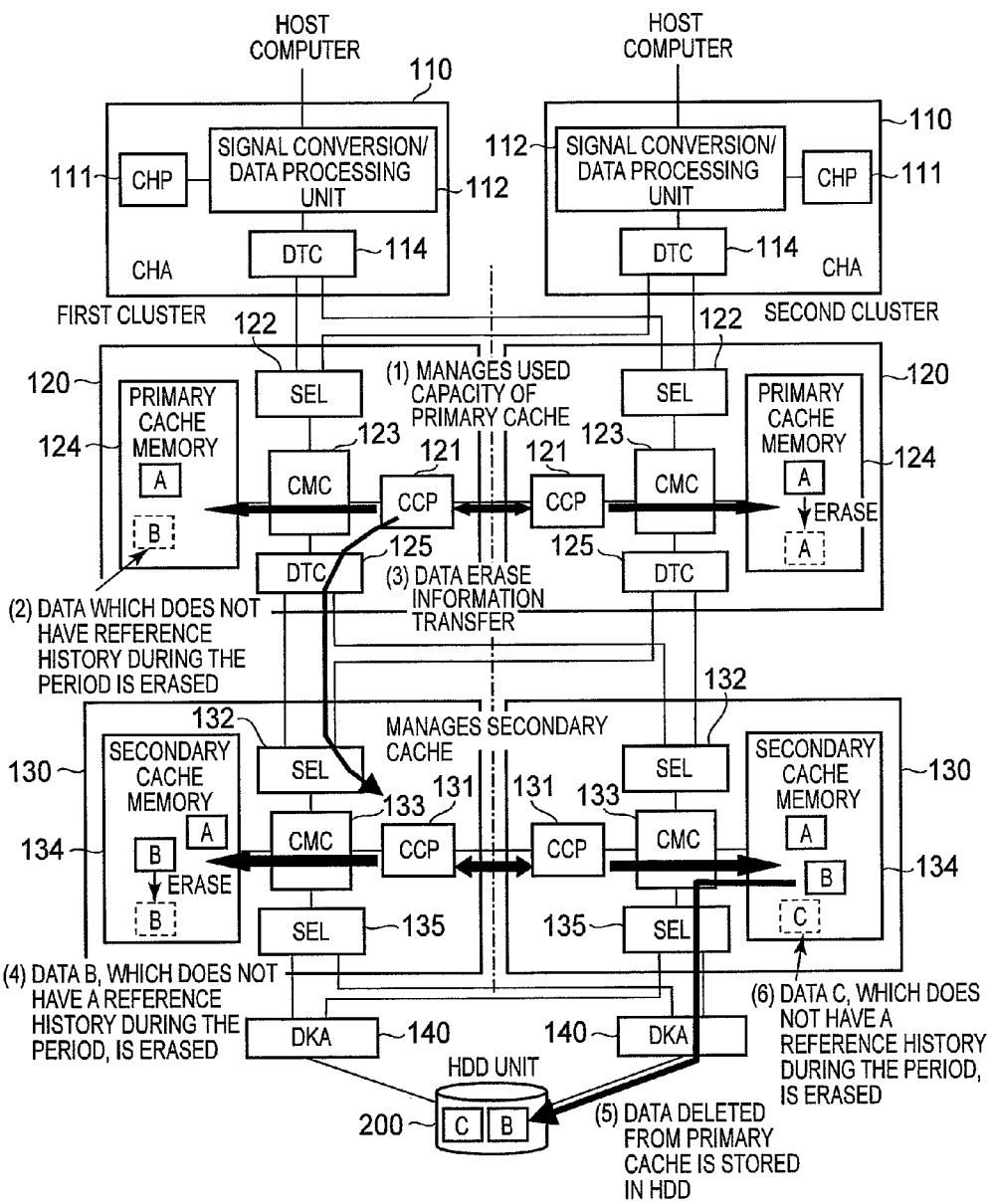
FIG. 22 is an explanatory diagram relating to a data management processing according to the first embodiment of the present invention.

FIG. 22 is an explanatory diagram relating to the data management processing according to the first embodiment of the present invention. In the following description, the step numbers in FIG. 17A, FIG. 17B, FIG. 18, FIG. 20A and FIG. 20B will be used.

In the storage system 10, the CCPs 121 manage the use amount of the primary cache memories 124 between each cluster, as shown in (1). And as shown in (2), if the use amount of one of the primary cache memories 124 exceeds a predetermined limit value, or if the data which has not been referred to even after the predetermined period has elapsed exists, the CCP 121 erases the data which has not been referred to even after the predetermined period has elapsed (data B in FIG. 22) (steps S73 and S95). Then as (3) shows, the CCP 121 sends a data erase notice to the CCP 131 (steps S74 and S96), and the CCP 131 updates the reference history of the same data in the secondary cache memories 134 based on the reference history in the primary cache memory 124 included in the data erase notice (step S82). In this state, the data B is stored in the two secondary cache memories 134.

If the data B is not referred to even if the predetermined period elapsed even more, the CCP 131 erases the data B from the secondary cache memory 134 as (4) shows (step S104), and stores the data B in the HDD unit 200, as shown in (5) (step S103).

For the data C, which is stored in the HDD unit 200 and is stored in one of the secondary cache memories 134, on the other hand, the CCP 131 deletes the data C from the secondary cache memory 134 if the data C is not referred to even if the predetermined period is elapsed after being stored in the HDD unit 200, as shown in (6) (step S113).

Figure 23:
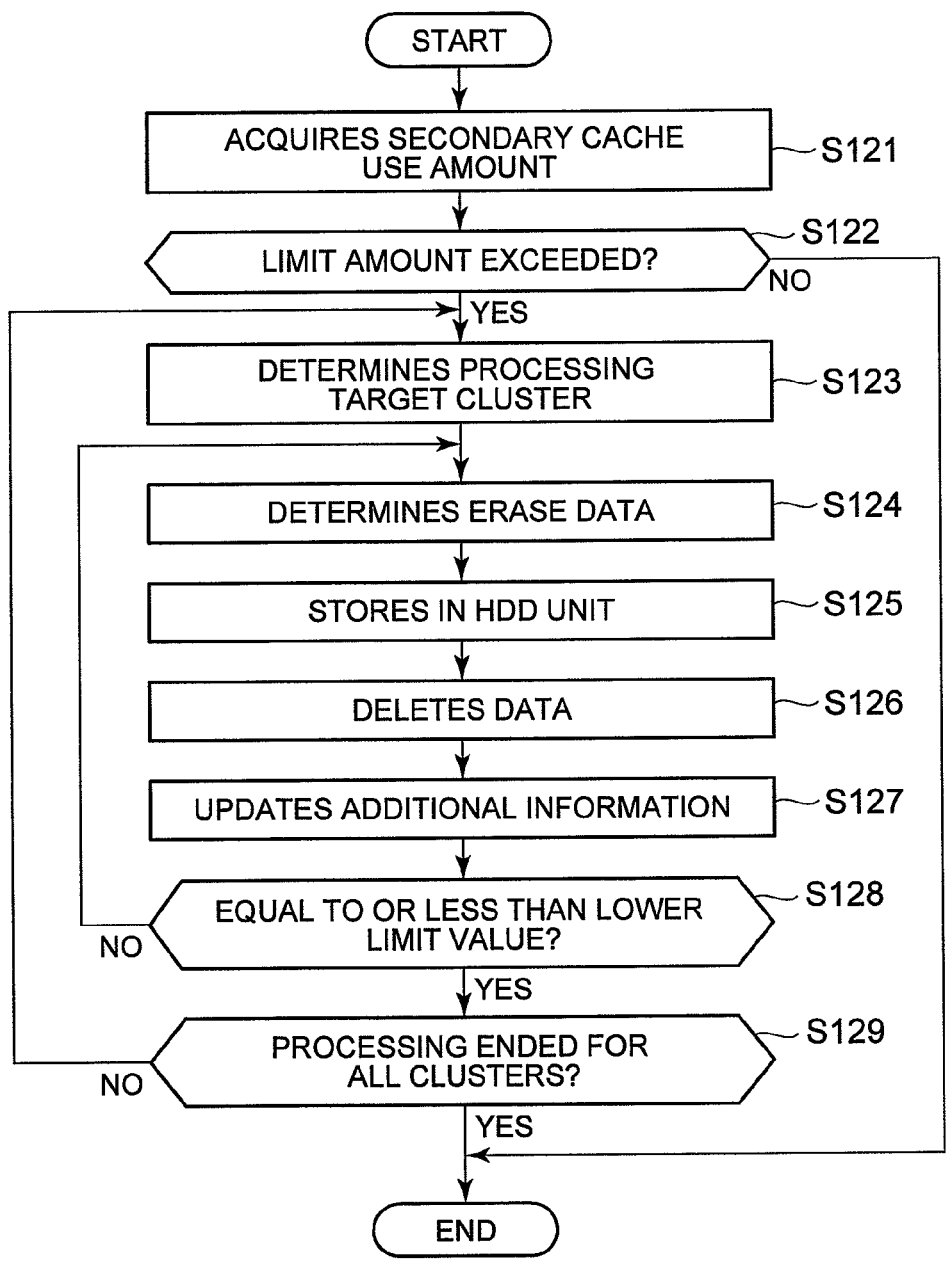
FIG. 23 is a flow chart depicting a secondary cache use amount adjustment processing according to the first embodiment of the present invention.

FIG. 23 is a flow chart depicting the secondary cache use amount adjustment processing according to the first embodiment of the present invention.

The secondary cache use amount adjustment processing is executed at predetermined times, for example. The CCP 131 of the secondary cache unit 130 communicates with the CCP 131 of the secondary cache unit 130 of the other cluster, and acquires the use amount information of the secondary cache memory 134 of the other secondary cache unit 130 (step S121). Then the CCP 131 of the secondary cache unit 130 judges whether the use amount of the secondary cache memory 134 of the secondary cache unit 130 of its own or other cluster exceed a predetermined limit amount (e.g. 80% of the total capacity) (step S122). If the limit amount is exceeded, the CCP 131 determines a target cluster from which the data is deleted (step S123), and determines the data to be erased from the data stored in the secondary cache memory 134 of this cluster (step S124). The data to be erased is, for example, data which has not been referred to for a predetermined period or more, or data of which reference count is low in a predetermined period. Then the CCP 131 sends a request to store the determined data in the HDD unit 200 (step S125). In the HDD unit 200, the additional information field 302 is not stored, and the data and check code of the data and check code field 301 are stored. After storing the data in the HDD unit 200 ends, the CCP 131 deletes the determined data from one of the secondary cache memories 134 (step S126), and stores the date and time written in the HDD unit 200 to the date and time of writing field 303 of the additional information field 302 of the same data stored in the secondary cache memory 134 of the other cluster, clears the reference history field 304, and sets "1" in the HDD write flag field 308 to update the additional information (step S127).

Then the CCP 131 judges whether the use amount of the secondary cache memory 134 of the target cluster became same or less than the predetermined lower limit value (step S128), and continuously executes the processing in steps S124 to S128 to erase more data if more than the lower limit value, and if same or less than the lower limit value, on the other hand, it means that a sufficient free capacity is secured in the secondary cache memory 134 of this cluster, so the CCP 131 judges whether processing for the other processing target clusters ended (step S129), and continues executing the processing in steps S123 to S129 if the processing of all the processing target clusters is not ended (NO in step S129), and if the processing of all the processing target clusters is ended (YES in step S129), it means that a sufficient free capacity is secured for the secondary cache memory 134 of all the processing target clusters, so the CCP 131 ends processing.

Figure 24:
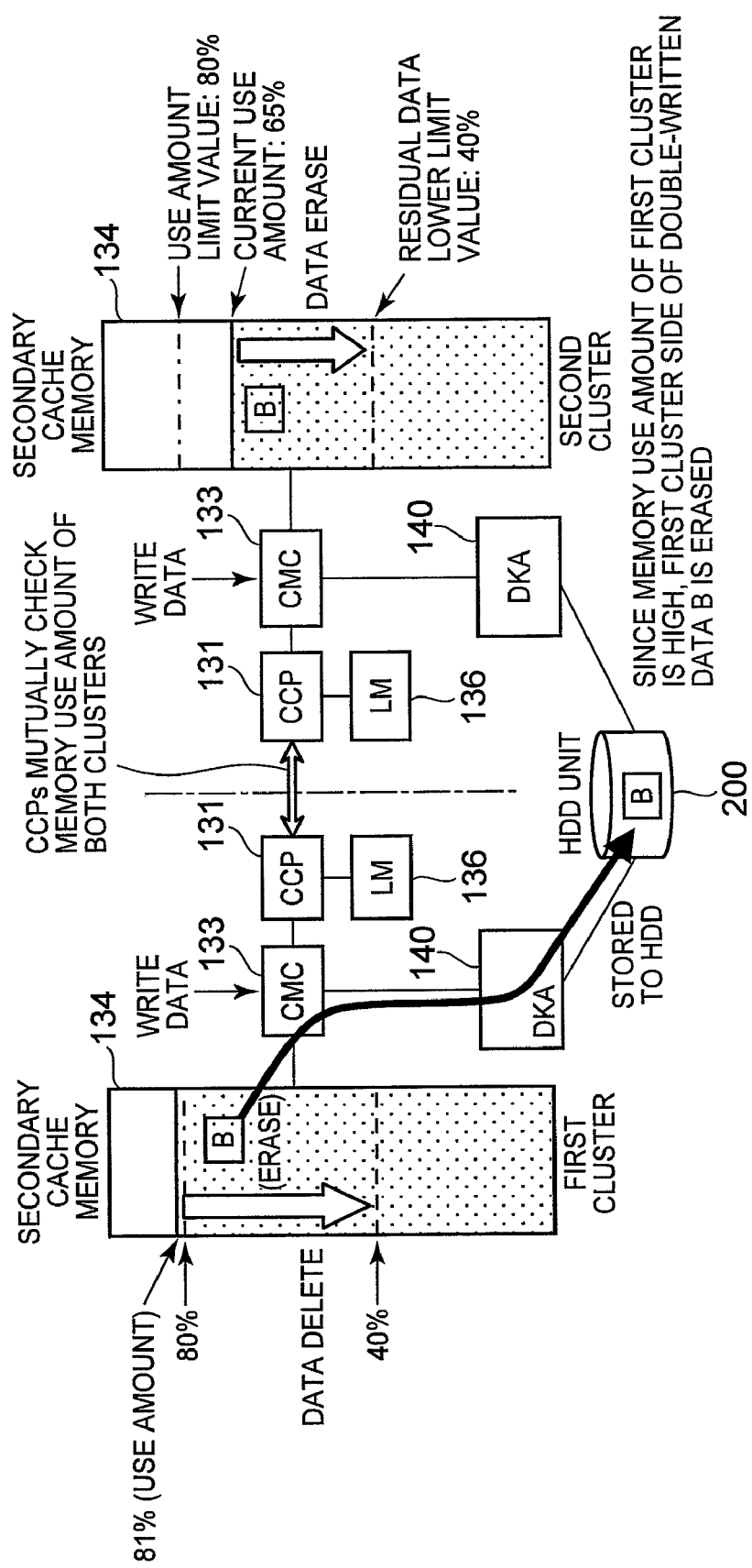
FIG. 24 is a diagram depicting a secondary cache use amount adjustment processing according to the first embodiment of the present invention.

FIG. 24 is a diagram depicting the secondary cache use amount adjustment processing according to the first embodiment of the present invention.

In an example in FIG. 24, the memory use amount of the secondary cache memory 134 of the first cluster 101a is 81%, and the memory use amount of the secondary cache memory 134 of the second cluster 101b is 65%. The use amount limit value is 80% of the total capacity, for example, and the residual data lower limit value is 40% of the total capacity, for example.

If the processing shown in FIG. 23 is executed in this storage system 10, the use amount of the secondary cache memory 134 of the first cluster 101a is 81%, which exceeds the use amount limit value of 80%, so the data in the secondary cache memory 134 in each cluster is deleted. The data is deleted until the use amount of the secondary cache memories 134 of both clusters become the residual data amount lower limit value 40% or less. By this, the memory use amount of the secondary cache memory 134 of each cluster can be controlled to be 40% or less.

Now a processing when a read request is received in the storage system 10 according to the first embodiment of the present invention will be described.

FIG. 25 is a flow chart depicting the processing when a read request is received in the channel adapter according to the first embodiment of the present invention.

In the CHA 110, the CHP 111 judges whether a read request is received from the host computer via the signal conversion/data processing unit 112 (step S131), and repeatedly executes step S131 if not received. If the read request is received, the CHP 111 sends the read request to the primary cache unit(s) 120 of the first cluster 101a and/or the second cluster 101b (step S132).

Then the CHP 111 judges whether a read target data (read data) is received from the primary cache unit 120 (step S133), and repeatedly executes step S133 until the read data is received. If the read data is received from the primary cache unit 120, the CHP 111 sends the read data to the host computer which sent the read request via the signal conversion/data processing unit 112 (step S134). By this, the host computer can perform various processings using the read data.

Figure 26A:
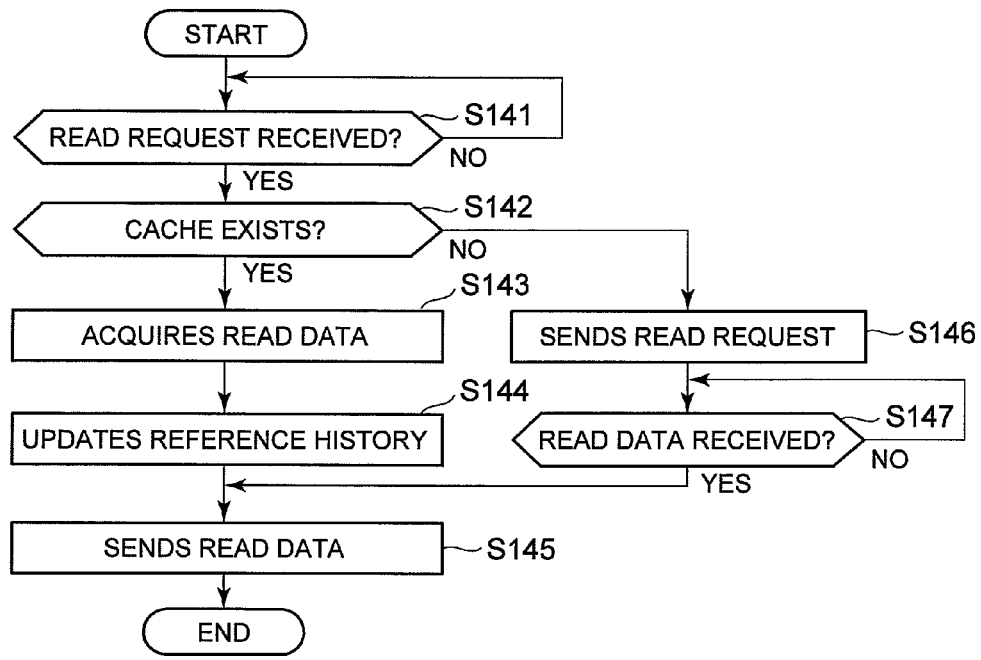
FIG. 26A is a flow chart depicting a processing when a read request is received in the primary cache unit according to the first embodiment of the present invention.

FIG. 26A is a flow chart depicting the processing when a read request is received in the primary cache unit according to the first embodiment of the present invention.

In the primary cache unit 120, the CCP 121 judges whether a read request is received from the CHA 110 via the SEL 122 (step S141), and repeatedly executes step S141 if not received. If the read request is received, on the other hand, the CCP 121 judges whether the read data is stored in the primary cache memory 124 or not, that is whether the read data is cached or not, based on the data identification information included in the read request (step S142). Whether the read data is stored in the primary cache memory 124 or not can be judged depending on whether the address of the primary cache memory 124 is stored corresponding to the data identification information included in the read request in the LM 126. Whether the read data is stored or not may also be judged by referring to the data identification information in the data and check code field 301 of the data stored in the primary cache memory 124.

If the read data is cached as a result of this judgment, the CCP 121 acquires the read data from the primary cache memory 124 (step S143), and updates the reference history of the read data stored in the primary cache memory 124 (step S144). In concrete terms, the CCP 121 adds "1" to the reference count of the reference count field 305 of the additional information field 302 of the read data stored in the primary cache memory 124, and stores the current date and time in the latest reference date and time field 306.

Then the CCP 121 sends the read data to the CHA 110 which sent the request (step S145), and ends the processing.

If the read data is not cached in the primary cache memory 124 (NO in step S142), on the other hand the CCP 121 sends the read request to the secondary cache unit(s) 130 of the first cluster 101*a* and/or the second cluster 101*b* (step S146). Then the CCP 121 judges whether the read data is received from the secondary cache unit 130 (step S147), and repeatedly executes step S147 until the read data is received. If the read data is received from the secondary cache unit 130, the CCP 121 sends the read data to the CHA 110 (step S145), and ends the processing.

Figure 26B:
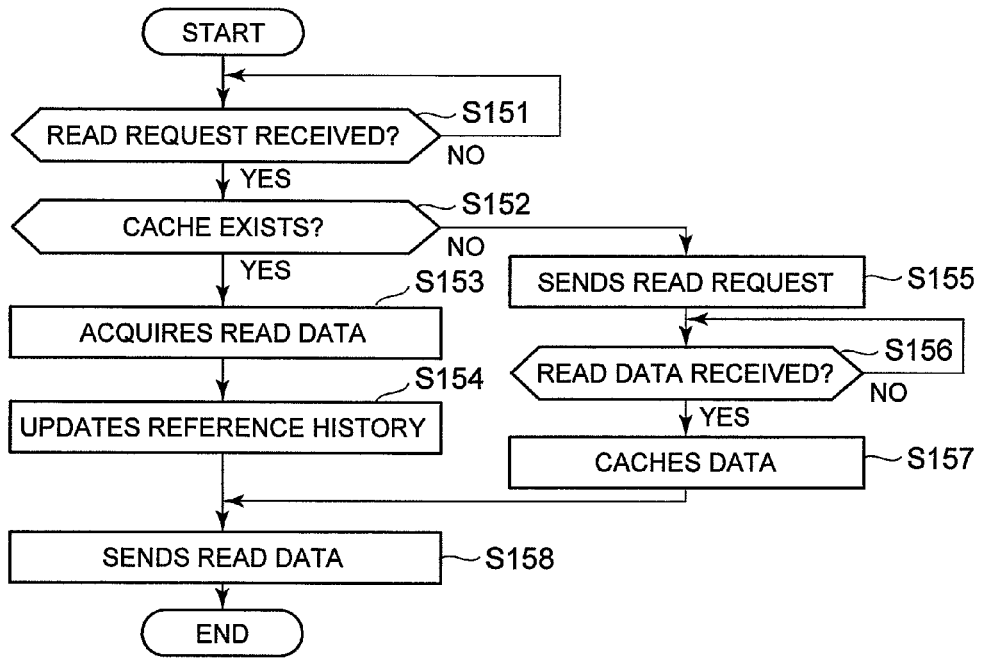
FIG. 26B is a flow chart depicting a processing when a read request is received in the secondary cache unit according to the first embodiment of the present invention.

FIG. 26B is a flow chart depicting the processing when a read request is received in the secondary cache unit according to the first embodiment of the present invention.

In the secondary cache unit 130, the CCP 131 judges whether a read request is received from the primary cache unit 120 via the SEL 132 (step S151), and repeatedly executes step S151 if not received. If the read request is received, on the other hand, the CCP 131 judges whether the read data is stored or not in the secondary cache memory 134, that is whether the read data is cached or not, based on the data identification information included in the read request (step S152). Whether the read data is stored or not in the secondary cache memory 134 can be judged depending on whether the address of the secondary cache memory 134 is stored corresponding to the data identification information included in the read request in the LM 136. Whether the read data is stored or not may also be judged by referring to the data identification information in the data and check code field 301 of the data stored in the secondary cache memory 134.

If the read data is cached as a result of this judgment, the CCP 131 acquires the read data from the secondary cache memory 134 (step S153), and updates the reference history of the read data stored in the secondary cache memory 124 (step S154). In concrete terms, the CCP 131 adds "1" to the reference count of the reference count field 305 of the additional information field 302 of the read data stored in the secondary cache memory 134, and stores the current date and time in the latest reference date and time field 306.

Then the CCP 131 sends the read data to the primary cache unit 120 (step S158), and ends the processing.

If the read data is not cached in the secondary cache memory 134 (NO in step S152), on the other hand, the CCP 131 sends the read request to the DKA 140 of the first cluster 101*a* and/or the second cluster 101*b* (step S155). By this, the DKA 140 reads the read data from the HDD unit 200, and sends it to the secondary cache unit 130.

Here the CCP 131 judges whether the read data is received from the DKA 140 (step S156), and repeatedly executes step S156 until the read data is received. If the read data is received from the DKA 140 (YES in step S156), the CCP 131 stores the read data in the secondary cache memory 134 (step S157). In the present embodiment, the CCP 131 stores the read data in the secondary cache memory 134 of the cluster of which the memory use amount of the secondary cache memory 134 is less. The read data is stored based on the data format in FIG. 2. In concrete terms, the stored date and time is stored in the date and time field of writing 303, "1" is stored in the reference count field 305, the cached date and time is stored in the latest reference date and time field 306, and "1", which indicates that the data is stored from the lower side, is stored in the read flag 307. Since the data is cached in the secondary cache memory 134, the probability of data being cached, that is the cache hit ratio, can be improved.

Then the CCP 131 sends the read data received from the DKA 140 to the primary cache unit 120 (step S158), and ends the processing.

Figure 27:
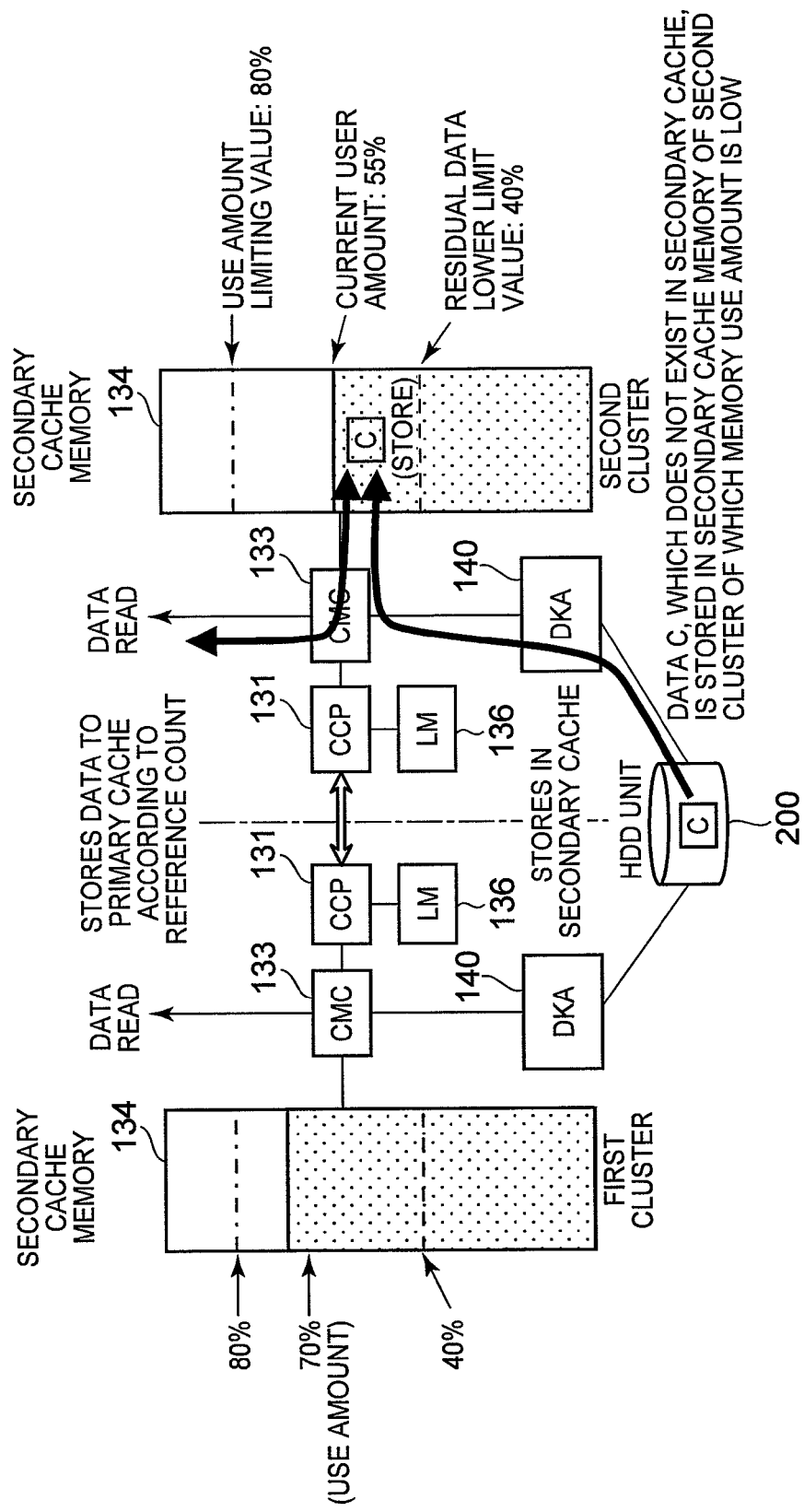
FIG. 27 is an explanatory diagram relating to a processing when a read request is received according to the first embodiment of the present invention.

FIG. 27 is an explanatory diagram relating to the processing when a read request is received according to the first embodiment of the present invention. In this description, the step numbers in FIG. 25, FIG. 26A and FIG. 26B will be used.

FIG. 27 is a diagram depicting the processing when a read request is received when a read request for data, which is not stored in the primary cache memories 124 and the secondary cache memories 134 and is stored in the HDD unit 200 (data C in FIG. 27), is received.

When a read request for data which is stored only in the HDD unit 200 is received, a read request is sent from the CHP 111 to the primary cache unit 120 (step S132). Since the read data is not cached in the first cache memory 124 (NO in step S142), the CCP 121 sends the read request to the secondary cache unit 130 (step S146).

Since the read data is not cached in the secondary cache memory 134 of the secondary cache unit 130 either (NO in step S152), the read request is sent to the DKA 140 (step S155), the DKA 140 reads the read data from the HDD unit 200, and sends it to the secondary cache unit 130. The CCP 131 of the secondary cache unit 130 which received the read data stores the read data in the secondary cache memory 134 of the cluster of which the memory use amount of the secondary cache memory 134 is less, the second cluster 101*b* in the case of FIG. 27 (step S157), and sends the read data to the primary cache unit 120 (step S158). The CCP 121 of the primary cache unit 120 sends the received read data to the CHA 110 (steps S147 and S145), and the CHP 111 of the CHA 110 sends the received read data to the host computer which sent the request (steps S133 and S134).

Now the upper storage processing on the management of the data which is read from the HDD unit 200 and is stored in the secondary cache memory 134 will be described. In this upper storage processing, the data stored in the secondary cache memory 134 is stored in the primary cache memory 124 according to the reference frequency.

Figure 28:
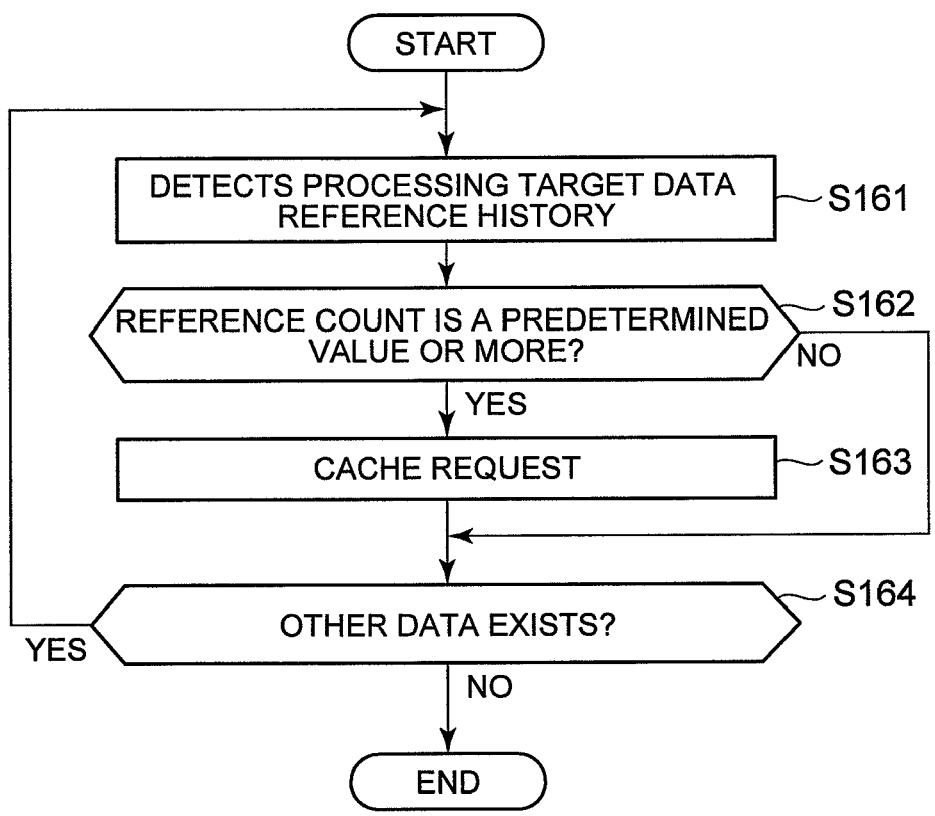
FIG. 28 is a flow chart depicting an upper storage processing according to the first embodiment of the present invention.

FIG. 28 is a flow chart depicting the upper storage processing according to the first embodiment of the present invention.

This upper storage processing is executed at predetermined times, for example. The CCP 131 of the secondary cache unit 130 detects data where "1" is set in the read flag 307 of the additional information field 302 of the data, that is data which is read from the HDD unit 200 and is stored in the secondary cache memory 134, from the secondary cache memory 134 as a processing target, and also detects the reference history field 304 of this data (step S161). Then the CCP 131 acquires the reference count from the reference count field 305 of the reference history field 304, and judges whether the reference count is more than a predetermined value (step S162). If the reference count is more than a predetermined value as a result of this judgment, the CCP 131 sends a request to cache this data in the primary cache memory 124 to the primary cache unit 120 (step S163). By this, the CCP 121 of the primary cache unit 120 which received the cache request stores this data in the primary cache memory 124.

After sending the cache request or when the reference count of the data is not more than the predetermined value (NO in step S162), the CCP 131 judges whether other data exists (step S164), and continuously executes processing in steps S161 to S164 if there is other data (YES in step S164), and ends the processing if there is no other data (NO in step S164). By this processing, the data which is stored in the secondary cache memory 134 and which was referred to for a predetermined count or more is also stored in the primary cache memory 124. By this, a read request from the host computer for this data can be responded to quickly.

Now the data save processing of the storage system 10 when a power failure occurred or when the storage system is stopped will be described.

Figure 29A:
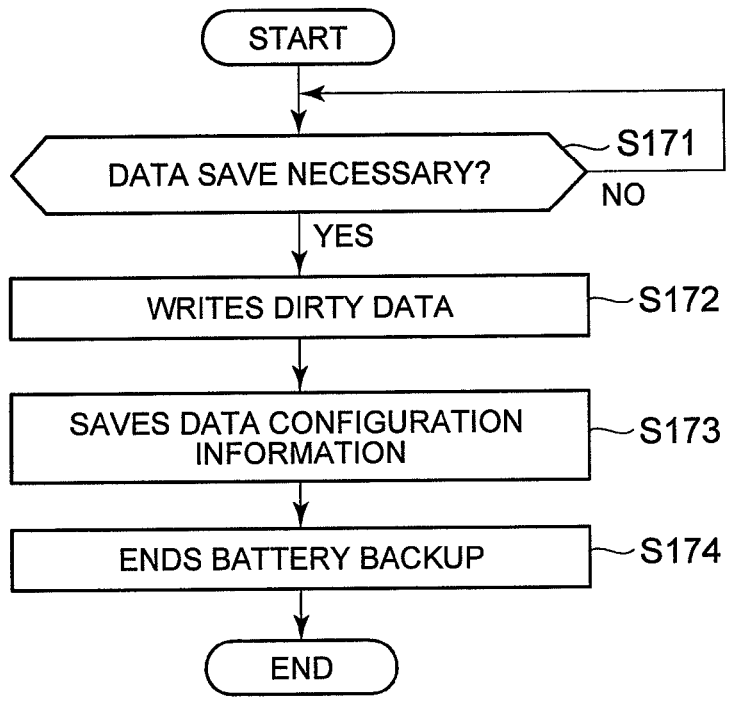
FIG. 29A is a flow chart depicting a data save processing according to the first embodiment of the present invention.

FIG. 29A is a flow chart depicting the data save processing according to the first embodiment of the present invention.

The CCP 121 of the primary cache unit 120 judges whether data save is necessary (step S171). Data save is necessary when a power failure occurred or when the storage system is stopped, for example. Stopping the storage system, for example, can be judged by whether the current time is the time to stop the storage system. A power failure can be judged by whether the power supplied from the external power supply is stopped.

If data save is not necessary (NO in step S171) as a result of this judgment, the CCP 121 repeatedly executes step S171, and if data save is necessary (YES in step S171), the CCP 121 detects data which is not reflected in the secondary cache memory 134 on the primary cache memory 124, and sends a request to write this data to the secondary cache memory 134 to the secondary cache unit 130 (step S172). By this, this data is stored in the secondary cache memory 134 by the CCP 131 of the secondary cache unit 130. Also the CCP 121 acquires the data configuration information on the data stored in the primary cache memory 124 from the LM 126, and sends a write request to store the data configuration information to the secondary cache memory 134 (step S173). By this, this data configuration information is stored in the secondary cache memory 134 by the CCP 131 of the secondary cache unit 130.

Then the CCP 121 notifies the battery 400 that data save ended, and ends backup by the battery 400 (step S174).

In this way, data loss can be prevented by saving the data in the primary cache memory 124 to the secondary cache memory 134, so data can be saved in a shorter time compared with the case of saving data in the primary cache memory 124 to the HDD unit 200. After saving the data, power need not be supplied to the primary cache unit 120 and the secondary cache unit 130 by the battery 400. Therefore the power capacity of the battery 400 can be kept low and cost can be decreased.

Figure 30A:
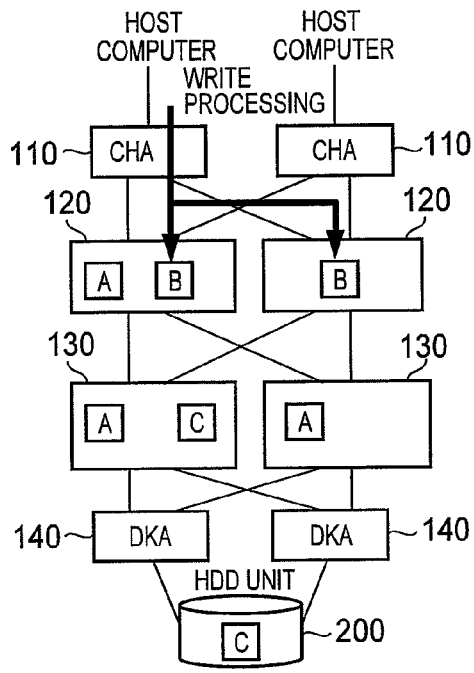
FIG. 30A is an explanatory diagram relating to a data save processing according to the first embodiment of the present invention.
Figure 30B:
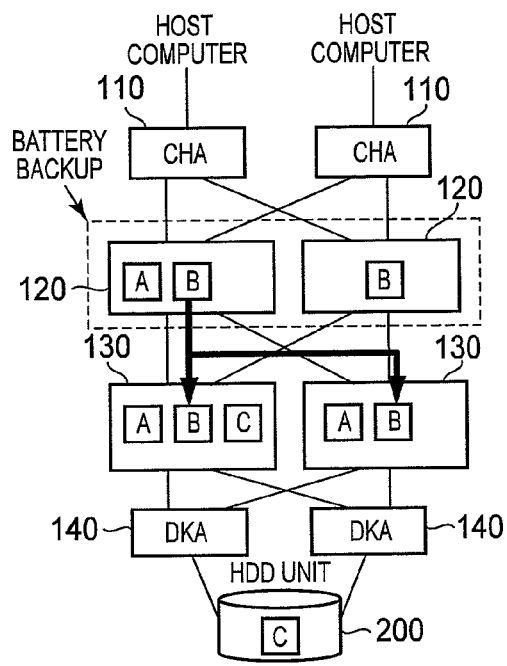
FIG. 30B is a second explanatory diagram relating to a data save processing according to the first embodiment of the present invention.

FIG. 30A and FIG. 30B are explanatory diagrams relating to the data save processing according to the first embodiment of the present invention.

As FIG. 30A shows, in the storage system 10, the write data (data B in FIG. 30A) is stored in the two primary cache units 120 according to the write request. In this state, if the CCP 121 judges that data save is necessary (YES in step S171), data save of the primary cache units 120 starts. For example, if a power failure occurred, power to the primary cache units 120 is maintained by the battery 400, as shown in FIG. 30B, so that data in the primary cache memories 124 is not lost. Power to each functional unit of the secondary cache unit 130 is also maintained by the battery 400.

In this state, the CCP 121 detects the data B, which is not reflected in the secondary cache memories 134, on the primary cache memories 124, and sends the request to write data B to the secondary cache memories 134 to the secondary cache units 130 (step S173). By this, data B is stored in the secondary cache memories 134 by the CCP 131 of the secondary cache units 130. The data configuration information stored in LM 126 is also stored in the secondary cache memories 134.

Now the power supply recovery processing in the storage system 10 when the power supply is recovered will be described.

Figure 29B:
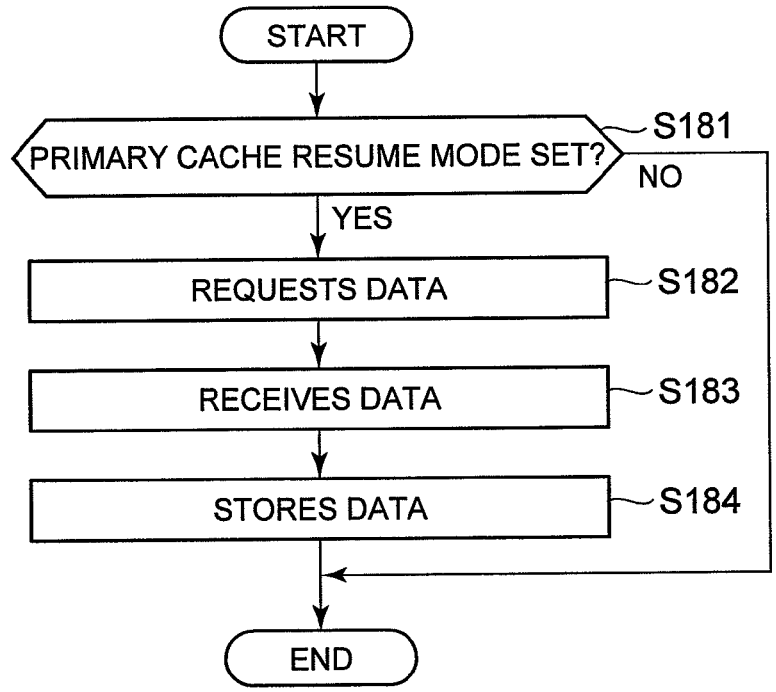
FIG. 29B is a flow chart depicting a power recovery processing according to the first embodiment of the present invention.

FIG. 29B is a flow chart depicting the power supply recovery processing according to the first embodiment of the present invention.

In the present embodiment, either the primary cache resume mode or the secondary cache starting mode can be set.

The primary cache resume mode is a mode in which a request from the host computer is accepted after recovering the data stored in the primary cache memory 124 when data is saved, and the secondary cache starting mode is a mode in which a request from the host computer is accepted without recovering data in the primary cache memory 124.

The CCP 121 of the primary cache unit 120 judges whether the primary cache resume mode is set or the secondary cache starting mode is set (step S181). If the primary cache resume mode is set as a result of the judgment, the CCP 121 requests to the CCP 131 for the data configuration information stored from the LM 126 to the secondary cache memory 134 when the data is saved and for the data managed by this data configuration information, that is the data stored in the primary cache memory 124 (step S182), and receives the data configuration information and the data from the CCP 131 (step S183), then the CCP 121 stores each data to the primary cache memory 124 (step S184), and ends the processing. By this, the data which existed at data save time exists in the primary cache memory 124. Therefore the probably is that the data, corresponding to the read request from the host computer cached in the primary cache memory 124, can be recovered to the same state as at data save time.

If the secondary cache starting mode is set (NO in step S181), on the other hand, the processing ends as is. By this, acceptance of a request from the host computer can be quickly started.

Figure 30C:
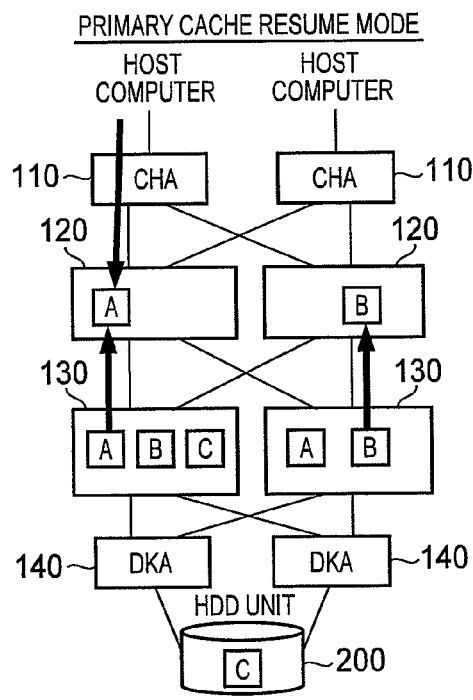
FIG. 30C is an explanatory diagram relating to a primary cache resume mode according to the first embodiment of the present invention.

FIG. 30C is an explanatory diagram relating to the primary cache resume mode according to the first embodiment of the present invention.

As FIG. 30C shows, in the primary cache resume mode, data B which existed in the primary cache unit 120 at data save time is stored in the primary cache unit 120 (step S184), then processing to accept a request from the host computer is started.

Figure 30D:
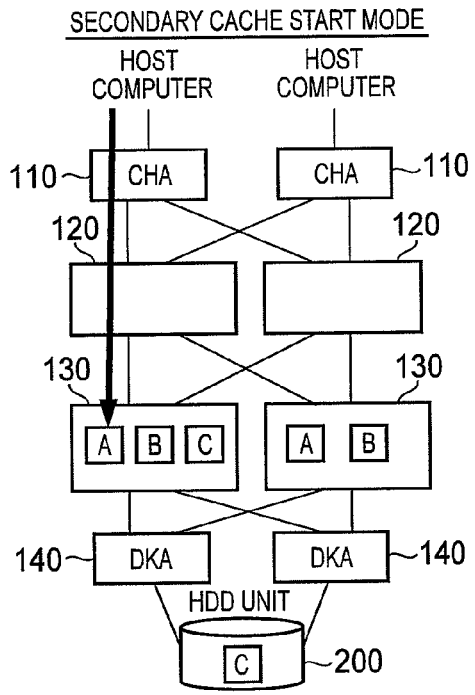
FIG. 30D is an explanatory diagram relating to a secondary cache start mode according to the first embodiment of the present invention.

FIG. 30D is an explanatory diagram relating to the secondary cache start mode according to the first embodiment of the present invention.

As FIG. 30D shows, in the secondary cache starting mode, the data B, which existed in the primary cache unit 120 at data save time, is not stored in the primary cache unit 120, instead processing to accept a request from the host computer is directly started. By this, acceptance of the request from the host computer can be started quickly.

Now backing up data in a remote location, that is remote copy, in the storage system 10 according to the first embodiment of the present invention will be described.

In remote copy, data is matched between the copy source and the copy destination, and the update data and the update sequence are stored as journal data each time an update of this data is generated in the storage system 10 storing the data of the copy source, and the stored journal data is sent to the copy destination via a communication line.

In the case of remote copy, a communication line failure may occur, so a storage area in the storage system must be provided for storing journal data in the storage system 10 in case the communication line fails. In a conventional storage system, journal data is stored in the storage area in the primary cache memory and in the storage area in the HDD unit. For example, if journal data is stored in the storage area in the primary cache memory, the storage capacity of the primary cache memory is relatively small, so if the volume of journal data is large, requests from the host computer must be limited. If journal data is stored in the HDD unit, on the other hand, the transfer processing of the journal data becomes slow due to the influence of the input/output processing speed of the HDD unit.

According to the present embodiment, insufficient capacity of the primary cache memory 124 does not exert a negative influence, and the influence of the input/output speed of the HDD unit can be appropriately prevented. This aspect will now be described in detail.

Figure 31A:
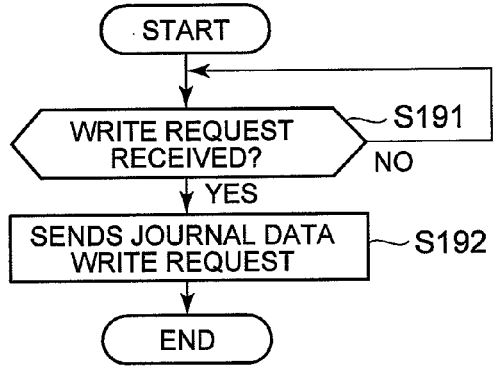
FIG. 31A is a flow chart depicting a journal data write processing in the channel adapter according to the first embodiment of the present invention.

FIG. 31A is a flow chart depicting the journal write processing in the channel adapter according to the first embodiment of the present invention.

In the CHA 110, the CHP 111 judges whether a write request for the remote copy target data is received from the host computer (step S191) via the signal conversion/data processing unit 112, and repeatedly executes step S191 if not received. If the write request for the remote copy target data is received, on the other hand, the CHP 111 sends a journal data write request to the primary cache units 120 of the first cluster 101*a* and the second cluster 101*b* (step S192), and ends the processing. The data and the update sequence of this data are included in the journal data write request.

Figure 31B:
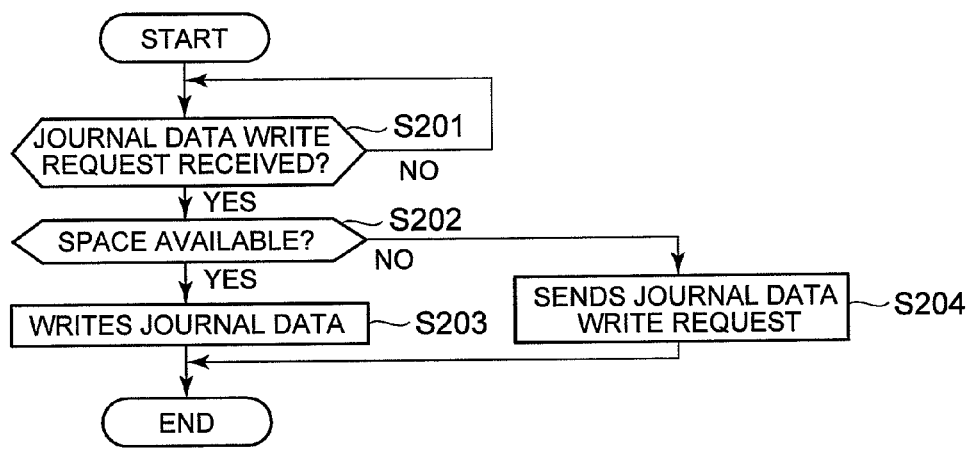
FIG. 31B is a flow chart depicting a journal data write processing in the primary cache unit according to the first embodiment of the present invention.

FIG. 31B is a flow chart depicting the journal write processing in the primary cache unit according to the first embodiment of the present invention.

In the primary cache unit 120, the CCP 121 judges whether the journal data write request is received from the CHA 110 via the SEL 122 (step S201), and repeatedly executes step S201 if not received. If a journal data write request is received, on the other hand, the CCP 121 judges whether the storage area for writing journal data (journal volume) in the primary cache memory 124 has space (step S202), and writes the journal data if there is space (step S203), and ends the processing. If there is no space, the CCP 121 sends a journal data write request to the secondary cache unit 130 (step S204), and ends the processing.

Figure 31C:
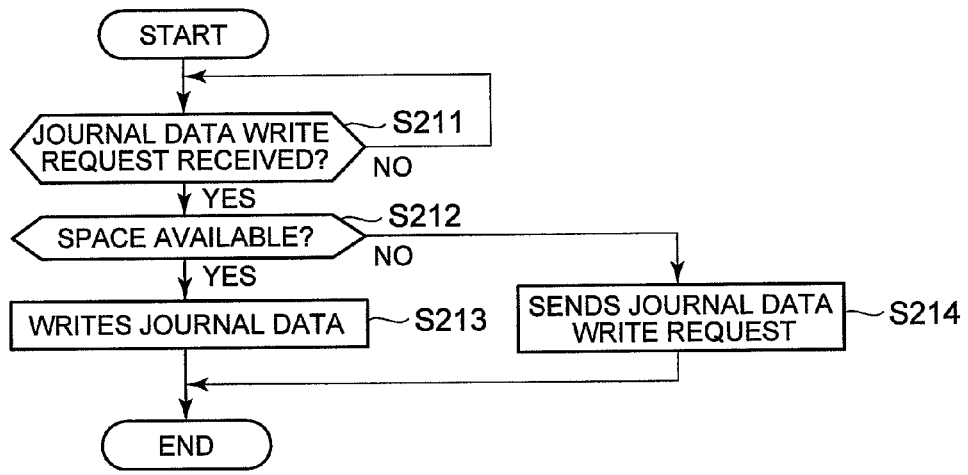
FIG. 31C is a flow chart depicting a journal data write processing in the secondary cache unit according to the first embodiment of the present invention.

FIG. 31C is a flow chart depicting the journal data write processing in the secondary cache unit according to the first embodiment of the present invention.

In the secondary cache unit 130, the CCP 131 judges whether the journal data write request is received from the primary cache unit 120 via the SEL 132 (step S211), and repeatedly executes step S211 if not received. If the journal data write request is received, on the other hand, the CCP 131 judges whether the storage area for writing journal data (journal volume) in the secondary cache memory 134 has space (step S212), and writes the journal data if there is space (steps S213), and ends the processing. If there is no space, the CCP 131 sends a journal data write request to the DKA 140 (step S214), and ends the processing. By this, the DKP 141 of the DKA 140 stores the journal data in the storage area for writing the journal data (expanded journal volume) of the HDD unit 200.

In this way, according to the storage system 10 of the present embodiment, the journal data can be stored in the secondary cache memory 134 if it cannot be stored in the primary cache memory 124, and can be stored in the HDD unit 200 if it cannot be stored in the secondary cache memory 134 either.

Figure 32:
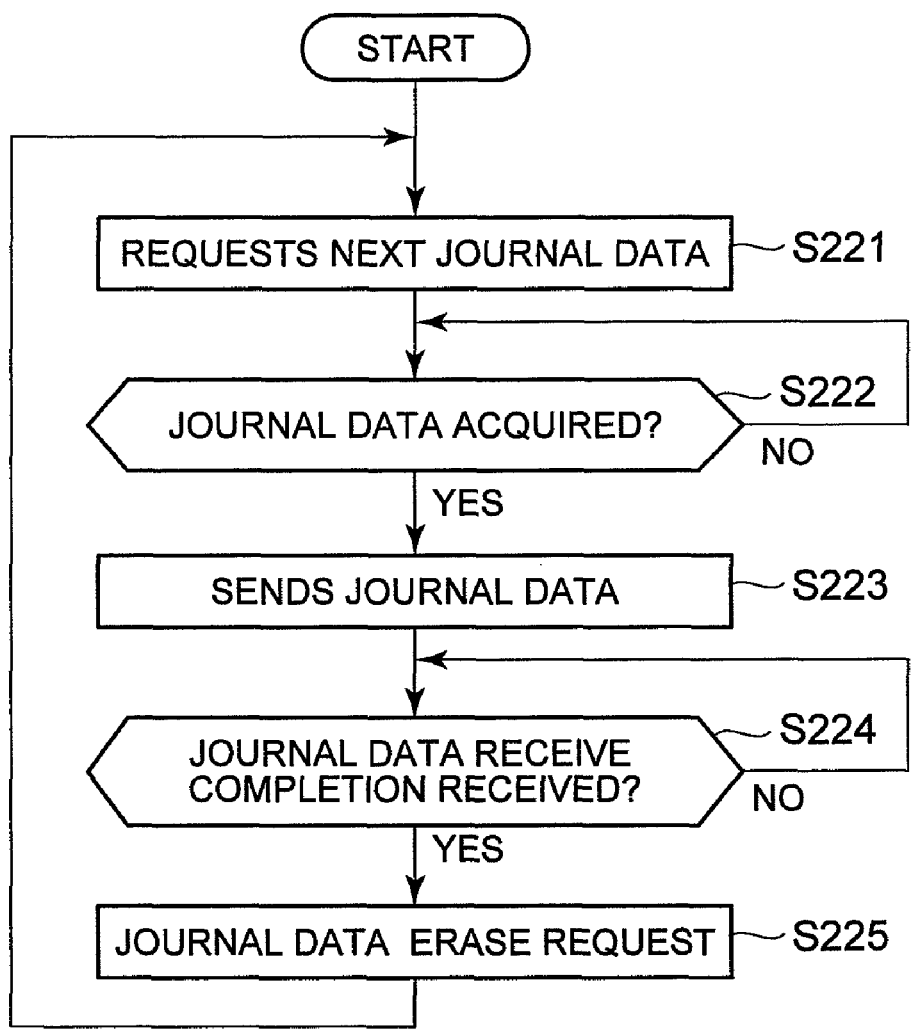
FIG. 32 is a flow chart depicting a remote copy processing in the channel adapter according to the first embodiment of the present invention.

FIG. 32 is a flow chart depicting the remote copy processing in the channel adapter according to the first embodiment of the present invention.

In the CHA 110, the CHP 111 sends a request to read the journal data to be sent to the remote copy destination next (step S221). The journal data to be sent next can be specified based on the update sequence included in the journal data. Then the CHP 111 judges whether the journal data is received from the primary cache unit 120 (step S222), and repeatedly executes step S222 if not received. If the journal data is received, on the other hand, the CHP 111 sends the journal data to be copy destination (step S223).

Then the CHP 111 judges whether journal data receive completion is received from the copy destination (step S224), and repeatedly executes step S224 until the journal data receive completion is received. If the receive completion is received from the copy destination, the CHP 111 sends a journal data erase request to the primary cache unit 120 (step S225).

Figure 33:
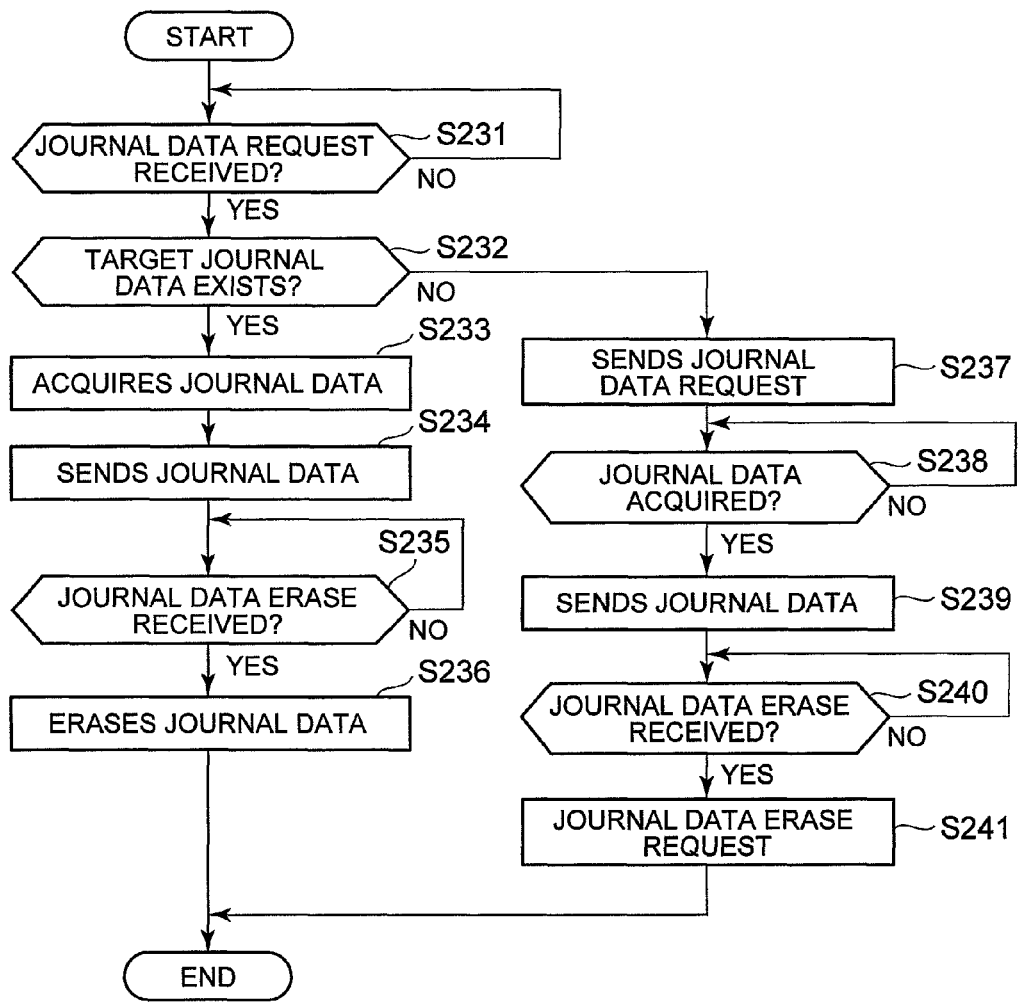
FIG. 33 is a flow chart depicting a remote copy processing in the primary cache unit according to the first embodiment of the present invention.

FIG. 33 is a flow chart depicting the remote copy processing in the primary cache unit according to the first embodiment of the present invention.

In the primary cache unit 120, the CCP 121 judges whether the journal data request is received from the CHA 110 via the SEL 122 (step S231), and repeatedly executes step S231 if not received. If the journal data request is received, on the other hand, the CCP 121 judges whether the target journal data is stored in the primary cache memory 124 based on the update sequence of the journal data included in the journal data request (step S232).

If the journal data is stored as a result of this judgment (YES in step S232), the CCP 121 acquires the journal data from the primary cache memory 124 (step S233), and sends the journal data to the CHA 110 (step S234). Then the CCP 121 judges whether the journal data erase request is received from the CHA 110 (step S235), and repeatedly executes step S234 until the journal data erase request is received. If the journal data erase request is received from the CHA 110, the CCP 121 erases the journal data corresponding to this erase request from the primary cache memory 124 (step S236), and ends the processing.

If the target journal data is not stored (NO in step S232), on the other hand, the CCP 121 sends the journal data request to the secondary cache unit 130 (step S237). Then the CCP 121 judges whether the journal data is received from the secondary cache unit 130 (step S238), and repeatedly executes step S238 if not received. If the journal data is received, on the other hand, the CCP 121 sends the journal data to the CHA 110 (step S239).

Then the CCP 121 judges whether the journal data erase request is received from the CHA 110 (step S240), and repeatedly executes step S240 until the journal data erase request is received. If the journal data erase request is received from the CHA 110, the CCP 121 sends the journal data erase request to the secondary cache unit 130 (step S241).

Figure 34A:
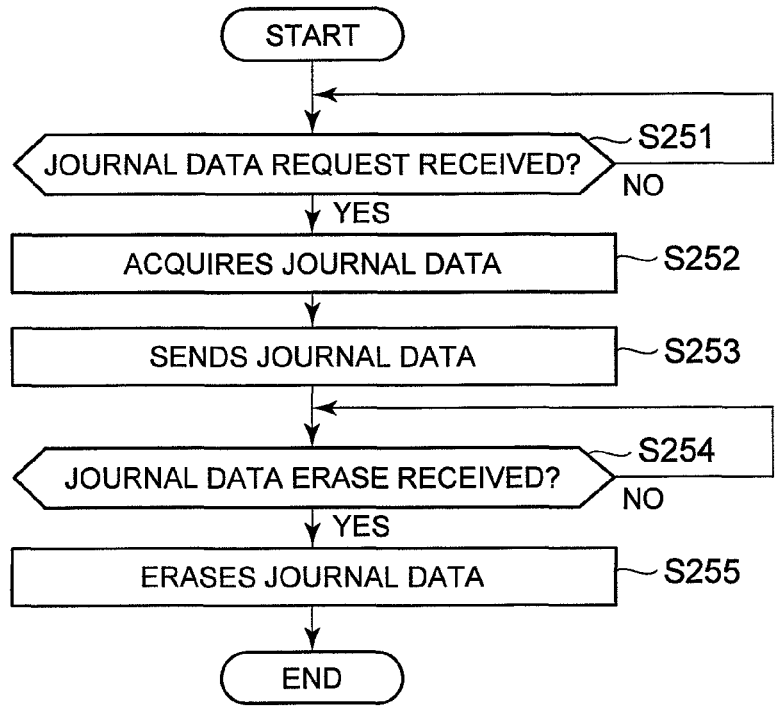
FIG. 34A is a flow chart depicting a remote copy processing in the secondary cache unit according to the first embodiment of the present invention.

FIG. 34A is a flow chart depicting the remote copy processing in the secondary cache unit according to the first embodiment of the present invention.

In the secondary cache unit 130, the CCP 131 judges whether the journal data request is received from the primary cache unit 120 via the SEL 132 (step S251), and repeatedly executes step S251 if not received. If the journal data request is received, on the other hand, the CCP 131 acquires the journal data from the secondary cache memory 134 based on the update sequence of the journal data included in the journal data request (step S252), and sends the journal data to the primary cache unit 120 (step S253). And the CCP 131 judges whether the journal data erase request is received from the primary cache unit 120 (step S254), and repeatedly executes step S254 until the journal data erase request is received. If the journal data erase request is received from the primary cache unit 120, the CCP 131 erases the journal data corresponding to the erase request from the secondary cache memory 134 (step S255), and ends the processing.

Figure 34B:
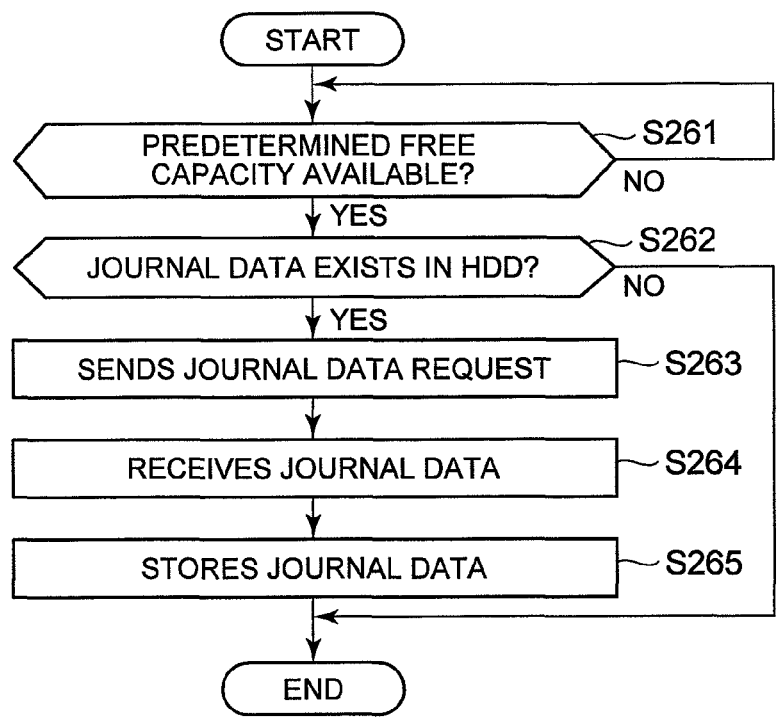
FIG. 34B is a flow chart depicting a journal shift processing according to the first embodiment of the present invention.

FIG. 34B is a flow chart depicting the journal data migration processing according to the first embodiment of the present invention.

This journal data migration processing is executed at predetermined times, for example. In the secondary cache unit 130, the CCP 131 judges whether the storage area for writing journal data (journal volume) in the secondary cache memory 134 has space (step S261), and repeatedly executes step S261 if there is no space. If there is space, the CCP 131 judges whether the journal data exists in the HDD unit 200 (step S262). Whether the journal data exists in the HDD unit 200 is known by the difference between the number of write requests of the journal data sent to the HDD unit 200 and the number of journal data read from the HDD unit 200.

If it is judged that the journal data exists in the HDD unit 200 (YES in step S262), the CCP 131 sends the journal data request to the DKA 140 (step S263). By this, the DKA 140 reads the corresponding journal data from the HDD unit 200, and sends it to the secondary cache unit 130.

The CCP 131 receives the journal data from the DKA 140 (step S264), stores the received journal data in the secondary cache memory 134 (step S265), and ends the processing. If the CCP 131 judges that journal data does not exist in the HDD unit 200 (NO in step S262), the processing ends.

By this journal data migration processing, the journal data stored in the HDD unit 200 can be stored in the secondary cache memory 134. Therefore the transmission of journal data is not influenced by the access speed of the HDD unit 200. As a result, the journal data can be sent to the copy destination quickly.

FIG. 35A is an explanatory diagram relating to the journal write processing and the remote copy processing according to the first embodiment of the present invention. In the following description, the step numbers in FIG. 31A to FIG. 34B are used.

In the case of updating the remote copy target data (step S191), as shown in (1), the journal data including the update data and the update sequence is double-written in the primary cache memories 124, as shown in (2) (step S203), in the storage system 10. The journal data written in the primary cache memory 124 is extracted from the primary cache memory 124 (step S233), as shown in (3), and is transferred to the remote copy destination (step S223).

FIG. 35B is another explanatory diagram relating to the journal write processing and the remote copy processing according to the first embodiment of the present invention, and is a diagram for describing an example of the state when the data in the state in FIG. 35A is updated again.

When the remote copy target data is updated in the state shown in FIG. 35A (step S191), as shown in (4) of FIG. 35B, the journal data including the update data and the update sequence is double-written to the primary cache memories 124, as shown in (5) (step S203).

If the journal data cannot be stored in the journal volume 120j of the primary cache memory 124, the journal data is stored in the journal volume 130j of the secondary cache memory 134 (step S213), as shown in (6).

The journal data stored in the primary cache memory 124 and the secondary cache memory 134, on the other hand, are sent to the remote copy destination based on the update sequence (steps S233, S252 and S223), as shown in (7).

If the remote copy target data is updated again (step S191), and if the journal data cannot be stored in the primary cache memory 124 and secondary cache memory 134, the journal data is stored in the expanded journal volume 200j of the HDD unit 200 (step S214), as shown in (8).

The journal data stored in the expanded journal volume 200j of the HDD unit 200 is sequentially shifted to the journal volume 130j of the secondary cache unit 130 (step S265), as shown in (9), and is sent to the remote copy destination (steps S253 and S223).

FIG. 35C is a diagram depicting an example of the journal data storage state according to the first embodiment of the present invention.

As FIG. 35C shows, if the journal data cannot be stored in the journal volumes 120j and 130j of the primary cache memory 124 and secondary cache memory 134, the journal data in the subsequent update sequence (e.g. n+1th or later) is stored in the expanded journal volume 200j of the HDD unit 200 unless space becomes available in journal volumes 120j and 130j. Therefore even if the data cannot be stored in journal volumes 120j and 130j, journal data can be stored.

<First Embodiment: First Variant Form>

The storage system according to the first variant form of the first embodiment of the present invention will be described.

Figure 36:
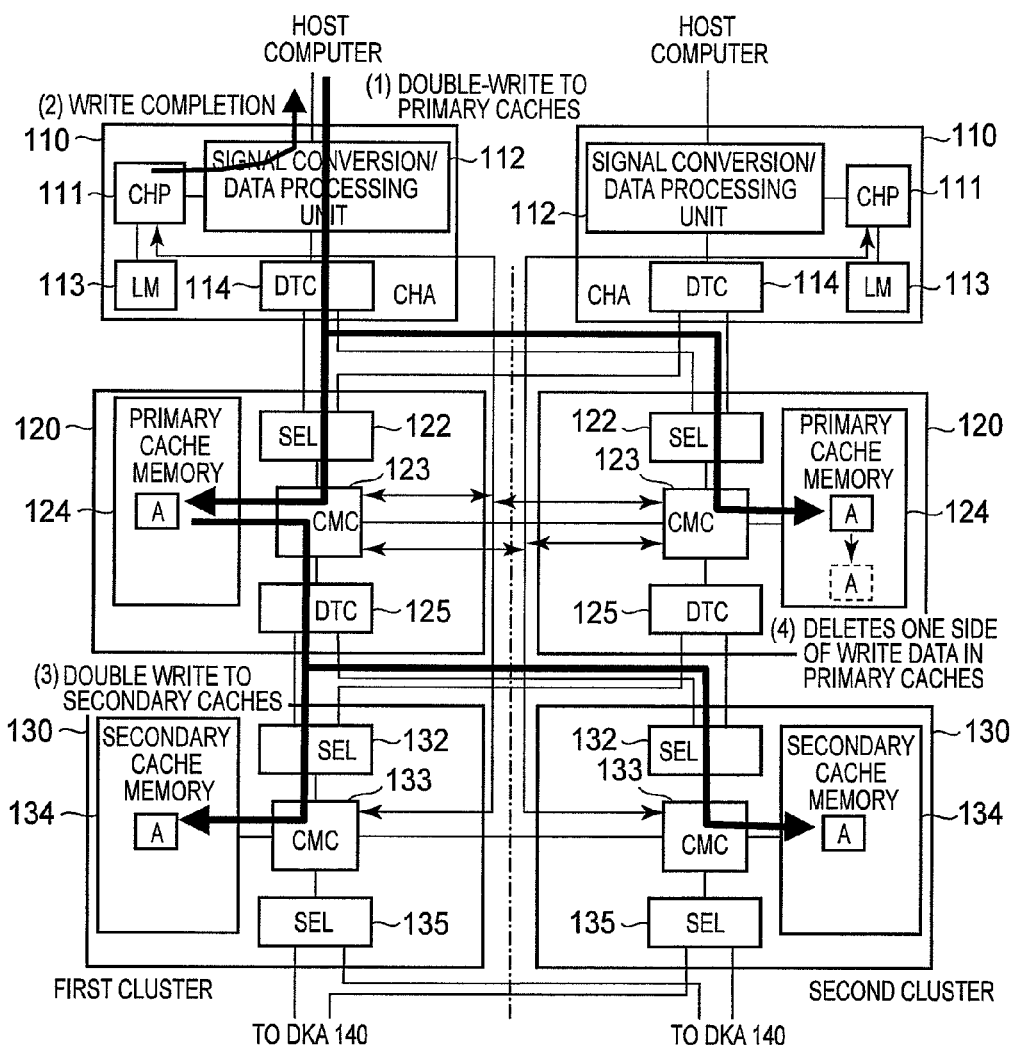
FIG. 36 is an explanatory diagram relating to a storage system according to a first variant form of the first embodiment of the present invention.

FIG. 36 is an explanatory diagram relating to the storage system according to the first variant form of the first embodiment of the present invention. Composing elements the same as the storage system of the first embodiment are denoted with the same reference numbers, and redundant description will be omitted.

The storage system 10 according to the present variant form is the storage system 10 of the first embodiment, where the CCP 121 is removed from the primary cache unit 120, and the CCP 131 is removed from the secondary cache unit 130, so that the processing controlled by the CCP 121 and the CCP 131 are all performed by the CHP 111. In this way, the same processing as the first embodiment can be executed without installing the CCP 121 and the CCP 131 in the storage system 10, so cost can be decreased.

For example, the CHP 111 double-writes the write target data (data A in FIG. 36) to the primary cache memories 124, that is, writes the data to the two primary cache memories 124 respectively, as shown in (1). After the CHP 111 stores the data in the primary cache memories 124 of both of the primary cache units 120, the CHP 111 sends the write processing completion notice to the host computer (step S17), as shown in (2). Since the write processing completion notice is sent to the host computer when the data A is double-written to the primary cache memories 124, a quick response to the host computer becomes possible. Then as shown in (3), the CHP 111 writes the write target data A to the two secondary cache memories 134 respectively. Then as shown in (4), the CHP 111 deletes the write target data A from the primary cache memory 124 of one of the primary cache memory units 120.

By this, the write target data A is deleted from one of the primary cache memories 124, and the memory efficiency of the primary cache memories 124 can be improved. In this case, data A is stored in one of the primary cache memories 124 and two secondary cache memories 134, so as to assure reliability in holding data. Since data A is stored in one of the primary cache memories 124, the read request of this data A can be responded to quickly.

<First Embodiment: Second Variant Form>

Figure 37:
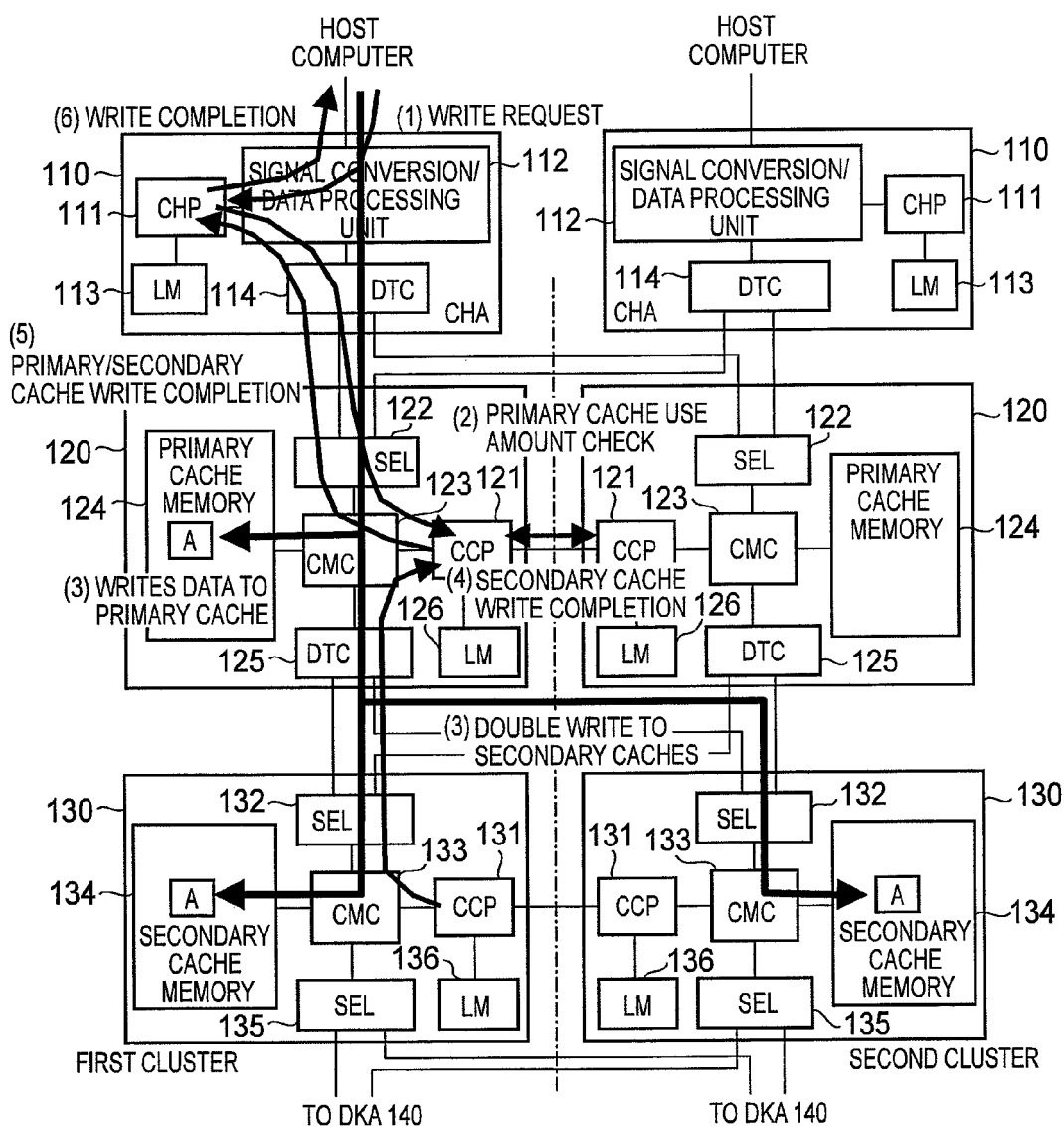
FIG. 37 is an explanatory diagram relating to a storage system according to a second variant form of the first embodiment of the present invention.

FIG. 37 is an explanatory diagram relating to the storage system according to the second variant form of the first embodiment of the present invention. Composing elements the same as the storage system of the first embodiment are denoted with the same reference numbers, and redundant description will be omitted.

The storage system according to the second variant form has a configuration similar to the storage system of the first embodiment, but the processing of CHP 111 and CCP 121 is slightly different. Briefly, in the first embodiment, the write processing completion notice is sent to the host computer at the point when the data is double-written to the primary cache memories 124, but in the second variant form, the write processing completion notice is sent to the host computer at the point when the data is stored in one of the primary cache memories 124, and is double-written to the secondary cache memories 134.

Figure 38:
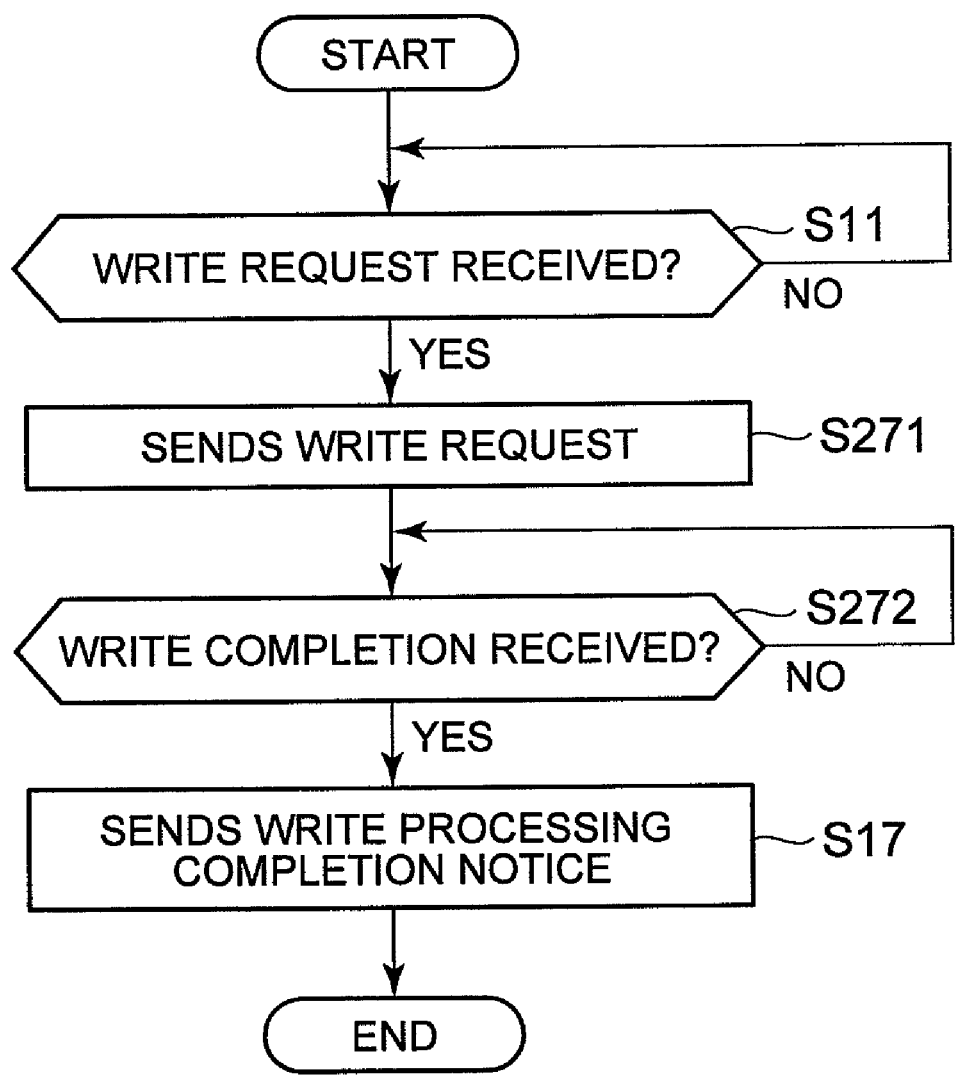
FIG. 38 is a flow chart depicting a processing when a write request is received in the channel adapter according to the second variant form of the first embodiment of the present invention.

FIG. 38 is a flow chart depicting a processing when a write request is received in the channel adapter according to the second variant form of the first embodiment of the present invention. Processing the same as the processing in FIG. 7 is denoted with a same reference number. Here a portion different from the flow chart in FIG. 7 will be described.

If a write request is received in step S11, the CHP 111 sends a write request to one of the primary cache units 120 (step S271), and judges whether a write completion is received from the primary cache unit 120 (step S272), and repeatedly executes step S272 until the write completion is received. And if the write completion is received from the primary cache unit 120, the CHP 111 sends a write processing completion notice to the host computer which sent the write request via the signal conversion/data processing unit 112 (step S17).

Figure 39:
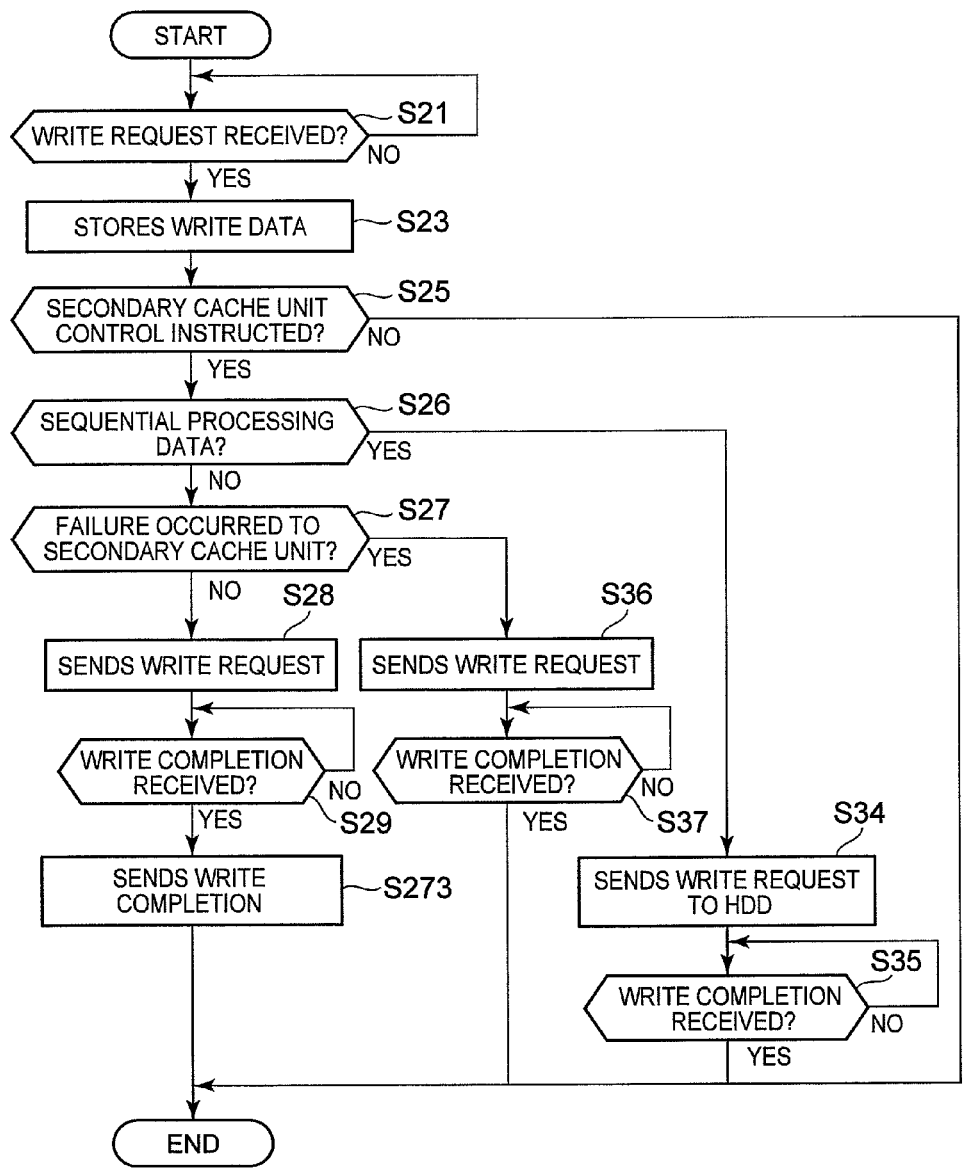
FIG. 39 is a flow chart depicting a processing when a write request is received in the primary cache unit according to the second variant form of the first embodiment of the present invention.

FIG. 39 is a flow chart depicting a processing when a write request is received in the primary cache unit according to the second variant form of the first embodiment of the present invention. A processing the same as the processing in FIG. 8 is denoted with a same reference number. Here a portion different from the flow chart in FIG. 8 will be described.

If a write completion is received from both of the secondary cache units 130 (YES in step S29), the CCP 121 sends a write completion to the CHP 111 (step S273). By this, the write completion is sent to the CHP 111 at the point when the data is double-written to the two secondary cache units 130.

Referring back to FIG. 37, FIG. 37 will be described using the step numbers in FIG. 38 and FIG. 39.

In the storage system 10, the CHA 110 receives a write request (step S11), as shown in (1). Here the CHP 111 sequentially checks the use amount of the primary cache memory 124 of each cluster, as shown in (2). Then as shown in (3), one of the primary cache units 120 receives a write request from the CHP 111, and the CCP 121 writes the write target data (data A in FIG. 37) to one of the primary cache memories 124 (step S23), and sends a write request to the secondary cache units 130 (step S28), so that the write target data A is written in the two secondary cache memories 134 respectively.

The CCP 121 receives a write completion to indicate that the data is stored in the secondary cache memories 134 from the CCP 131, as shown in (4) (YES in step S29). Then as shown in (5), the CCP 121 sends a write completion to the CHP 111 (step S273).

If the write completion is received from the CCP 121 (YES in step S272), the CHP 111 sends the write processing completion notice to the host computer (step S17) as shown in (6).

By this processing, the write data is stored in one of the primary cache memories 124 and in the two secondary cache memories 134, then the write processing completion notice is sent to the host computer.

In the present variant form, the write data is stored only in one of the primary cache memories 124, so the storage resources of the primary cache memories 124 can be effectively used, and since data can be stored in the primary cache memory 124 and in the two secondary cache memories 134, high reliability of data can be assured.

<Second Embodiment>

Figure 40:
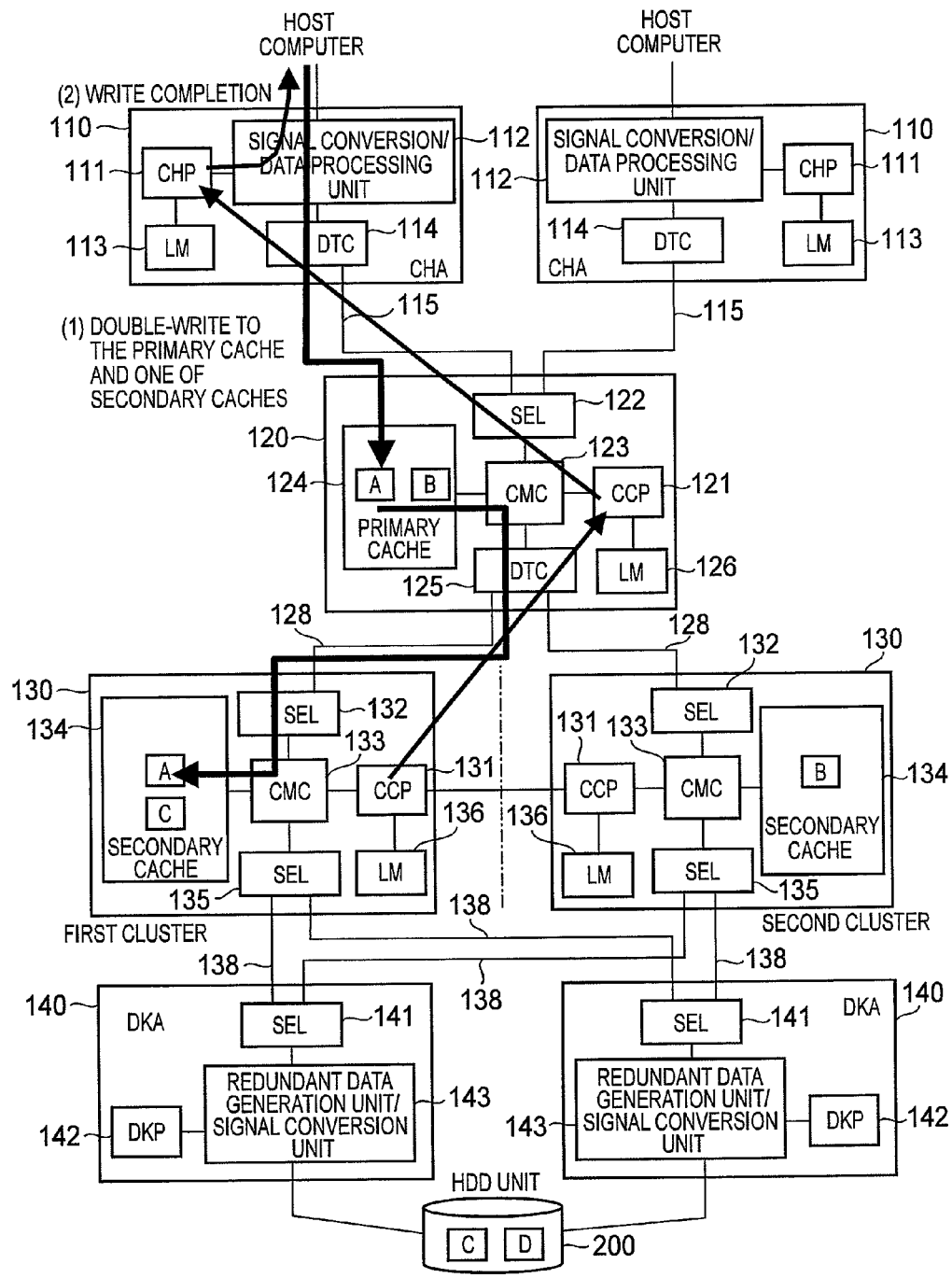
FIG. 40 is an explanatory diagram relating to a storage system according to a second embodiment of the present invention.

FIG. 40 is an explanatory diagram relating to a storage system according to the second embodiment of the present invention. Composing elements the same as those in the storage system in the first embodiment are denoted with a same reference numbers, and redundant description thereof will be omitted. The processing when a write request is received in the storage system according to the second embodiment is only slightly different from the processing shown in FIG. 9, FIG. 38 and FIG. 39 in the storage system of the first embodiment, so the differences will be described using the step numbers in FIG. 9, FIG. 38 and FIG. 39.

The storage system according to the second embodiment is the storage system according to the first embodiment in which only one primary cache unit 120 is provided.

In the storage system according to the second embodiment, if the CHA 110 receives a write request (step S11), as shown in (1), the CHP 111 sends the write request to the primary cache unit 120 (step S271). The CCP 121 which received the write request writes the write data to the primary cache memory 124 (step S23).

Then the CCP 121 sends a write request to one of the secondary cache units 130 (step S28), and the CCP 131 of the secondary cache unit 130 which received the write request writes the write data to the secondary cache memory 134 (step S44). Then the CCP 131 sends the write completion to the CCP 121 (step S45), and the CCP 121 sends the write completion to the CHP 111 (step S273).

If the write completion is received from the CCP 121 (YES in step S272), the CHP 111 sends the write processing completion notice to the host computer (step S17) as shown in (2).

By this processing, the write data is stored in one primary cache memory 124 and in one of the secondary cache memories 134, and then the write processing completion notice is sent to the host computer.

According to the second embodiment, only one primary cache memory 124 is required so the cost of the storage system can be decreased. Also the data is stored in the primary cache memory 124 and the secondary cache memories 134, so high reliability of the data can be assured. Data exists in the primary cache memory 124, so the response to the read request can be quick.

In the second embodiment, the data reduction processing on the primary cache memory 124 and the data reduction processing on the secondary cache memory 134, similar to the processing in FIG. 17A, FIG. 17B, FIG. 18, FIG. 20A, FIG. 20B and FIG. 23 of the first embodiment, may be executed.

<Second Embodiment: Variant Form>

Figure 41:
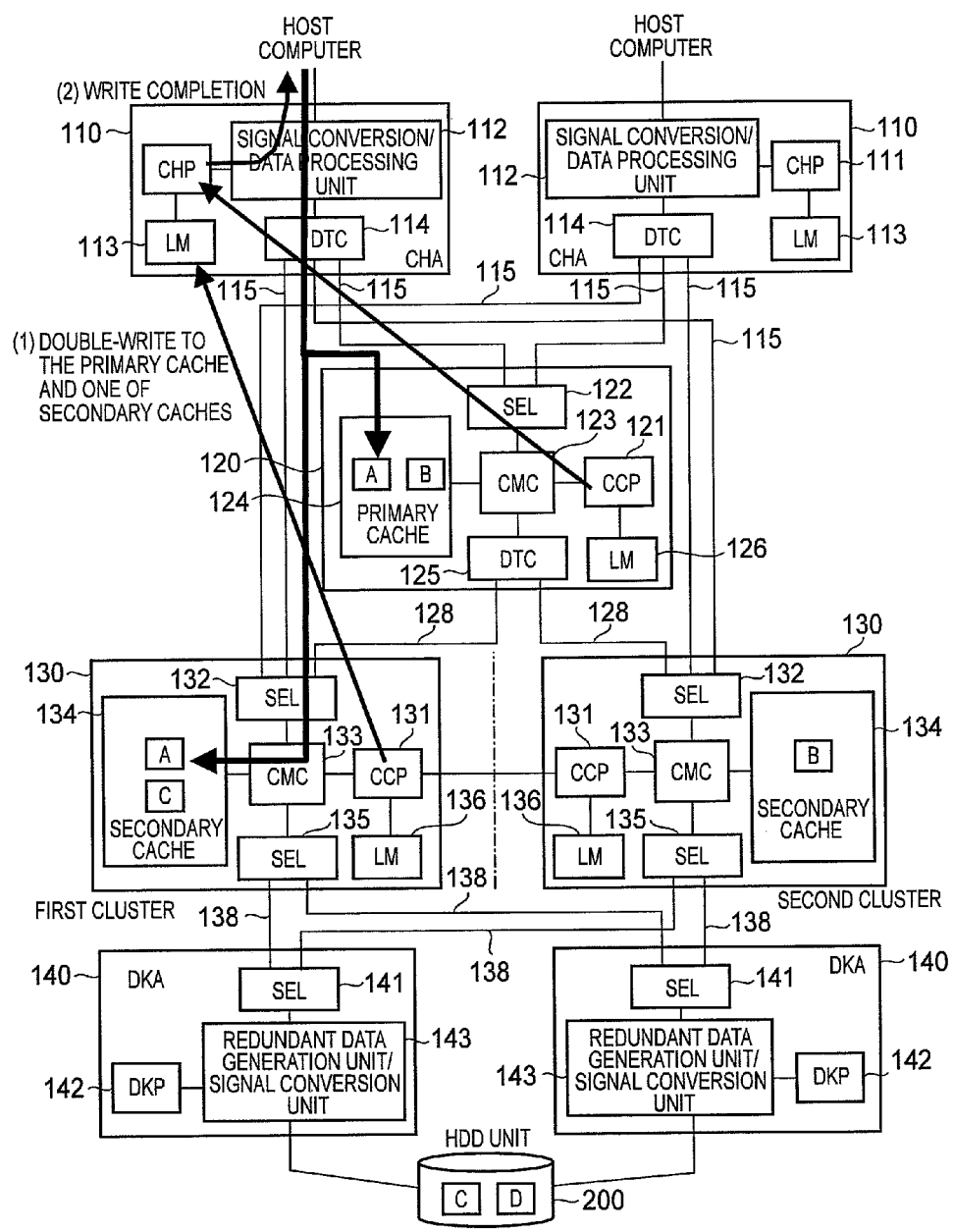
FIG. 41 is an explanatory diagram relating to a variant form of a storage system according to the second embodiment of the present invention.

FIG. 41 is a diagram depicting a variant form of the storage system according to the second embodiment of the present invention. Composing elements the same as the storage system of the second embodiment will be denoted with a same reference numbers, and redundant description will be omitted. The processing when a write request is received in the storage system according to the variant form of the second embodiment is only slightly different from the processing shown in FIG. 9, FIG. 38 and FIG. 39 in the storage system of the first embodiment, so the differences will be described using the step numbers in FIG. 9, FIG. 38 and FIG. 39.

The storage system according to the present variant form is the storage system according to the second embodiment in which the SELs 132 of the plurality of secondary cache units 130 and the DTCs 114 of the plurality of CHAs 110 are connected by buses 115.

In the storage system according to the present variant form, if the CHA 110 receives a write request (step S11), as shown in (1), the CHP 111 sends the write request to the primary cache unit 120 and one of the secondary cache units 130 (step S271). The CCP 121 of the primary cache unit 120 which received the write request writes the write data to the primary cache memory 124 (step S23). Also the CCP 131 of the secondary cache unit 130 which received the write request writes the write data to the secondary cache memory 134 (step S44).

Then the CCP 121 and the CCP 131 send the write completion to the CHP 111 respectively (steps S273 and S45).

If the write completion is received from the CCP 121 and the CCP 131 (YES in step S272), the CHP 111 sends the write processing completion notice to the host computer (step S17) as shown in (2).

By this processing, the write data is stored in one primary cache memory 124 and in one of the secondary cache memories 134, and then the write processing completion notice is sent to the host computer. According to the present variant form, the write data can be stored in the two secondary cache units 130 even if a failure occurred in the primary cache unit 120.

In the present variant form as well, the data reduction processing on the primary cache memory 124 and the data reduction processing on the secondary cache memory 134, similar to the processing in FIG. 17A, FIG. 17B, FIG. 18, FIG. 20A, FIG. 20B and FIG. 23 of the first embodiment, may be executed.

The present invention was described based on the embodiments, but the present invention is not limited to the above mentioned embodiments, and can be applied to various other modes.

For example, in each of the above embodiments, an HDD unit 200 is used as an example of the storage device, but the present invention is not limited to this, and a storage device in which at least a part or all of the hard disk device is replaced with another storage device that can store data, such as a DVD drive, magnetic tape drive or flash memory device.

In the above embodiments, when data is deleted from the primary cache memory 124 or the second cache memory 134, the data of which reference date and time is old is deleted, however the data of which reference count is low may be deleted or the data may be deleted based on conditions that combine the reference date and time and the reference count.

Also in the above embodiment, the data is deleted from the secondary cache memory 134 when the data of the secondary cache memory 134 is reduced, however the storage area where this data is stored may be managed as a storage area that can be used to write new data, without deleting data from the secondary cache memory 134. For example, information to indicate whether the storage area of the secondary cache memory 134 can be used or not is stored in the LM 136, and the CCP 131 manages the data based on this information. In this way, a data write operation to delete data is unnecessary in the case when the secondary cache memory 134 is a non-volatile memory, so the life of the secondary cache memory 134 can be extended.

What is claimed is:

1. A storage system comprising:
   one or more storage devices for storing data;
   a battery and
   a first cluster and a second cluster for managing data to be transferred to and from an external device, wherein
   said first cluster comprises a first interface that is connected to said external device and has a first processor, a second processor that can communicate with said first processor, a first memory that said second processor can access, a third processor that can communicate with said second processor, a second memory that said third processor can access, and a second interface that is connected to said third processor and said storage device,
   said second cluster comprises a third interface that is connected to said external device and has a fourth processor, a third memory that said fourth processor can access, a fifth processor that can access said third memory, a fourth memory that said fifth processor can access, a sixth processor that can access said fourth memory, and a fourth interface that is connected to said sixth processor and said storage device,
   said first processor can communicate with said fifth processor,
   said second processor can communicate with said fifth processor and said sixth processor,
   said first processor has said second processor store write target data in said first memory and has said fifth processor store the same in said third memory when a write request is received via said first interface, then has said first interface transmit a processing completion notice that indicates completion of storing said write target data to said external device which has sent said write request, and
   said second processor has said third processor store said write target data, stored in said first memory, in said second memory, and has said sixth processor store the same in said fourth memory, then erases said write target data stored in said first memory or has said fifth processor erase said write target data stored in said third memory.

2. The storage system according to claim 1, further comprising a completion notice transmission unit which transmits a processing completion notice that indicates completion of storing said write target data to said external device which has sent said write request after said write target data is stored in said first memory of said first cluster.

3. The storage system according to claim 2, further comprising a failure detection unit which detects a failure of said first memory, wherein said completion notice transmission unit transmits said processing completion notice after said write target data is stored in said second memory when a failure is detected by said failure detection unit.

4. The storage system according to claim 1, wherein said first interface unit receives a read request from said external device, the storage system further comprising:
a data read unit which reads read target data from said storage device and stores the same in said second memory of said first cluster when said read target data does not exist in said first cluster;
a read control unit which transmits said stored data to said external device by said first interface unit;
a secondary cache history information storage unit which stores access history information for said data stored in said second memory;
an access management unit which updates said access history information when said data stored in said second memory is accessed; and
data upgrade storing control unit which stores said data in said first memory based on said access history information of said second memory.

5. The storage system according to claim 1, wherein the first memory of said first cluster has a journal data storage area for storing journal data including data content and update sequence corresponding to said write request, the storage system further comprising:
a journal data storage control unit which stores said journal data in said first memory when said journal data storage area of said first memory has a space, and stores said journal data in said second memory when said first memory does not have a space; and
a remote transmission control unit which extracts said journal data stored in said first memory or second memory based on said update sequence, and transmits the same to a predetermined external device by said first interface unit.

6. The storage system according to claim 1, wherein said second memory is a non-volatile memory.

7. The storage system according to claim 6, further comprising:
a judgment unit which judges whether said write target data is a predetermined amount or more of sequential processing data; and
a sequential processing data storage control unit which transfers said write target data to said second interface unit and stores the same in said storage device without storing in said second memory when judgment is made that said write target data is a predetermined amount or more of sequential processing data.

8. The storage system according to claim 6, wherein said second memory further comprises a plurality of memory modules.

9. The storage system according to claim 6, wherein said second memory is formed of a plurality of normal memory modules and at least one spare memory module, the storage system further comprising:
a rewrite count storage unit which stores the number of times of data rewriting for each of said normal memory modules; and
a memory module replacement control unit which stores data in one of said memory modules to said spare memory module, and enables operation of said spare memory module in place of said one memory module when the number of times of data rewriting for said one memory module out of said normal memory modules exceeds a predetermined value.

* * * * *